US012768532B2

(12) United States Patent

Quanci et al.

(10) Patent No.: US 12,768,532 B2

(45) Date of Patent: Oct. 20, 2026

(54) SYSTEMS AND METHODS FOR UTILIZING FLUE GAS

(71) Applicant: SUNCOKE TECHNOLOGY AND DEVELOPMENT LLC, Lisle, IL (US)

(72) Inventors: John Francis Quanci, Haddonfield, NJ (US); Anthony Hanlin, Lisle, IL (US); Jennifer Mclaren, Lisle, IL (US)

(73) Assignee: SUNCOKE TECHNOLOGY AND DEVELOPMENT LLC, Lisle, IL (US)

( * ) Notice: Subject to any disclaimer, the term of this patent is extended or adjusted under 35 U.S.C. 154(b) by 451 days.

(21) Appl. No.: 17/947,520

(22) Filed: Sep. 19, 2022

(65) Prior Publication Data

US 2023/0258326 A1 Aug. 17, 2023

Related U.S. Application Data

(63) Continuation of application No. 16/729,068, filed on Dec. 27, 2019, now Pat. No. 11,486,572.

(Continued)

(51) Int. Cl.

*B23P 6/04* (2006.01)

*B23P 6/00* (2006.01)

(Continued)

(52) U.S. Cl.

CPC .......... *F22B 37/025* (2013.01); *F22B 1/1876* (2013.01); *F27D 17/10* (2025.01);

(Continued)

(58) Field of Classification Search

CPC ........ F24H 1/0045; F24H 9/06; F22B 21/126; F22B 31/00; F28F 9/013; B23P 6/00; B23P 6/04; F27D 17/00

See application file for complete search history.

(56) References Cited

U.S. PATENT DOCUMENTS 425,797 A 4/1890 Hunt 469,868 A 3/1892 Osbourn (Continued)

FOREIGN PATENT DOCUMENTS

BR 102012032127 A2 4/2015

CA 1172895 8/1984

(Continued)

OTHER PUBLICATIONS

Brazilian Office Action in Brazilian Application No. BR112021012412-8; Date of Mailing: Jul. 4, 2023; 7 pages.

(Continued)

*Primary Examiner* — Gregory A Wilson

(74) *Attorney, Agent, or Firm* — Ashurst Perkins Coie US LLP

(57) ABSTRACT

Systems and apparatuses for cooling flue gases emitted from an industrial facility, such as a coke oven in a coke manufacturing plant. A representative system includes a heat recovery steam generator (HRSG) having a steam generation system that converts liquid feedwater into steam by absorbing heat from the flue gases. The steam generation system includes a plurality of tubes that carry the liquid water feedwater and the steam. Some or all of the tubes include steel and a non-corrosive material cladded to the steel that helps to reduce corrosion caused by the high temperature flue gases and extremely corrosive contaminants within the flue gas that can corrode steel.

15 Claims, 19 Drawing Sheets

Related U.S. Application Data

(60) Provisional application No. 62/787,116, filed on Dec. 31, 2018.

(51) Int. Cl.

| | |
|---|---|
| ***F22B 1/18*** | (2006.01) |
| ***F22B 37/02*** | (2006.01) |
| ***F27D 17/10*** | (2025.01) |
| *E04F 13/14* | (2006.01) |
| *F01K 23/10* | (2006.01) |
| *F27D 17/30* | (2025.01) |
| *F28D 21/00* | (2006.01) |
| *F28F 19/02* | (2006.01) |
| *F28F 19/06* | (2006.01) |

(52) U.S. Cl.
CPC ............ *E04F 13/142* (2013.01); *F01K 23/10* (2013.01); *F27D 17/302* (2025.01); *F28D 21/001* (2013.01); *F28D 2021/0064* (2013.01); *F28F 19/02* (2013.01); *F28F 19/06* (2013.01); *F28F 2245/00* (2013.01); *F28F 2280/02* (2013.01)

(56) References Cited

U.S. PATENT DOCUMENTS 705,926 A 7/1902 Hemingway
760,372 A 5/1904 Beam
845,719 A 2/1907 Schniewind
875,989 A 1/1908 Garner
976,580 A 11/1910 Krause
1,140,798 A 5/1915 Carpenter
1,220,232 A 3/1917 Jackson
1,378,782 A 5/1921 Floyd
1,424,777 A 8/1922 Schondeling
1,429,346 A 9/1922 Horn
1,430,027 A 9/1922 Plantinga
1,486,401 A 3/1924 Van Ackeren
1,491,802 A 4/1924 Irwin
1,530,995 A 3/1925 Geiger
1,572,391 A 2/1926 Klaiber
1,676,729 A 7/1928 Erwin
1,677,973 A 7/1928 Marquard
1,705,039 A 3/1929 Thornhill
1,721,813 A 7/1929 Geipert
1,757,682 A 5/1930 Palm
1,818,370 A 8/1931 Wine
1,818,994 A 8/1931 Kreisinger
1,830,951 A 11/1931 Lovett
1,848,818 A 3/1932 Becker
1,895,202 A 1/1933 Montgomery
1,947,499 A 2/1934 Schrader et al.
1,955,962 A 4/1934 Jones
1,979,507 A 11/1934 Underwood
2,075,337 A 3/1937 Burnaugh
2,141,035 A 12/1938 Daniels
2,195,466 A 4/1940 Otto
2,235,970 A 3/1941 Wilputte
2,340,283 A 1/1944 Vladu
2,340,981 A 2/1944 Otto
2,343,034 A 2/1944 Weber
2,394,173 A 2/1946 Harris et al.
2,424,012 A 7/1947 Bangham et al.
2,486,199 A 10/1949 Nier
2,609,948 A 9/1952 Laveley
2,641,575 A 6/1953 Otto
2,649,978 A 8/1953 Smith
2,667,185 A 1/1954 Beavers
2,723,725 A 11/1955 Keiffer
2,756,842 A 7/1956 Chamberlin et al.
2,765,266 A 10/1956 Throop et al.
2,813,708 A 11/1957 Frey
2,827,424 A 3/1958 Homan
2,873,816 A 2/1959 Emil et al.
2,902,991 A 9/1959 Whitman
2,907,698 A 10/1959 Schulz
2,968,083 A 1/1961 Lentz et al.
3,010,882 A 11/1961 Barclay et al.
3,015,893 A 1/1962 McCreary
3,026,715 A 3/1962 Briggs
3,033,764 A 5/1962 Hannes
3,085,582 A 4/1963 Slosman
3,134,733 A 5/1964 Rose
3,175,961 A 3/1965 Samson
3,199,135 A 8/1965 Trucker
3,224,805 A 12/1965 Clyatt
3,259,551 A 7/1966 Thompson, Jr.
3,265,044 A 8/1966 Juchtern
3,267,913 A 8/1966 Jakob
3,327,521 A 6/1967 Briggs
3,342,990 A 9/1967 Barrington et al.
3,381,355 A 5/1968 Bixby
3,444,046 A 5/1969 Harlow
3,444,047 A 5/1969 Wilde
3,448,012 A 6/1969 Allred
3,453,839 A 7/1969 Sabin
3,462,345 A 8/1969 Kernan
3,462,346 A 8/1969 Kernan et al.
3,494,461 A 2/1970 Fournier et al.
3,511,030 A 5/1970 Brown et al.
3,542,650 A 11/1970 Kulakov
3,545,470 A 12/1970 Paton
3,587,198 A 6/1971 Hensel
3,591,827 A 7/1971 Hall
3,592,742 A 7/1971 Thompson
3,616,408 A 10/1971 Hickam
3,623,511 A 11/1971 Levin
3,630,852 A 12/1971 Nashan et al.
3,652,403 A 3/1972 Knappstein et al.
3,676,305 A 7/1972 Cremer
3,709,794 A 1/1973 Kinzler et al.
3,710,551 A 1/1973 Sved
3,746,626 A 7/1973 Morrison, Jr.
3,748,235 A 7/1973 Pries
3,784,034 A 1/1974 Thompson
3,788,236 A 1/1974 Edgar et al.
3,806,032 A 4/1974 Pries
3,811,572 A 5/1974 Tatterson
3,836,161 A 9/1974 Buhl
3,839,156 A 10/1974 Jakobi et al.
3,844,900 A 10/1974 Schulte
3,848,744 A 11/1974 Flaherty
3,857,758 A 12/1974 Mole
3,868,309 A 2/1975 Sustarsic et al.
3,875,016 A 4/1975 Schmidt-Balve
3,876,143 A 4/1975 Rossow et al.
3,876,506 A 4/1975 Dix et al.
3,878,053 A 4/1975 Hyde
3,894,302 A 7/1975 Lasater
3,897,312 A 7/1975 Armour et al.
3,897,313 A 7/1975 Ibaragi et al.
3,901,801 A 8/1975 Bixby
3,906,992 A 9/1975 Leach
3,912,091 A 10/1975 Thompson
3,912,597 A 10/1975 MacDonald
3,917,458 A 11/1975 Polak
3,928,144 A 12/1975 Jakimowicz
3,930,961 A 1/1976 Sustarsic et al.
3,933,443 A 1/1976 Lohrmann
3,957,591 A 5/1976 Riecker
3,959,084 A 5/1976 Price
3,963,582 A 6/1976 Helm et al.
3,969,191 A 7/1976 Bollenbach
3,975,148 A 8/1976 Fukuda et al.
3,979,870 A 9/1976 Moore
3,984,289 A 10/1976 Sustarsic et al.
3,990,948 A 11/1976 Lindgren
4,004,702 A 1/1977 Szendroi
4,004,983 A 1/1977 Pries
4,010,695 A 3/1977 Manitone
4,019,963 A 4/1977 Hanley, Jr.
4,025,395 A 5/1977 Ekholm et al.
4,040,910 A 8/1977 Knappstein et al.

(56) References Cited

U.S. PATENT DOCUMENTS 4,045,056 A 8/1977 Kandakov et al.
4,045,299 A 8/1977 McDonald
4,059,885 A 11/1977 Oldengott
4,065,059 A 12/1977 Jablin
4,067,462 A 1/1978 Thompson
4,077,848 A 3/1978 Grainer et al.
4,083,753 A 4/1978 Rogers et al.
4,086,231 A 4/1978 Ikio
4,093,245 A 6/1978 Connor
4,100,033 A 7/1978 Holter
4,100,491 A 7/1978 Newman, Jr. et al.
4,100,889 A 7/1978 Chayes
4,111,757 A 9/1978 Carimboli
4,120,790 A 10/1978 Tinker et al.
4,124,450 A 11/1978 MacDonald
4,131,070 A 12/1978 Jonnet
4,133,720 A 1/1979 Franzer et al.
4,135,948 A 1/1979 Mertens et al.
4,135,986 A 1/1979 Cain et al.
4,141,299 A 2/1979 Friend et al.
4,141,796 A 2/1979 Clark et al.
4,143,104 A 3/1979 van Konijnenburg et al.
4,145,195 A 3/1979 Knappstein et al.
4,147,230 A 4/1979 Ormond et al.
4,162,546 A 7/1979 Shortell et al.
4,176,013 A 11/1979 Garthus et al.
4,181,459 A 1/1980 Price
4,189,272 A 2/1980 Gregor et al.
4,194,951 A 3/1980 Pries
4,196,053 A 4/1980 Grohmann
4,196,054 A 4/1980 Becker, Jr. et al.
4,211,608 A 7/1980 Kwasnoski et al.
4,211,611 A 7/1980 Bocsanczy
4,213,489 A 7/1980 Cain
4,213,827 A 7/1980 Calderon
4,213,828 A 7/1980 Calderon
4,222,748 A 9/1980 Argo et al.
4,222,824 A 9/1980 Flockenhaus et al.
4,224,109 A 9/1980 Flockenhaus et al.
4,225,393 A 9/1980 Gregor et al.
4,226,113 A 10/1980 Pelletier et al.
4,230,498 A 10/1980 Ruecki
4,235,830 A 11/1980 Bennett et al.
4,236,998 A 12/1980 Heys
4,239,602 A 12/1980 La Bate
4,248,671 A 2/1981 Belding
4,249,997 A 2/1981 Schmitz
4,263,099 A 4/1981 Porter
4,268,360 A 5/1981 Tsuzuki et al.
4,271,814 A 6/1981 Lister
4,284,478 A 8/1981 Brommel
4,285,772 A 8/1981 Kress
4,287,024 A 9/1981 Thompson
4,289,479 A 9/1981 Johnson
4,289,584 A 9/1981 Chuss et al.
4,289,585 A 9/1981 Wagener et al.
4,296,938 A 10/1981 Offermann et al.
4,298,497 A 11/1981 Colombo
4,299,666 A 11/1981 Ostmann
4,302,935 A 12/1981 Cousimano
4,303,615 A 12/1981 Jarmell et al.
4,307,673 A 12/1981 Caughey
4,312,711 A 1/1982 Brown et al.
4,312,712 A 1/1982 Kwasnik et al.
4,314,787 A 2/1982 Kwasnik et al.
4,316,435 A 2/1982 Nagamatsu et al.
4,324,568 A 4/1982 Wilcox et al.
4,330,372 A 5/1982 Cairns et al.
4,334,963 A 6/1982 Stog
4,336,107 A 6/1982 Irwin
4,336,843 A 6/1982 Petty
4,340,445 A 7/1982 Kucher et al.
4,342,195 A 8/1982 Lo
4,344,820 A 8/1982 Thompson
4,344,822 A 8/1982 Schwartz et al.
4,353,189 A 10/1982 Thiersch et al.
4,366,029 A 12/1982 Bixby et al.
4,373,244 A 2/1983 Mertens et al.
4,375,388 A 3/1983 Hara et al.
4,385,962 A 5/1983 Stewen et al.
4,391,674 A 7/1983 Velmin et al.
4,392,824 A 7/1983 Struck et al.
4,394,217 A 7/1983 Holz et al.
4,395,269 A 7/1983 Schuler
4,396,394 A 8/1983 Li et al.
4,396,461 A 8/1983 Neubaum et al.
4,406,619 A 9/1983 Oldengott
4,406,856 A * 9/1983 Wilkins ................ B23P 19/022
294/86.12
4,407,237 A 10/1983 Merritt
4,421,070 A 12/1983 Sullivan
4,431,484 A 2/1984 Weber et al.
4,439,277 A 3/1984 Dix
4,440,098 A 4/1984 Adams
4,441,892 A 4/1984 Schuster
4,445,977 A 5/1984 Husher
4,446,018 A 5/1984 Cerwick
4,448,541 A 5/1984 Lucas
4,452,749 A 6/1984 Kolvek et al.
4,459,103 A 7/1984 Gieskieng
4,469,446 A 9/1984 Goodboy
4,474,344 A 10/1984 Bennett
4,487,137 A 12/1984 Horvat et al.
4,498,786 A 2/1985 Ruscheweyh
4,506,025 A 3/1985 Kleeb et al.
4,508,539 A 4/1985 Nakai
4,518,461 A 5/1985 Gelfand
4,527,488 A 7/1985 Lindgren
4,529,407 A 7/1985 Johnston et al.
4,564,420 A 1/1986 Spindeler et al.
4,568,424 A 2/1986 Bauer
4,568,426 A 2/1986 Orlando
4,570,670 A 2/1986 Johnson
4,614,567 A 9/1986 Stahlherm et al.
4,643,327 A 2/1987 Campbell
4,645,513 A 2/1987 Kubota et al.
4,655,193 A 4/1987 Blacket
4,655,804 A 4/1987 Kercheval et al.
4,666,675 A 5/1987 Parker et al.
4,680,167 A 7/1987 Orlando
4,681,662 A 7/1987 Kutsumura et al.
4,690,689 A 9/1987 Malcosky et al.
4,704,195 A 11/1987 Janicka et al.
4,720,262 A 1/1988 Durr et al.
4,724,976 A 2/1988 Lee
4,726,465 A 2/1988 Kwasnik et al.
4,732,652 A 3/1988 Durselen et al.
4,749,446 A 6/1988 van Laar et al.
4,793,981 A 12/1988 Doyle et al.
4,821,473 A 4/1989 Cowell
4,822,388 A 4/1989 Gee
4,824,614 A 4/1989 Jones et al.
4,889,698 A 12/1989 Moller et al.
4,898,021 A 2/1990 Weaver et al.
4,905,630 A * 3/1990 Weber ................... F22B 37/002
122/34
4,918,975 A 4/1990 Voss
4,919,170 A 4/1990 Kallinich et al.
4,929,179 A 5/1990 Breidenbach et al.
4,941,824 A 7/1990 Holter et al.
4,981,496 A 1/1991 Hausslein
5,013,408 A 5/1991 Asai et al.
5,052,922 A 10/1991 Stokman et al.
5,062,925 A 11/1991 Durselen et al.
5,078,822 A 1/1992 Hodges et al.
5,087,328 A 2/1992 Wegerer et al.
5,114,542 A 5/1992 Childress et al.
5,213,138 A 5/1993 Presz
5,227,106 A 7/1993 Kolvek
5,228,955 A 7/1993 Westbrook, III
5,234,601 A 8/1993 Janke et al.
5,318,671 A 6/1994 Pruitt
5,370,218 A 12/1994 Johnson et al.
5,394,600 A 3/1995 Chen

(56) References Cited

U.S. PATENT DOCUMENTS

| | | | | |
|---|---|---|---|---|
| 5,398,543 | A | 3/1995 | Fukushima et al. | |
| 5,423,152 | A | 6/1995 | Kolvek | |
| 5,447,606 | A | 9/1995 | Pruitt | |
| 5,480,594 | A | 1/1996 | Wilkerson et al. | |
| 5,514,849 | A * | 5/1996 | Findlan .................. | B23K 26/28 219/121.63 |
| 5,542,650 | A | 8/1996 | Abel et al. | |
| 5,597,452 | A | 1/1997 | Hippe et al. | |
| 5,603,810 | A | 2/1997 | Michler | |
| 5,622,280 | A | 4/1997 | Mays et al. | |
| 5,659,110 | A | 8/1997 | Herden et al. | |
| 5,670,025 | A | 9/1997 | Baird | |
| 5,687,768 | A | 11/1997 | Albrecht et al. | |
| 5,705,037 | A | 1/1998 | Reinke et al. | |
| 5,715,962 | A | 2/1998 | McDonnell | |
| 5,720,855 | A | 2/1998 | Baird | |
| 5,745,969 | A | 5/1998 | Yamada et al. | |
| 5,752,548 | A | 5/1998 | Matsumoto et al. | |
| 5,752,993 | A | 5/1998 | Eatough et al. | |
| 5,787,821 | A | 8/1998 | Bhat et al. | |
| 5,810,032 | A | 9/1998 | Hong et al. | |
| 5,816,210 | A | 10/1998 | Yamaguchi | |
| 5,857,308 | A | 1/1999 | Dismore et al. | |
| 5,881,551 | A | 3/1999 | Dang | |
| 5,913,448 | A | 6/1999 | Mann et al. | |
| 5,928,476 | A | 7/1999 | Daniels | |
| 5,966,886 | A | 10/1999 | Di Loreto | |
| 5,968,320 | A | 10/1999 | Sprague | |
| 6,002,993 | A | 12/1999 | Naito et al. | |
| 6,003,706 | A | 12/1999 | Rosen | |
| 6,017,214 | A | 1/2000 | Sturgulewski | |
| 6,019,070 | A * | 2/2000 | Duffy ...................... | F22B 37/50 122/209.1 |
| 6,022,112 | A | 2/2000 | Isler et al. | |
| 6,059,932 | A | 5/2000 | Sturgulewski | |
| 6,126,910 | A | 10/2000 | Wilhelm et al. | |
| 6,139,692 | A | 10/2000 | Tamura et al. | |
| 6,152,668 | A | 11/2000 | Knoch | |
| 6,156,688 | A | 12/2000 | Ando et al. | |
| 6,173,679 | B1 | 1/2001 | Bruckner et al. | |
| 6,187,148 | B1 | 2/2001 | Sturgulewski | |
| 6,189,819 | B1 | 2/2001 | Racine | |
| 6,247,231 | B1 * | 6/2001 | Findlan ..................... | B23P 6/00 165/76 |
| 6,290,494 | B1 | 9/2001 | Barkdoll | |
| 6,412,221 | B1 | 7/2002 | Emsbo | |
| 6,424,457 | B1 | 7/2002 | Koonmen et al. | |
| 6,495,268 | B1 | 12/2002 | Harth et al. | |
| 6,539,602 | B1 | 4/2003 | Ozawa et al. | |
| 6,596,128 | B2 | 7/2003 | Westbrook | |
| 6,626,984 | B1 | 9/2003 | Taylor | |
| 6,699,035 | B2 | 3/2004 | Brooker | |
| 6,712,576 | B2 | 3/2004 | Skarzenski et al. | |
| 6,758,875 | B2 | 7/2004 | Reid et al. | |
| 6,786,941 | B2 | 9/2004 | Reeves et al. | |
| 6,830,660 | B1 | 12/2004 | Yamauchi et al. | |
| 6,907,895 | B2 | 6/2005 | Johnson et al. | |
| 6,946,011 | B2 | 9/2005 | Snyder | |
| 6,964,236 | B2 | 11/2005 | Schucker | |
| 7,056,390 | B2 | 6/2006 | Fratello | |
| 7,077,892 | B2 | 7/2006 | Lee | |
| 7,314,060 | B2 | 1/2008 | Chen et al. | |
| 7,331,298 | B2 | 2/2008 | Barkdoll et al. | |
| 7,433,743 | B2 | 10/2008 | Pistikopoulos et al. | |
| 7,497,930 | B2 | 3/2009 | Barkdoll et al. | |
| 7,547,377 | B2 | 6/2009 | Inamasu et al. | |
| 7,611,609 | B1 | 11/2009 | Valia et al. | |
| 7,644,711 | B2 | 1/2010 | Creel | |
| 7,722,843 | B1 | 5/2010 | Srinivasachar | |
| 7,727,307 | B2 | 6/2010 | Winkler | |
| 7,785,447 | B2 | 8/2010 | Eatough et al. | |
| 7,803,627 | B2 | 9/2010 | Hodges et al. | |
| 7,823,401 | B2 | 11/2010 | Takeuchi et al. | |
| 7,827,689 | B2 | 11/2010 | Crane | |
| 7,998,316 | B2 | 8/2011 | Barkdoll | |
| 8,071,060 | B2 | 12/2011 | Ukai et al. | |
| 8,079,751 | B2 | 12/2011 | Kapila et al. | |
| 8,080,088 | B1 | 12/2011 | Srinivasachar | |
| 8,146,376 | B1 | 4/2012 | Williams et al. | |
| 8,152,970 | B2 | 4/2012 | Barkdoll et al. | |
| 8,172,930 | B2 | 5/2012 | Barkdoll | |
| 8,236,142 | B2 | 8/2012 | Westbrook | |
| 8,266,853 | B2 | 9/2012 | Bloom et al. | |
| 8,311,777 | B2 | 11/2012 | Suguira et al. | |
| 8,383,055 | B2 | 2/2013 | Palmer | |
| 8,398,935 | B2 | 3/2013 | Howell et al. | |
| 8,409,405 | B2 | 4/2013 | Kim et al. | |
| 8,500,881 | B2 | 8/2013 | Orita et al. | |
| 8,515,508 | B2 | 8/2013 | Kawamura et al. | |
| 8,568,568 | B2 | 10/2013 | Schuecker et al. | |
| 8,640,635 | B2 | 2/2014 | Bloom et al. | |
| 8,647,476 | B2 | 2/2014 | Kim et al. | |
| 8,800,795 | B2 | 8/2014 | Hwang | |
| 8,956,995 | B2 | 2/2015 | Masatsugu et al. | |
| 8,980,063 | B2 | 3/2015 | Kim et al. | |
| 9,039,869 | B2 | 5/2015 | Kim et al. | |
| 9,057,023 | B2 | 6/2015 | Reichelt et al. | |
| 9,103,234 | B2 | 8/2015 | Gu et al. | |
| 9,169,439 | B2 | 10/2015 | Sarpen et al. | |
| 9,193,913 | B2 | 11/2015 | Quanci et al. | |
| 9,193,915 | B2 | 11/2015 | West et al. | |
| 9,200,225 | B2 | 12/2015 | Barkdoll et al. | |
| 9,238,778 | B2 | 1/2016 | Quanci et al. | |
| 9,243,186 | B2 | 1/2016 | Quanci et al. | |
| 9,249,357 | B2 | 2/2016 | Quanci et al. | |
| 9,273,249 | B2 | 3/2016 | Quanci et al. | |
| 9,273,250 | B2 | 3/2016 | Choi et al. | |
| 9,321,965 | B2 | 4/2016 | Barkdoll | |
| 9,359,554 | B2 | 6/2016 | Quanci et al. | |
| 9,404,043 | B2 | 8/2016 | Kim | |
| 9,463,980 | B2 | 10/2016 | Fukada et al. | |
| 9,476,547 | B2 | 10/2016 | Quanci et al. | |
| 9,498,786 | B2 | 11/2016 | Pearson | |
| 9,580,656 | B2 | 2/2017 | Quanci et al. | |
| 9,672,499 | B2 | 6/2017 | Quanci et al. | |
| 9,683,740 | B2 | 6/2017 | Rodgers et al. | |
| 9,708,542 | B2 | 7/2017 | Quanci et al. | |
| 9,862,888 | B2 | 1/2018 | Quanci et al. | |
| 9,976,089 | B2 | 5/2018 | Quanci et al. | |
| 10,016,714 | B2 | 7/2018 | Quanci et al. | |
| 10,041,002 | B2 | 8/2018 | Quanci et al. | |
| 10,047,295 | B2 | 8/2018 | Chun et al. | |
| 10,047,296 | B2 | 8/2018 | Chun et al. | |
| 10,053,627 | B2 | 8/2018 | Sarpen et al. | |
| 10,087,579 | B2 | 10/2018 | Ottosson et al. | |
| 10,233,392 | B2 | 3/2019 | Quanci et al. | |
| 10,308,876 | B2 | 6/2019 | Quanci et al. | |
| 10,323,192 | B2 | 6/2019 | Quanci et al. | |
| 10,392,563 | B2 | 8/2019 | Kim et al. | |
| 10,435,042 | B1 | 10/2019 | Weymouth | |
| 10,526,541 | B2 | 1/2020 | West et al. | |
| 10,526,542 | B2 | 1/2020 | Quanci et al. | |
| 10,578,521 | B1 | 3/2020 | Dinakaran et al. | |
| 10,611,965 | B2 | 4/2020 | Quanci et al. | |
| 10,619,101 | B2 | 4/2020 | Quanci et al. | |
| 10,732,621 | B2 | 8/2020 | Cella et al. | |
| 10,760,002 | B2 | 9/2020 | Ball et al. | |
| 10,851,306 | B2 | 12/2020 | Crum et al. | |
| 10,877,007 | B2 | 12/2020 | Steele et al. | |
| 10,883,051 | B2 | 1/2021 | Quanci et al. | |
| 10,920,148 | B2 | 2/2021 | Quanci et al. | |
| 10,927,303 | B2 | 2/2021 | Choi et al. | |
| 10,947,455 | B2 | 3/2021 | Quanci et al. | |
| 10,968,393 | B2 | 4/2021 | West et al. | |
| 10,968,395 | B2 | 4/2021 | Quanci et al. | |
| 10,975,309 | B2 | 4/2021 | Quanci et al. | |
| 10,975,310 | B2 | 4/2021 | Quanci et al. | |
| 10,975,311 | B2 | 4/2021 | Quanci et al. | |
| 11,008,517 | B2 | 5/2021 | Chun et al. | |
| 11,008,518 | B2 | 5/2021 | Quanci | |
| 11,021,655 | B2 | 6/2021 | Quanci | |
| 11,053,444 | B2 | 7/2021 | Quanci et al. | |
| 11,060,032 | B2 | 7/2021 | Quanci et al. | |
| 11,071,935 | B2 | 7/2021 | Quanci | |

(56) References Cited

U.S. PATENT DOCUMENTS

| | | | |
|---|---|---|---|
| 11,098,252 B2 | 8/2021 | Quanci | |
| 11,117,087 B2 | 9/2021 | Quanci | |
| 11,142,699 B2 | 10/2021 | West et al. | |
| 11,186,778 B2 | 11/2021 | Crum et al. | |
| 11,193,069 B2 | 12/2021 | Quanci | |
| 11,214,739 B2 | 1/2022 | Quanci et al. | |
| 11,261,381 B2 | 3/2022 | Quanci | |
| 11,359,145 B2 | 6/2022 | Ball et al. | |
| 11,359,146 B2 | 6/2022 | Quanci et al. | |
| 11,365,355 B2 | 6/2022 | Quanci | |
| 11,395,989 B2 | 7/2022 | Quanci | |
| 11,441,077 B2 | 9/2022 | Quanci et al. | |
| 11,441,078 B2 | 9/2022 | Quanci et al. | |
| 11,486,572 B2 | 11/2022 | Quanci | |
| 11,505,747 B2 | 11/2022 | Quanci et al. | |
| 11,508,230 B2 | 11/2022 | Quanci et al. | |
| 11,597,881 B2 | 3/2023 | Quanci et al. | |
| 11,643,602 B2 | 5/2023 | Quanci et al. | |
| 11,680,208 B2 | 6/2023 | Quanci et al. | |
| 11,692,138 B2 | 7/2023 | Quanci et al. | |
| 2002/0170605 A1 | 11/2002 | Shiraishi et al. | |
| 2003/0014954 A1 | 1/2003 | Ronning et al. | |
| 2003/0015809 A1 | 1/2003 | Carson | |
| 2003/0057083 A1 | 3/2003 | Eatough et al. | |
| 2004/0016377 A1 | 1/2004 | Johnson et al. | |
| 2004/0220840 A1 | 11/2004 | Bonissone et al. | |
| 2005/0087767 A1 | 4/2005 | Fitzgerald et al. | |
| 2005/0096759 A1 | 5/2005 | Benjamin et al. | |
| 2006/0029532 A1 | 2/2006 | Breen et al. | |
| 2006/0102420 A1 | 5/2006 | Huber et al. | |
| 2006/0149407 A1 | 7/2006 | Markham et al. | |
| 2007/0087946 A1 | 4/2007 | Quest et al. | |
| 2007/0102278 A1 | 5/2007 | Inamasu et al. | |
| 2007/0116619 A1 | 5/2007 | Taylor et al. | |
| 2007/0181717 A1 | 8/2007 | Fuller | |
| 2007/0251198 A1 | 11/2007 | Witter | |
| 2008/0028935 A1 | 2/2008 | Andersson | |
| 2008/0116052 A1 | 5/2008 | Eatough et al. | |
| 2008/0179165 A1 | 7/2008 | Chen et al. | |
| 2008/0250863 A1 | 10/2008 | Moore | |
| 2008/0257236 A1 | 10/2008 | Green | |
| 2008/0271985 A1 | 11/2008 | Yamasaki | |
| 2008/0289305 A1 | 11/2008 | Girondi | |
| 2009/0007785 A1 | 1/2009 | Kimura et al. | |
| 2009/0032385 A1 | 2/2009 | Engle | |
| 2009/0105852 A1 | 4/2009 | Wintrich et al. | |
| 2009/0152092 A1 | 6/2009 | Kim et al. | |
| 2009/0162269 A1 | 6/2009 | Barger et al. | |
| 2009/0217576 A1 | 9/2009 | Kim et al. | |
| 2009/0257932 A1 | 10/2009 | Canari et al. | |
| 2009/0283395 A1 | 11/2009 | Hippe | |
| 2010/0015564 A1 | 1/2010 | Chun et al. | |
| 2010/0095521 A1 | 4/2010 | Kartal et al. | |
| 2010/0106310 A1 | 4/2010 | Grohman | |
| 2010/0113266 A1 | 5/2010 | Abe et al. | |
| 2010/0115912 A1 | 5/2010 | Worley | |
| 2010/0119425 A1 | 5/2010 | Palmer | |
| 2010/0159247 A1 | 6/2010 | Kaya et al. | |
| 2010/0181297 A1 | 7/2010 | Whysail | |
| 2010/0196597 A1 | 8/2010 | Di Loreto | |
| 2010/0276269 A1 | 11/2010 | Schuecker et al. | |
| 2010/0287871 A1 | 11/2010 | Bloom et al. | |
| 2010/0300867 A1 | 12/2010 | Kim et al. | |
| 2010/0314234 A1 | 12/2010 | Knoch et al. | |
| 2011/0000284 A1 | 1/2011 | Kumar et al. | |
| 2011/0014406 A1 | 1/2011 | Coleman et al. | |
| 2011/0048917 A1 | 3/2011 | Kim et al. | |
| 2011/0083314 A1 | 4/2011 | Baird | |
| 2011/0088600 A1 | 4/2011 | McRae | |
| 2011/0100273 A1 | 5/2011 | Ptacek | |
| 2011/0120852 A1 | 5/2011 | Kim | |
| 2011/0144406 A1 | 6/2011 | Masatsugu et al. | |
| 2011/0156902 A1 | 6/2011 | Wang et al. | |
| 2011/0162265 A1 | 7/2011 | Krumpp et al. | |
| 2011/0168482 A1 | 7/2011 | Merchant et al. | |
| 2011/0174301 A1 | 7/2011 | Haydock et al. | |
| 2011/0192395 A1 | 8/2011 | Kim | |
| 2011/0198206 A1 | 8/2011 | Kim et al. | |
| 2011/0223088 A1 | 9/2011 | Chang et al. | |
| 2011/0253521 A1 | 10/2011 | Kim | |
| 2011/0272508 A1 | 11/2011 | Krebs et al. | |
| 2011/0291827 A1 | 12/2011 | Baldocchi et al. | |
| 2011/0313218 A1 | 12/2011 | Dana | |
| 2011/0315538 A1 | 12/2011 | Kim et al. | |
| 2012/0031076 A1 | 2/2012 | Frank et al. | |
| 2012/0125709 A1 | 5/2012 | Merchant et al. | |
| 2012/0152720 A1 | 6/2012 | Reichelt et al. | |
| 2012/0177541 A1 | 7/2012 | Mutsuda et al. | |
| 2012/0179421 A1 | 7/2012 | Dasgupta | |
| 2012/0180133 A1 | 7/2012 | Ai-Harbi et al. | |
| 2012/0195815 A1 | 8/2012 | Moore et al. | |
| 2012/0210635 A1 | 8/2012 | Edwards | |
| 2012/0228115 A1 | 9/2012 | Westbrook | |
| 2012/0247939 A1 | 10/2012 | Kim et al. | |
| 2012/0285080 A1 | 11/2012 | Despen et al. | |
| 2012/0305380 A1 | 12/2012 | Wang et al. | |
| 2012/0312019 A1 | 12/2012 | Rechtman | |
| 2013/0020781 A1 | 1/2013 | Kishikawa | |
| 2013/0045149 A1 | 2/2013 | Miller | |
| 2013/0213114 A1 | 8/2013 | Wetzig et al. | |
| 2013/0216717 A1 | 8/2013 | Rago et al. | |
| 2013/0220373 A1 | 8/2013 | Kim | |
| 2013/0306462 A1 | 11/2013 | Kim et al. | |
| 2014/0039833 A1 | 2/2014 | Sharpe, Jr. et al. | |
| 2014/0041359 A1* | 2/2014 | Albrecht ................. | F01K 13/02 60/39.182 |
| 2014/0156584 A1 | 6/2014 | Motukuri et al. | |
| 2014/0208997 A1 | 7/2014 | Alferyev et al. | |
| 2014/0224123 A1 | 8/2014 | Walters | |
| 2014/0245803 A1 | 9/2014 | Forsythe et al. | |
| 2014/0308620 A1 | 10/2014 | Deng et al. | |
| 2015/0041304 A1 | 2/2015 | Kiim et al. | |
| 2015/0075962 A1 | 3/2015 | Shimoyama et al. | |
| 2015/0122629 A1 | 5/2015 | Freimuth et al. | |
| 2015/0143908 A1 | 5/2015 | Cetinkaya | |
| 2015/0175433 A1 | 6/2015 | Micka et al. | |
| 2015/0176095 A1 | 6/2015 | Connors et al. | |
| 2015/0219530 A1 | 8/2015 | Li et al. | |
| 2015/0226499 A1 | 8/2015 | Mikkelsen | |
| 2015/0330866 A1* | 11/2015 | Yang ......................... | G06T 7/75 73/112.02 |
| 2016/0026193 A1 | 1/2016 | Rhodes et al. | |
| 2016/0048139 A1 | 2/2016 | Samples et al. | |
| 2016/0149944 A1 | 5/2016 | Obermeirer et al. | |
| 2016/0154171 A1 | 6/2016 | Kato et al. | |
| 2016/0370082 A1 | 12/2016 | Olivo | |
| 2016/0377430 A1 | 12/2016 | Kalagnanam et al. | |
| 2017/0173519 A1 | 6/2017 | Naito | |
| 2017/0182447 A1 | 6/2017 | Sappok et al. | |
| 2017/0218274 A1 | 8/2017 | Yu et al. | |
| 2017/0226425 A1 | 8/2017 | Kim et al. | |
| 2017/0261417 A1 | 9/2017 | Zhang | |
| 2017/0313943 A1 | 11/2017 | Valdevies | |
| 2019/0317167 A1 | 10/2019 | LaBorde et al. | |
| 2020/0071190 A1 | 3/2020 | Wiederin et al. | |
| 2020/0139273 A1 | 5/2020 | Badiei | |
| 2020/0173679 A1 | 6/2020 | O'Reilly et al. | |
| 2020/0208059 A1 | 7/2020 | Quanci | |
| 2020/0208063 A1 | 7/2020 | Quanci | |
| 2021/0130697 A1 | 5/2021 | Quanci et al. | |
| 2021/0163823 A1 | 6/2021 | Quanci et al. | |
| 2021/0198579 A1 | 7/2021 | Quanci et al. | |
| 2021/0261877 A1 | 8/2021 | Despen et al. | |
| 2021/0340454 A1 | 11/2021 | Quanci et al. | |
| 2021/0363426 A1 | 11/2021 | West et al. | |
| 2021/0363427 A1 | 11/2021 | Quanci et al. | |
| 2021/0388270 A1 | 12/2021 | Choi et al. | |
| 2022/0056342 A1 | 2/2022 | Quanci et al. | |
| 2022/0204858 A1 | 6/2022 | West et al. | |
| 2022/0204859 A1 | 6/2022 | Crum et al. | |
| 2022/0226766 A1 | 7/2022 | Quanci et al. | |
| 2022/0228082 A1 | 7/2022 | Mennell et al. | |
| 2022/0251452 A1 | 8/2022 | Quanci et al. | |
| 2022/0298423 A1 | 9/2022 | Quanci et al. | |

(56) References Cited

U.S. PATENT DOCUMENTS

| | | | |
|---|---|---|---|
| 2022/0340818 | A1 | 10/2022 | Mennell et al. |
| 2022/0356410 | A1 | 11/2022 | Quanci et al. |
| 2023/0012031 | A1 | 1/2023 | Quanci et al. |
| 2023/0142380 | A1 | 5/2023 | Quanci et al. |
| 2023/0147916 | A1 | 5/2023 | Quanci et al. |
| 2023/0330596 | A1 | 10/2023 | Bumb et al. |
| 2023/0360511 | A1 | 11/2023 | Quanci et al. |
| 2023/0416629 | A1 | 12/2023 | Quanci et al. |
| 2024/0110103 | A1 | 4/2024 | Quanci et al. |
| 2025/0161988 | A1 | 5/2025 | Quanci |
| 2025/0163328 | A1 | 5/2025 | Choi et al. |
| 2025/0163329 | A1 | 5/2025 | Choi et al. |
| 2025/0163339 | A1 | 5/2025 | Quanci et al. |
| 2025/0187018 | A1 | 6/2025 | Quanci et al. |
| 2025/0188353 | A1 | 6/2025 | Quanci et al. |
| 2025/0250489 | A1 | 8/2025 | Quanci et al. |
| 2025/0263806 | A1 | 8/2025 | Quanci et al. |
| 2025/0380024 | A1 | 12/2025 | Quanci et al. |

FOREIGN PATENT DOCUMENTS

| | | | | | |
|---|---|---|---|---|---|
| CA | 2775992 | | | 5/2011 | |
| CA | 2822841 | | | 7/2012 | |
| CA | 2822857 | | | 7/2012 | |
| CA | 2905110 | A1 | | 9/2014 | |
| CN | 87212113 | U | | 6/1988 | |
| CN | 87107195 | A | | 7/1988 | |
| CN | 2064363 | U | | 10/1990 | |
| CN | 2139121 | Y | | 7/1993 | |
| CN | 1092457 | A | | 9/1994 | |
| CN | 1255528 | A | | 6/2000 | |
| CN | 1270983 | A | | 10/2000 | |
| CN | 2528771 | Y | | 2/2002 | |
| CN | 1358822 | A | | 7/2002 | |
| CN | 2521473 | Y | | 11/2002 | |
| CN | 1425742 | A | | 6/2003 | |
| CN | 1468364 | A | | 1/2004 | |
| CN | 1527872 | A | | 9/2004 | |
| CN | 2668641 | | | 1/2005 | |
| CN | 1957204 | A | | 5/2007 | |
| CN | 101037603 | A | | 9/2007 | |
| CN | 101058731 | A | | 10/2007 | |
| CN | 101157874 | A | | 4/2008 | |
| CN | 101211495 | A | | 7/2008 | |
| CN | 201121178 | Y | | 9/2008 | |
| CN | 101362971 | A | | 2/2009 | |
| CN | 101395248 | A | | 3/2009 | |
| CN | 100510004 | C | | 7/2009 | |
| CN | 101486017 | A | | 7/2009 | |
| CN | 201264981 | Y | | 7/2009 | |
| CN | 101497835 | A | | 8/2009 | |
| CN | 101509427 | A | | 8/2009 | |
| CN | 101864323 | A | | 10/2010 | |
| CN | 101886466 | A | | 11/2010 | |
| CN | 101910530 | A | | 12/2010 | |
| CN | 101921643 | A | | 12/2010 | |
| CN | 102072829 | A | | 5/2011 | |
| CN | 102155300 | A | | 8/2011 | |
| CN | 2509188 | Y | | 11/2011 | |
| CN | 202226816 | | | 5/2012 | |
| CN | 202265541 | U | | 6/2012 | |
| CN | 102584294 | A | | 7/2012 | |
| CN | 202415446 | U | | 9/2012 | |
| CN | 202470353 | U | | 10/2012 | |
| CN | 103399536 | A | | 11/2013 | |
| CN | 103468289 | A | | 12/2013 | |
| CN | 103468841 | A | | 12/2013 | |
| CN | 103756699 | A | | 4/2014 | |
| CN | 103913193 | A | | 7/2014 | |
| CN | 203981700 | U | | 12/2014 | |
| CN | 104498059 | A | | 4/2015 | |
| CN | 104877690 | A | | 9/2015 | |
| CN | 104915746 | A | | 9/2015 | |
| CN | 105001914 | A | | 10/2015 | |
| CN | 105137947 | A | | 12/2015 | |
| CN | 105189704 | A | | 12/2015 | |
| CN | 105264448 | A | | 1/2016 | |
| CN | 105467949 | A | | 4/2016 | |
| CN | 105710028 | A | | 6/2016 | |
| CN | 105842065 | A | | 8/2016 | |
| CN | 106399607 | A | | 2/2017 | |
| CN | 205979692 | U | * | 2/2017 | |
| CN | 106661456 | A | | 5/2017 | |
| CN | 106687564 | A | | 5/2017 | |
| CN | 107022359 | A | | 8/2017 | |
| CN | 107267183 | A | | 10/2017 | |
| CN | 107445633 | A | | 12/2017 | |
| CN | 108219807 | A | | 6/2018 | |
| CN | 105733624 | B | | 2/2019 | |
| CN | 110141947 | A | | 8/2019 | |
| CN | 100500619 | C | | 6/2020 | |
| CN | 111621313 | A | | 9/2020 | |
| CN | 111621314 | A | | 9/2020 | |
| CN | 111778048 | A | | 10/2020 | |
| CN | 113088310 | A | | 7/2021 | |
| CN | 113322085 | A | | 8/2021 | |
| CN | 113462415 | A | | 10/2021 | |
| CN | 215964738 | U | | 3/2022 | |
| CN | 216126086 | U | | 3/2022 | |
| CN | 114517099 | A | | 5/2022 | |
| CN | 101921643 | B | | 12/2022 | |
| CN | 116606664 | A | | 8/2023 | |
| CN | 220825067 | U | | 4/2024 | |
| DE | 201729 | C | | 9/1908 | |
| DE | 212176 | | | 7/1909 | |
| DE | 912453 | C | | 5/1954 | |
| DE | 1103949 | B | | 6/1961 | |
| DE | 1212037 | B | | 3/1966 | |
| DE | 2212544 | A | | 1/1973 | |
| DE | 2720688 | A1 | | 11/1978 | |
| DE | 2842872 | A1 | * | 1/1980 | |
| DE | 3231697 | C1 | | 1/1984 | |
| DE | 3328702 | A1 | | 2/1984 | |
| DE | 3315738 | C2 | | 3/1984 | |
| DE | 3329367 | C | | 11/1984 | |
| DE | 3407487 | C1 | | 6/1985 | |
| DE | 19545736 | | | 6/1997 | |
| DE | 19803455 | | | 8/1999 | |
| DE | 10122531 | A1 | | 11/2002 | |
| DE | 10154785 | | | 5/2003 | |
| DE | 102004062936 | A1 | | 7/2006 | |
| DE | 102005015301 | | | 10/2006 | |
| DE | 102006004669 | | | 8/2007 | |
| DE | 102006026521 | | | 12/2007 | |
| DE | 102009031436 | | | 1/2011 | |
| DE | 102011052785 | | | 12/2012 | |
| DE | 102011121204 | A1 | * | 6/2013 | ............ F22B 37/107 |
| EA | 010510 | B1 | | 10/2008 | |
| EP | 0126399 | A1 | | 11/1984 | |
| EP | 0208490 | A1 | | 1/1987 | |
| EP | 0418801 | A1 | | 3/1991 | |
| EP | 0433498 | A1 | | 6/1991 | |
| EP | 0477066 | A1 | * | 3/1992 | |
| EP | 0903393 | A2 | | 3/1999 | |
| EP | 1538503 | A1 | | 6/2005 | |
| EP | 1860034 | A1 | | 11/2007 | |
| EP | 2112215 | A2 | | 10/2009 | |
| EP | 2295129 | A1 | | 3/2011 | |
| EP | 2468837 | A1 | | 6/2012 | |
| FR | 2339664 | | | 8/1977 | |
| FR | 2471550 | A1 | * | 6/1981 | |
| FR | 2517802 | | | 6/1983 | |
| FR | 2764978 | | | 12/1998 | |
| GB | 364236 | A | | 1/1932 | |
| GB | 368649 | A | | 3/1932 | |
| GB | 441784 | | | 1/1936 | |
| GB | 606340 | | | 8/1948 | |
| GB | 611524 | | | 11/1948 | |
| GB | 725865 | | | 3/1955 | |
| GB | 783720 | A | | 9/1957 | |
| GB | 871094 | | | 6/1961 | |
| GB | 923205 | A | | 5/1963 | |
| GB | 977905 | A | | 12/1964 | |
| GB | 1148379 | A | | 4/1969 | |

(56) References Cited

FOREIGN PATENT DOCUMENTS

| | | | | | |
|---|---|---|---|---|---|
| GB | 2000193 | A | | 1/1979 | |
| JP | S50148405 | | | 11/1975 | |
| JP | S5319301 | A | | 2/1978 | |
| JP | 54054101 | | | 4/1979 | |
| JP | S5453103 | A | | 4/1979 | |
| JP | 57051786 | | | 3/1982 | |
| JP | 57051787 | | | 3/1982 | |
| JP | 57083585 | | | 5/1982 | |
| JP | 57090092 | | | 6/1982 | |
| JP | S57172978 | A | | 10/1982 | |
| JP | 58091788 | | | 5/1983 | |
| JP | 59051978 | | | 3/1984 | |
| JP | 59053589 | | | 3/1984 | |
| JP | 59071388 | | | 4/1984 | |
| JP | 59108083 | | | 6/1984 | |
| JP | 59145281 | | | 8/1984 | |
| JP | 60004588 | | | 1/1985 | |
| JP | 61106690 | | | 5/1986 | |
| JP | 62011794 | | | 1/1987 | |
| JP | 62285980 | | | 12/1987 | |
| JP | 01103694 | | | 4/1989 | |
| JP | 01249886 | | | 10/1989 | |
| JP | H0319127 | | | 3/1991 | |
| JP | 03197588 | | | 8/1991 | |
| JP | 04159392 | | | 6/1992 | |
| JP | H04178494 | A | | 6/1992 | |
| JP | H05230466 | A | | 9/1993 | |
| JP | H0649450 | A | | 2/1994 | |
| JP | H0654753 | U | | 7/1994 | |
| JP | H06264062 | | | 9/1994 | |
| JP | H06299156 | A | | 10/1994 | |
| JP | H0776713 | A | | 3/1995 | |
| JP | 07188668 | | | 7/1995 | |
| JP | 07216357 | | | 8/1995 | |
| JP | H07204432 | | | 8/1995 | |
| JP | H07252480 | A | | 10/1995 | |
| JP | H0843314 | A | | 2/1996 | |
| JP | H08104875 | A | | 4/1996 | |
| JP | 08127778 | | | 5/1996 | |
| JP | H08218071 | A | | 8/1996 | |
| JP | H09310074 | A | | 12/1997 | |
| JP | H10273672 | A | | 10/1998 | |
| JP | H11131074 | | | 5/1999 | |
| JP | H11256166 | A | | 9/1999 | |
| JP | 2000204373 | A | | 7/2000 | |
| JP | 2000219883 | A | | 8/2000 | |
| JP | 2001055576 | A | | 2/2001 | |
| JP | 2001187887 | A | | 7/2001 | |
| JP | 2001200258 | | | 7/2001 | |
| JP | 2002097472 | A | | 4/2002 | |
| JP | 2002106941 | | | 4/2002 | |
| JP | 2003041258 | | | 2/2003 | |
| JP | 2003041618 | A | | 2/2003 | |
| JP | 2003051082 | A | | 2/2003 | |
| JP | 2003071313 | A | | 3/2003 | |
| JP | 2003292968 | A | | 10/2003 | |
| JP | 2003342581 | A | | 12/2003 | |
| JP | 2004169016 | A | | 6/2004 | |
| JP | 2005503448 | A | | 2/2005 | |
| JP | 2005135422 | A | | 5/2005 | |
| JP | 2005154597 | A | | 6/2005 | |
| JP | 2005263983 | A | | 9/2005 | |
| JP | 2005344085 | A | | 12/2005 | |
| JP | 2006188608 | A | | 7/2006 | |
| JP | 2006257252 | A | | 9/2006 | |
| JP | 2007063420 | A | | 3/2007 | |
| JP | 3924064 | B2 | | 6/2007 | |
| JP | 2007169484 | A | | 7/2007 | |
| JP | 2007231326 | A | | 9/2007 | |
| JP | 4101226 | B2 | | 6/2008 | |
| JP | 2008231278 | A | | 10/2008 | |
| JP | 2009001640 | A | | 1/2009 | |
| JP | 2009019106 | A | | 1/2009 | |
| JP | 2009073864 | A | | 4/2009 | |
| JP | 2009073865 | A | | 4/2009 | |
| JP | 2009135276 | A | | 6/2009 | |
| JP | 2009144121 | | | 7/2009 | |
| JP | 2009209286 | A | | 9/2009 | |
| JP | 2010229239 | A | | 10/2010 | |
| JP | 2010248389 | A | | 11/2010 | |
| JP | 2011504947 | A | | 2/2011 | |
| JP | 2011068733 | A | | 4/2011 | |
| JP | 2011102351 | A | | 5/2011 | |
| JP | 2012072389 | A | | 4/2012 | |
| JP | 2012102302 | | | 5/2012 | |
| JP | 2012102325 | A | | 5/2012 | |
| JP | 2013006957 | A | | 1/2013 | |
| JP | 2013510910 | | | 3/2013 | |
| JP | 2013127356 | A | * | 6/2013 | ............ F22B 37/107 |
| JP | 2013189322 | A | | 9/2013 | |
| JP | 2014009284 | A | | 1/2014 | |
| JP | 2014040502 | A | | 3/2014 | |
| JP | 2015094091 | A | | 5/2015 | |
| JP | 2015199791 | A | | 11/2015 | |
| JP | 2016169897 | A | | 9/2016 | |
| JP | 2020007472 | A | | 1/2020 | |
| KR | 820002031 | B1 | * | 10/1982 | |
| KR | 1019960008754 | | | 10/1996 | |
| KR | 19990017156 | U | | 5/1999 | |
| KR | 1019990054426 | | | 7/1999 | |
| KR | 20000042375 | A | | 7/2000 | |
| KR | 100296700 | B1 | | 10/2001 | |
| KR | 20030011016 | A | | 2/2003 | |
| KR | 20030012458 | A | | 2/2003 | |
| KR | 1020040020883 | A | | 3/2004 | |
| KR | 20040107204 | A | | 12/2004 | |
| KR | 20050053861 | A | | 6/2005 | |
| KR | 20060132336 | A | | 12/2006 | |
| KR | 100737393 | B1 | | 7/2007 | |
| KR | 100797852 | | | 1/2008 | |
| KR | 20080069170 | A | | 7/2008 | |
| KR | 20110010452 | A | | 2/2011 | |
| KR | 101314288 | | | 4/2011 | |
| KR | 20120033091 | A | | 4/2012 | |
| KR | 20130050807 | | | 5/2013 | |
| KR | 101318388 | | | 10/2013 | |
| KR | 20140042526 | A | | 4/2014 | |
| KR | 20140076155 | A | | 6/2014 | |
| KR | 101431048 | B1 | * | 8/2014 | |
| KR | 20150011084 | A | | 1/2015 | |
| KR | 20150068557 | A | | 6/2015 | |
| KR | 20170038102 | A | | 4/2017 | |
| KR | 20170058808 | A | | 5/2017 | |
| KR | 20170103857 | A | | 9/2017 | |
| KR | 101862491 | B1 | | 5/2018 | |
| KR | 102116995 | B1 | * | 6/2020 | ....... H01L 21/67051 |
| KR | 20230118420 | A | | 8/2023 | |
| RU | 2083532 | C1 | | 7/1997 | |
| RU | 2441898 | C2 | | 2/2012 | |
| RU | 2493233 | C2 | | 9/2013 | |
| RU | 2613501 | C1 | | 3/2017 | |
| SU | 1535880 | A1 | | 1/1990 | |
| TW | 201241166 | A1 | | 10/2012 | |
| TW | 201245431 | A1 | | 11/2012 | |
| UA | 50580 | | | 10/2002 | |
| WO | WO9012074 | | | 10/1990 | |
| WO | WO9945083 | | | 9/1999 | |
| WO | WO02062922 | | | 8/2002 | |
| WO | WO2003025093 | | | 3/2003 | |
| WO | WO2005023649 | | | 3/2005 | |
| WO | WO2005031297 | | | 4/2005 | |
| WO | WO2005115583 | | | 12/2005 | |
| WO | 2006010432 | A1 | | 2/2006 | |
| WO | WO2007103649 | | | 9/2007 | |
| WO | WO2008034424 | | | 3/2008 | |
| WO | WO2008105269 | | | 9/2008 | |
| WO | WO2009147983 | | | 12/2009 | |
| WO | WO2010032734 | | | 3/2010 | |
| WO | WO2010103992 | | | 9/2010 | |
| WO | WO2011000447 | | | 1/2011 | |
| WO | WO2011126043 | | | 10/2011 | |
| WO | 2012037454 | A2 | | 3/2012 | |
| WO | WO2012029979 | | | 3/2012 | |
| WO | WO2012031726 | | | 3/2012 | |

(56) References Cited

FOREIGN PATENT DOCUMENTS

| | | | |
|---|---|---|---|
| WO | WO2013023872 | | 2/2013 |
| WO | WO2010107513 | | 9/2013 |
| WO | WO2013145679 | | 10/2013 |
| WO | WO2013153557 | | 10/2013 |
| WO | WO2014021909 | | 2/2014 |
| WO | WO2014043667 | | 3/2014 |
| WO | WO2014105064 | | 7/2014 |
| WO | WO2014153050 | | 9/2014 |
| WO | WO2016004106 | | 1/2016 |
| WO | WO2016033511 | | 3/2016 |
| WO | WO2016033515 | | 3/2016 |
| WO | WO2016086322 | | 6/2016 |
| WO | 2016109699 | A1 | 7/2016 |
| WO | WO2016109854 | | 7/2016 |
| WO | 2016170439 | A1 | 10/2016 |
| WO | 2021225988 | A1 | 11/2021 |
| WO | WO2022159604 | | 7/2022 |
| WO | WO2022235839 | | 11/2022 |
| WO | 2023129090 | A2 | 7/2023 |

OTHER PUBLICATIONS

U.S. Appl. No. 18/469,704, filed Sep. 19, 2023, Crum et al.
U.S. Appl. No. 18/473,135, filed Sep. 22, 2023, Quanci et al.
U.S. Appl. No. 18/473,143, filed Sep. 22, 2023, Quanci et al.
U.S. Appl. No. 18/483,019, filed Oct. 9, 2023, West et al.
U.S. Appl. No. 18/486,021, filed Oct. 12, 2023, Quanci et al.
U.S. Appl. No. 18/492,913, filed Oct. 24, 2023, Quanci et al.
U.S. Appl. No. 18/501,488, filed Nov. 3, 2023, Quanci et al.
U.S. Appl. No. 18/501,795, filed Nov. 3, 2023, Quanci et al.
U.S. Appl. No. 18/506,616, filed Nov. 10, 2023, Quanci et al.
U.S. Appl. No. 18/506,746, filed Nov. 10, 2023, Quanci et al.
U.S. Appl. No. 18/511,148, filed Nov. 16, 2023, Quanci et al.
U.S. Appl. No. 18/511,621, filed Nov. 16, 2023, Quanci et al.
U.S. Appl. No. 18/584,320, filed Feb. 22, 2024, West et al.
U.S. Appl. No. 18/586,236, filed Feb. 23, 2024, Quanci et al.
Item HT 56107 Briquette, 'H' Type Household or Domestic Use, SECV Brown Coal Mine, Yallourn, Victoria, circa 1925, Museums Victoria Collections, https://collections.museumsvictoria.com.au/items/2286568, published on Mar. 2, 2021; 3 pages.
Chaudhari, K., Cupola Furnace, engineersgalary.com Jan. 24, 2016; 4 pages.
Ishiwata, et al. "Effect of coke diameter and oxygen concentration of blast on cupola operation." ISIJ International, 2011, vol. 51, pp. 1353-1359.
Ivanova, V. A. "Analysis of the requirements for foundry coke." IOP Conference Series: Materials Science and Engineering, 2020, vol. 986, pp. 1-6.
Office of the Federal Register, National Archives and Records Administration. (Apr. 14, 2005). 70 FR 19992—National Emission Standards for Coke Oven Batteries. [Government]. Office of the Federal Register, National Archives and Records Administration. https://www.govinfo.gov/app/details/FR-2005-04-15/05-6942.
Pearson, D.E., "Influence of Geology on CSR (Coke Strength After Reaction with C02)," 2009, 8 pages.
Powell, et al. "Cupola Furnaces", ASM International, downloaded from http://dl.asminternational.org/handbooks/edited-volume/chapter-pdf/501030/a0005197.pdf; 9 pages.
U.S. Appl. No. 18/892,228, filed Sep. 20, 2024, Quanci et al.
Schlueter, R. "What's so good about coke made from coal, Aug. 29, 2016," Belleview News-Democrat, Rschuleter@bnd.com; 4 pages.
Seal School, Coal v. Coke|Fast differences and Comparison. Viewable on YouTube (Year:2020).
U.S. Appl. No. 18/770,274, filed Jul. 11, 2024, Quanci et al.
U.S. Appl. No. 18/793,631, filed Aug. 2, 2024, Quanci et al.
U.S. Appl. No. 17/947,520, filed Sep. 19, 2022, Quanci et al.
U.S. Appl. No. 17/967,615, filed Oct. 17, 2022, Quanci et al.
U.S. Appl. No. 18/047,916, filed Oct. 19, 2022, Quanci et al.
U.S. Appl. No. 18/168,142, filed Feb. 13, 2023, Quanci et al.
U.S. Appl. No. 18/313,647, filed May 8, 2023, Quanci et al.
U.S. Appl. No. 18/321,530, filed May 22, 2023, Quanci et al.
U.S. Appl. No. 18/363,465, filed Aug. 1, 2023, Quanci et al.
U.S. Appl. No. 18/363,508, filed Aug. 1, 2023, Choi et al.
U.S. Appl. No. 18/366,244, filed Aug. 7, 2023, Quanci et al.
"ASBESTOS", Virginia Department of Health, https://www.vdh.virginia.gov/environmental-health/public-health-toxicology/asbestos/, updated 2023, 2 pages.
ASTM D5341-99(2010)e1, Standard Test Method for Measuring Coke Reactivity Index (CRI) and Coke Strength After Reaction (CSR), ASTM International, West Conshohocken, PA, 2010.
Astrom, et al., "Feedback Systems: An Introduction for Scientists and Engineers," Sep. 16, 2006, available on line at http://people/duke.edu/-hpgavin/SystemID/References/Astrom-Feedback-2006.pdf ; 404 pages.
Basset et al., "Calculation of steady flow pressure loss coefficients for pipe junctions," Proc Instn Mech Engrs., vol. 215, Part C, p. 861-881 IMechIE 2001.
Beckman et al., "Possibilities and limits of cutting back coking plant output," Stahl Und Eisen, Verlag Stahleisen, Dusseldorf, DE, vol. 130, No. 8, Aug. 16, 2010, pp. 57-67.
Bloom, et al., "Modular cast block - The future of coke oven repairs," Iron & Steel Technol, AIST, Warrendale, PA, vol. 4, No. 3, Mar. 1, 2007, pp. 61-64.
Boyes, Walt. (2003), Instrumentation Reference Book (3rd Edition)—34.7.4.6 Infrared and Thermal Cameras, Elsevier. Online version available at: https://app.knovel.com/hotlink/pdf/id:kt004QMGV6/instrumentation-reference-2/ditigal-video.
"Ceramic fibers wool - to 1,300°C", gTeek, Dec. 29, 2017 (date obtained from google search tools), https://www.gteek.com/ceramic-fibers-wool-to1-300-%C2%BOC, 15 pages.
Clean coke process: process development studies by USS Engineers and Consultants, Inc., Wisconsin Tech Search, request date Oct. 5, 2011, 17 pages.
"Conveyor Chain Designer Guild", Mar. 27, 2014 (date obtained from wayback machine), Renold.com, Section 4, available online at: http://www.renold/com/upload/renoldswitzerland/conveyor_chain_-_designer_guide.pdf.
Costa, et al., "Edge Effects on the Flow Characteristics in a 90 deg Tee Junction," Transactions of the ASME, Nov. 2006, vol. 128, pp. 1204-1217.
Crelling, et al., "Effects of Weathered Coal on Coking Properties and Coke Quality", Fuel, 1979, vol. 58, Issue 7, pp. 542-546.
Database WPI, Week 199115, Thomson Scientific, Lond, GB; An 1991-107552.
De CORDOVA, et al. "Coke oven life prolongation - A multidisciplinary approach." 10.5151/2594-357X-2610 (2015) 12 pages.
Diez, et al., "Coal for Metallurgical Coke Production: Predictions of Coke Quality and Future Requirements for Cokemaking", International Journal of Coal Geology, 2002, vol. 50, Issue 1- 4, pp. 389-412.
"High Alumina Cement-Manufacture, Characteristics and Uses," TheConstructor.org, https://theconstructor.org/concrete/high-alumina-cement/23686/; 12 pages.
"How Glass Is Made," Corning, https://www.corning.com/worldwide/en/innovation/materials-science/glass/how-glass-made.html, 2 pages.
Industrial Furnace Design Handbook, Editor-in-Chief: First Design Institute of First Ministry of Machinery Industry, Beijing: Mechanical Industry Press, pp. 180-183, Oct. 1981.
Joseph, B., "A tutorial on inferential control and its applications," Proceedings of the 1999 American Control Conference (Cat. No. 99CH36251), San Diego, CA, 1999, pp. 3106-3118 vol. 5.
Kerlin, Thomas (1999), Practical Thermocouple Thermometry—1.1 The Thermocouple. ISA. Online version available at https:app.knovel.com/pdf/id:kt007XPTM3/practical-thermocouple/the-thermocouple.
Kochanski et al., "Overview of Uhde Heat Recovery Cokemaking Technology," AISTech Iron and Steel Technology Conference Proceedings, Association for Iron and Steel Technology, U.S., vol. 1, Jan. 1, 2005, pp. 25-32.
Knoerzer et al. "Jewell-Thompson Non-Recovery Cokemaking", Steel Times, Fuel & Metallurgical Journals Ltd. London, GB, vol. 221, No. 4, Apr. 1, 1993, pp. 172-173,184.

(56) References Cited

OTHER PUBLICATIONS

Kusiorowski, et al., "Thermal decomposition of different types of absestos, "Journal of Thermal Analysis and Calorimetry . Feb. 2012, 109, 693-704 (2012).
Lin, Rongying et al., "Study on the synergistic effect of calcium and aluminum on improving ash fusion temperature of semi-coke," International Journal of Coal Preparation and Utilization, May 31, 2019 (published online), vol. 42, No. 3, pp. 556-564.
Lipunov, et al. "Diagnostics of the Heating System and Lining of Coke Ovens," Coke and Chemistry, 2014, Vopl. 57, No. 12, pp. 489-492.
Madias, et al., "A review on stamped charging of coals" (2013). Available at https://www.researchgate.net/publication/263887759_A_review_on_stamped_charging_of_coals.
Metallurgical Coke MSDS, ArcelorMittal, May 30, 2011, available online at http://dofasco.arcelormittal.com/-/media/Files/A/Arcelormittal-Canada/material-safety/metallurgical-coke.pdf.
"Middletown Coke Company HRSG Maintenance BACT Analysis Option 1-Individual Spray Quenches Sun Heat Recovery Coke Facility Process Flow Diagram Middletown Coke Company 100 Oven Case #1-24.5 VM", (20090901), URL: http://web.archive.org/web/20090901042738/http://epa.ohio.gov/portals/27/transfer/ptiApplication/mcc/new/262504.pdf, (20160212), XP055249803 [X] 1-13 * p. 7 * * pp. 8-11 *.
Practical Technical Manual of Refractories, Baoyu Hu, etc., Beijing: Metallurgical Industry Press, Chapter 6; 2004, 6-30.
Refractories for Ironmaking and Steelmaking: A History of Battles over High Temperatures; Kyoshi Sugita (Japan, Shaolin Zhang), 1995, p. 160, 2004, 2-29.
"Refractory Castables," Victas.com, Dec. 28, 11 (date obtained from WayBack Machine), https://www/vitcas.com/refactory-castables; 5 pages.
Rose, Harold J., "The Selection of Coals for the Manufacture of Coke," American Institute of Mining and Metallurgical Engineers, Feb. 1926, 8 pages.
Tiwari, et al., "A novel technique for assessing the coking potential of coals/cole blends for non-recovery coke making process," Fuel, vol. 107, May 2013, pp. 615-622.
Waddell, et al., "Heat-Recovery Cokemaking Presentation," Jan. 1999, pp. 1-25.
Walker D N et al., "Sun Coke Company's heat recovery cokemaking technology high coke quality and low environmental impact", Revue De Metallurgie—Cahiers D'informations Techniques, Revue De Metallurgie. Paris, Fr, (Mar. 1, 2003), vol. 100, No. 3, ISSN 0035-1563, p. 23.
Westbrook, "Heat-Recovery Cokemaking at Sun Coke," AISE Steel Technology, Pittsburg, PA, vol. 76, No. 1, Jan. 1999, pp. 25-28.
"What is dead-band control," forum post by user "wireaddict" on AllAboutCircuits.com message board, Feb. 8, 2007, accessed Oct. 24, 2018 at https:/forum.allaboutcircuits.com/threads/what-is-dead-band-control.4728/; 8 pages.
Yu et al., "Coke Oven Production Technology," Lianoning Science and Technology Press, first edition, Apr. 2014, pp. 356-358.
"Resources and Utilization of Coking Coal in China," Mingxin Shen ed., Chemical Industry Press, first edition, Jan. 2007, pp. 242-243, 247.
International Search Report and Written Opinion for PCT/US2019/068808; Date of Mailing: Apr. 28, 2020; 13 pages.
Canadian Office Action in Canadian Application No. 3, 125,585; Date of Mailing Dec. 30, 2022; 3 pages.
Gkotsis, et al., "Membrane-Based Technologies for Post-Combustion CO2 Capture from Flue Gases: Recent Progress in Commonly Employed Membrane Materials," Membranes 2023, 13, 898; 27 pages.
Mitsubishi Heavy Industries America, Inc., "Development and demonstration of wasteheat integration with solvent process for more efficient CO2 removal from coal fired flue gas", 2017NETL CO2 Capture Technology Project Review Meeting, Aug. 22, 2017, pp. 1-43.
Chen, et al., "Influence of biomass addition on Jincheng coal ash fusion temperatures," Fuel, vol. 160, 2015, pp. 614-620, ISSN 0016-2361, https://doi.org/10.1016/j.fuel.2015.08.024.
Li, Y., et al. "Assessment on the effect of unburned pulverized coal on the properties of coke in blast furnace." Ironmaking & Steelmaking. 2020;47(3):228-237.
Rejdak, et al., "A Stamp-Charged Coke-Making Technology—The Effect of Charge Density and the Addition of Semi-Soft Coals on the Structural, Textural and Quality Parameters of Coke," Energies 2021, 14, 3401. https://doi.org/10.3390/en14123401.
Rejdak, et al., "Use of Alternative Raw Materials in Coke-Making: New Insights in the Use of Lignites for Blast Furnace Coke Production," Energies. 2020; 13(11):2832. https://doi.org/10.3390/en13112832.
Examination Report in Brazilian Application No. BR122023020289-9; Date of Mailing: Feb. 3, 2026; 10 pages.
Chiu, et al., "Coke reactivity—Effect of Fe203 and K2CO3 addition to the coal charge before carbonization", Fuel, IPC Science and Technology Press, Guildford, GB, vol. 64, No. 7, Jul. 1, 1985 (Jul. 1, 1985), pp. 1007-1010.
Flores, et al., "How coke optical texture became a relevant tool for understanding coal blending and coke quality", Fuel Processing Technology, Elsevier BV, NL, vol. 164, Apr. 29, 2017 (Apr. 29, 2017), pp. 13-23.
Ulanovskii, et al., "Influence of the mineral components of coal on coke quality (CRI and CRS)", Coke and Chemistry, vol. 50, No. 4, Apr. 1, 2007 (Apr. 1, 2007), pp. 94-98.
Examination Report of Brazilian Application No. BR112021012412-8; Date of Mailing: Sep. 22, 2025; 8 pages.
U.S. Appl. No. 07/587,742, filed Sep. 25, 1990, now U.S. Pat. No. 5,114,542, titled Nonrecovery Coke Oven Battery and Method of Operation.
U.S. Appl. No. 07/878,904, filed May 6, 1992, now U.S. Pat. No. 5,318,671, titled Method of Operation of Nonrecovery Coke Oven Battery.
U.S. Appl. No. 09/783,195, filed Feb. 14, 2001, now U.S. Patent No. 6,596, 128, titled Coke Oven Flue Gas Sharing.
U.S. Appl. No. 07/886,804, filed May 22, 1992, now U.S. Pat. No. 5,228,955, titled High Strength Coke Oven Wall Having Gas Flues Therein.
U.S. Appl. No. 08/059,673, filed May 12, 1993, now U.S. Pat. No. 5,447,606, titled Method of and Apparatus for Capturing Coke Oven Charging Emissions.
U.S. Appl. No. 08/914,140, filed Aug. 19, 1997, now U.S. Pat. No. 5,928,476, titled Nonrecovery Coke Oven Door.
U.S. Appl. No. 09/680,187, filed Oct. 5, 2000, now U.S. Pat. No. 6,290,494, titled Method and Apparatus for Coal Coking.
U.S. Appl. No. 10/933,866, filed Sep. 3, 2004, now U.S. Pat. No. 7,331,298, titled Coke Oven Rotary Wedge Door Latch.
U.S. Appl. No. 11/424,566, filed Jun. 16, 2006, now U.S. Pat. No. 7,497,930, titled Method and Apparatus for Compacting Coal for a Coal Coking Process.
U.S. Appl. No. 12/405,269, filed Mar. 17, 2009, now U.S. Pat. No. 7,998,316, titled Flat Push Coke Wet Quenching Apparatus and Process.
U.S. Appl. No. 13/205,960, filed Aug. 9, 2011, now U.S. Pat. No. 9,321,965, titled Flat Push Coke Wet Quenching Apparatus and Process.
U.S. Appl. No. 11/367,236, filed Mar. 3, 2006, now U.S. Pat. No. 8,152,970, titled Method and Apparatus for Producing Coke.
U.S. Appl. No. 12/403,391, filed Mar. 13, 2009, now U.S. Pat. No. 8,172,930, titled Cleanable in Situ Spark Arrestor.
U.S. Appl. No. 12/849,192, filed Aug. 3, 2010, now U.S. Pat. No. 9,200,225, titled Method and Apparatus for Compacting Coal for a Coal Coking Process.
U.S. Appl. No. 13/631,215, filed Sep. 28, 2012, now U.S. Pat. No. 9,683,740, titled Methods for Handling Coal Processing Emissions and Associated Systems and Devices.
U.S. Appl. No. 13/730,692, filed Dec. 28, 2012, now U.S. Pat. No. 9,193,913, titled Reduced Output Rate Coke Oven Operation With Gas Sharing Providing Extended Process Cycle.

(56) References Cited

OTHER PUBLICATIONS

U.S. Appl. No. 14/655,204, now U.S. Pat. No. 10,016,714, filed Jun. 24, 2015, titled Systems and Methods for Removing Mercury From Emissions.
U.S. Appl. No. 16/000,516, now U.S. Pat. No. 11,117,087, filed Jun. 5, 2018, titled Systems and Methods for Removing Mercury From Emissions.
U.S. Appl. No. 17/459,380, now, U.S. Pat. No. 11,845,037, filed Jun. 5, 2018, titled Systems and Methods for Removing Mercury From Emissions.
U.S. Appl. No. 13/830,971, filed Mar. 14, 2013, now U.S. Pat. No. 10,047,296, titled Non-Perpendicular Connections.
U.S. Appl. No. 16/026,363, filed Jul. 3, 2018, now U.S. Pat. No. 11,008,517, titled Non-Perpendicular Connections Between Coke Oven Uptakes and a Hot Common Tunnel, and Associated Systems and Methods.
U.S. Appl. No. 13/730,796, filed Dec. 28, 2012, now U.S. Pat. No. 10,883,051, titled Methods and Systems for Improved Coke Quenching.
U.S. Appl. No. 17/140,564, filed Jan. 4, 2021, now U.S. Pat. No. 11,807,812, titled Methods and Systems for Improved Coke Quenching.
U.S. Appl. No. 13/730,598, filed Dec. 28, 2012, now U.S. Pat. No. 9,238,778, titled Systems and Methods for Improving Quenched Coke Recovery.
U.S. Appl. No. 14/952,267, filed Nov. 25, 2015, now U.S. Pat. No. 9,862,888, titled Systems and Methods for Improving Quenched Coke Recovery.
U.S. Appl. No. 15/830,320, filed Dec. 4, 2017, now U.S. Pat. No. 10,323,192, titled Systems and Methods for Improving Quenched Coke Recovery.
U.S. Appl. No. 13/730,735, filed Dec. 28, 2012, now U.S. Patent No, 9,273,249, titled Systems and Methods for Controlling Air Distribution in a Coke Oven.
U.S. Appl. No. 14/655,013, filed Jun. 23, 2015, now U.S. Pat. No. 11,142,699, titled Vent Stack Lids and Associated Systems and Methods.
U.S. Appl. No. 17/471,491, filed Sep. 10, 2021, now U.S. Pat. No. 11,939,526, titled Vent Stack Lids and Associated Systems and Methods.
U.S. Appl. No. 13/843,166, filed Mar. 15, 2013, now U.S. Pat. No. 9,273,250, titled Methods and Systems for Improved Quench Tower Design.
U.S. Appl. No. 15/014,547, filed Feb. 3, 2016, now, U.S. Pat. No. 10,927,303, titled Methods for Improved Quench Tower Design.
U.S. Appl. No. 17/155,818, filed Jan. 22, 2021, now U.S. Pat. No. 11,746,296, titled Methods and Systems for Improved Quench Tower Design.
U.S. Appl. No. 14/655,003, filed Jun. 23, 2015, now U.S. Pat. No. 10,760,002, titled Systems and Methods for Maintaining a Hot Car in a Coke Plant.
U.S. Appl. No. 16/897,957, filed Jun. 10, 2020, now U.S. Patent No. 11,359, 145, titled Systems and Methods for Maintaining a Hot Car in a Coke Plant.
U.S. Appl. No. 13/829,588, filed Mar. 14, 2013, now U.S. Pat. No. 9,193,915, titled Horizontal Heat Recovery Coke Ovens Having Monolith Crowns.
U.S. Appl. No. 15/322,176, filed Dec. 27, 2016, now U.S. Pat. No. 10,526,541, titled Horizontal Heat Recovery Coke Ovens Having Monolith Crowns.
U.S. Appl. No. 15/511,036, filed Mar. 14, 2017, now U.S. Pat. No. 10,968,383, titled Coke Ovens Having Monolith Component Construction.
U.S. Appl. No. 17/190,720, now U.S. Pat. No. 11,795,400, filed Mar. 3, 2021, titled Coke Ovens Having Monolith Component Construction.
U.S. Appl. No. 13/589,009, filed Aug. 17, 2012, now U.S. Pat. No. 9,359,554, titled Automatic Draft Control System for Coke Plants.
U.S. Appl. No. 15/139,568, filed Apr. 27, 2016, now U.S. Pat. No. 10,947,455, titled Automatic Draft Control System for Coke Plants.
U.S. Appl. No. 17/176,391, now U.S. Pat. No. 11,692,138, filed Feb. 16, 2021, titled Automatic Draft Control System for Coke Plants.
U.S. Appl. No. 18/321,530, filed May 22, 2023, titled Automatic Draft Control System for Coke Plants.
U.S. Appl. No. 13/588,996, filed Aug. 17, 2012, now U.S. Pat. No. 9,243,186, titled Coke Plant Including Exhaust Gas Sharing.
U.S. Appl. No. 14/959,450, filed Dec. 4, 2015, now U.S. Pat. No. 10,041,002, titled Coke Plant Including Exhaust Gas Sharing.
U.S. Appl. No. 16/047,198, filed Jul. 27, 2018, now U.S. Pat. No. 10,611,965, titled Coke Plant Including Exhaust Gas Sharing.
U.S. Appl. No. 16/828,448, filed Mar. 24, 2020, now U.S. Pat. No. 11,441,077, titled Coke Plant Including Exhaust Gas Sharing.
U.S. Appl. No. 13/589,004, filed Aug. 17, 2012, now U.S. Pat. No. 9,249,357, titled Method and Apparatus for Volatile Matter Sharing in Stamp-Charged Coke Ovens.
U.S. Appl. No. 13/730,673, filed Dec. 28, 2012, now U.S. Pat. No. 9,476,547, titled Exhaust Flow Modifier, Duct Intersection Incorporating the Same, and Methods Therefor.
U.S. Appl. No. 15/281,891, filed Sep. 30, 2016, now U.S. Pat. No. 10,975,309, titled Exhaust Flow Modifier, Duck Intersection Incorporating the Same, and Methods Therefor.
U.S. Appl. No. 17/191,119, filed on March 3, 3021, titled Exhaust Flow Modifier, Duck Intersection Incorporating the Same, and Methods Therefor.
U.S. Appl. No. 13/598,394, filed Aug. 29, 2012, now U.S. Pat. No. 9,169,439, titled Method and Apparatus for Testing Coal Coking Properties.
U.S. Appl. No. 14/865,581, filed Sep. 25, 2015, now U.S. Pat. No. 10,053,627, titled Method and Apparatus for Testing Coal Coking Properties, now U.S. Pat. No. 10,053,627.
U.S. Appl. No. 14/839,384, filed Aug. 28, 2015, now U.S. Pat. No. 9,580,656, titled Coke Oven Charging System.
U.S. Appl. No. 15/443,246, filed Feb. 27, 2017, now U.S. Pat. No. 9,976,089, titled Coke Oven Charging System.
U.S. Appl. No. 14/587,670, filed Dec. 31, 2014, now U.S. Pat. No. 10,619,101, titled Methods for Decarbonizing Coking Ovens, and Associated Systems and Devices.
U.S. Appl. No. 16/845,530, filed Apr. 10, 2020, now U.S. Pat. No. 11,359,146, titled Methods for Decarbonizing Coking Ovens, and Associated Systems and Devices.
U.S. Appl. No. 14/984,489, filed Dec. 30, 2015, now U.S. Pat. No. 10,975,310, titled Multi-Modal Beds of Coking Material.
U.S. Appl. No. 14/983,837, filed Dec. 30, 2015, now U.S. Pat. No. 10,968,395, titled Multi-Modal Beds of Coking Material.
U.S. Appl. No. 14/986,281, filed Dec. 31, 2015, now U.S. Pat. No. 10,975,311, titled Multi-Modal Beds of Coking Material.
U.S. Appl. No. 17/222,886, filed Apr. 12, 2021, titled Multi- Modal Beds of Coking Material.
U.S. Appl. No. 14/987,625, filed Jan. 4, 2016, now U.S. Pat. No. 11,060,032, titled Integrated Coke Plant Automation and Optimization Using Advanced Control and Optimization Techniques.
U.S. Appl. No. 17/172,476, filed Feb. 10, 2021, now U.S. Pat. No. 11,788,012, titled Integrated Coke Plant Automation and Optimization Using Advanced Control and Optimization Techniques.
U.S. Appl. No. 14/839,493, filed Aug. 28, 2015, now U.S. Pat. No. 10,233,392, titled Method and System for Optimizing Coke Plant Operation and Output.
U.S. Appl. No. 16/251,352, filed Jan. 18, 2019, now U.S. Pat. No. 11,053,444, titled Method and System for Optimizing Coke Plant Operation and Output.
U.S. Appl. No. 14/839,551, filed Aug. 28, 2015, now U.S. Pat. No. 10,308,876, titled Burn Profiles for Coke Operations.
U.S. Appl. No. 16/428,014, filed May 31, 2019, now U.S. Pat. No. 10,920,148, titled Improved Burn Profiles for Coke Operations.
U.S. Appl. No. 17/155,719, filed Jan. 22, 2021, now U.S. Pat. No. 11,441,078, titled Improved Burn Profiles for Coke Operations.
U.S. Appl. No. 14/839,588, filed Aug. 28, 2015, now U.S. Pat. No. 9,708,542, titled Method and System for Optimizing Coke Plant Operation and Output.
U.S. Appl. No. 15/392,942, filed Dec. 28, 2016, now U.S. Pat. No. 10,526,542, titled Method and System for Dynamically Charging a Coke Oven.

(56) References Cited

OTHER PUBLICATIONS

U.S. Appl. No. 16/735,103, filed Jan. 6, 2020, now U.S. Pat. No. 11,214,739, titled Method and System for Dynamically Charging a Coke Oven.
U.S. Appl. No. 15/614,525, filed Jun. 5, 2017, now U.S. Pat. No. 11,508,230, titled Methods and Systems for Automatically Generating a Remedial Action in an Industrial Facility.
U.S. Appl. No. 18/047,916, filed Oct. 19, 2022, titled Methods and Systems for Automatically Generating a Remedial Action in an Industrial Facility.
U.S. Appl. No. 15/987,860, filed May 23, 2018, now U.S. Pat. No. 10,851,306, titled System and Method for Repairing a Coke Oven.
U.S. Appl. No. 17/076,563, filed Oct. 21, 2020, now U.S. Pat. No. 11,186,778, titled System and Method for Repairing a Coke Oven.
U.S. Appl. No. 17/521,061, now U.S. Pat. No. 11,845,898, filed Nov. 8, 2021, titled System and Method for Repairing a Coke Oven.
U.S. Appl. No. 17/135,483, filed Dec. 28, 2020, titled Oven Health Optimization Systems and Methods.
U.S. Appl. No. 16/729,053, filed Dec. 27, 2019, now U.S. Pat. No. 11,760,937, titled Oven Uptakes.
U.S. Appl. No. 16/729,036, filed Dec. 27, 2019, now U.S. Pat. No. 11,365,355, titled Systems and Methods for Treating a Surface of a Coke Plant.
U.S. Appl. No. 17/747,708, filed May 18, 2022, now U.S. Pat. No. 12,060,525, titled Systems and Methods for Treating a Surface of a Coke Plant.
U.S. Appl. No. 18/770,264, filed Jul. 11, 2024, titled Systems and Methods for Treating a Surface of a Coke Plant.
U.S. Appl. No. 16/729,201, filed Dec. 27, 2019, titled Gaseous Tracer Leak Detection.
U.S. Appl. No. 16/729,122, filed Dec. 27, 2019, now U.S. Pat. No. 11,395,989, titled Methods and Systems for Providing Corrosion Resistant Surfaces in Contaminant Treatment Systems.
U.S. Appl. No. 17/843,164, filed Jun. 17, 2022, now U.S. Pat. No. 11,819,802, titled Methods and Systems for Providing Corrosion Resistant Surfaces in Contaminant Treatment Systems.
U.S. Appl. No. 16/729,068, filed Dec. 27, 2019, now U.S. Pat. No. 11,486,572, titled Systems and Methods for Utilizing Flue Gas.
U.S. Appl. No. 16/729,129, filed Dec. 27, 2019, now U.S. Pat. No. 11,008,518, titled Coke Plant Tunnel Repair and Flexible Joints.
U.S. Appl. No. 17/320,343, filed May 14, 2021, now U.S. Pat. No. 11,597,881, titled Coke Plant Tunnel Repair and Flexible Joints.
U.S. Appl. No. 18/168,142, filed Feb. 13, 2023, titled Coke Plant Tunnel Repair and Flexible Joints.
U.S. Appl. No. 16/729,170, now U.S. Pat. No. 11,193,069, filed Dec. 27, 2019, titled Coke Plant Tunnel Repair and Anchor Distribution.
U.S. Appl. No. 17/532,058, now U.S. Pat. No. 11,505,747, filed Nov. 22, 2021, titled Coke Plant Tunnel Repair and Anchor Distribution.
U.S. Appl. No. 17/967,615, filed Oct. 17, 2022, titled Coke Plant Tunnel Repair and Anchor Distribution.
U.S. Appl. No. 16/729,157, filed Dec. 27, 2019, now U.S. Pat. No. 11,071,935, titled Particulate Detection for Industrial Facilities, and Associated Systems and Methods.
U.S. Appl. No. 16/729,057, filed Dec. 27, 2019, now U.S. Pat. No. 11,021,655, titled Decarbonization of Coke Ovens and Associated Systems and Methods.
U.S. Appl. No. 17/321,857, filed May 17, 2021, now U.S. Pat. No. 11,643,602, titled Decarbonization of Coke Ovens and Associated Systems and Methods.
U.S. Appl. No. 18/313,622, filed May 8, 2023, titled Decarbonization of Coke Ovens and Associated Systems and Methods.
U.S. Appl. No. 16/729,212, filed Dec. 27, 2019, now U.S. Pat. No. 11,261,381, titled Heat Recovery Oven Foundation.
U.S. Appl. No. 17/584,672, now U.S. Pat. No. 11,845,897, filed Jan. 26, 2022, titled Heat Recovery Oven Foundation.
U.S. Appl. No. 18/492,913, filed Oct. 24, 2023, titled Heat Recovery Oven Foundation.
U.S. Appl. No. 16/729,219, now U.S. Pat. No. 11,098,252, filed Dec. 27, 2019, titled Spring-Loaded Heat Recovery Oven System and Method.
U.S. Appl. No. 17/388,874, filed Jul. 29, 2021, now, U.S. Pat. No. 11,680,208, titled Spring-Loaded Heat Recovery Oven System and Method.
U.S. Appl. No. 17/736,960, filed May 20, 2022, titled Foundry Coke Products, and Associated Systems and Methods.
U.S. Appl. No. 17/306,895, now U.S. Pat. No. 11,767,482, filed May 3, 2021, now U.S. Pat. No. 11,767,482, titled High-Quality Coke Products.
U.S. Appl. No. 18/363,465, filed Aug. 1, 2023, titled High-Quality Coke Products.
U.S. Appl. No. 18/466,549, filed Sep. 13, 2023, titled High-Quality Coke Products.
U.S. Appl. No. 18/793,631, filed Aug. 2, 2024, titled High- Quality Coke Products.
U.S. Appl. No. 18/501,488, filed Nov. 3, 2023, titled Coal Blends, Foundry Coke Products, and Associated Systems, Devices, and Methods.
U.S. Appl. No. 18/501,795, filed Nov. 3, 2023, titled Coal Blends, Foundry Coke Products, and Associated Systems, Devices, and Methods.
U.S. Appl. No. 18/052,739, filed Nov. 4, 2022, now U.S. Pat. No. 11,946,108, titled Foundry Coke Products and Associated Processing Methods Via Cupolas.
U.S. Appl. No. 18/586,236, filed Feb. 23, 2024, titled Foundry Coke Products and Associated Processing Methods Via Cupolas.
U.S. Appl. No. 18/052,760, filed Nov. 2, 2022, now U.S. Pat. No. 11,851,724, titled Foundry Coke Products, and Associated Systems, Devices, and Methods.
U.S. Appl. No. 18/506,746, filed Nov. 10, 2023, titled Foundry Coke Products, and Associated Systems, Devices, and Methods.
U.S. Appl. No. 18/511,148, filed Nov. 16, 2023, titled Products Comprising Char and Carbon, and Associated Systems, Devices, and Methods.
U.S. Appl. No. 18/511,621, filed Nov. 16, 2023, titled Pelletized Products and Associated Systems, Devices, and Methods.
U.S. Appl. No. 09/783,195, filed Feb. 14, 2001, now U.S. Pat. No. 6,596,128, titled Coke Oven Flue Gas Sharing.
U.S. Appl. No. 11/367,236, filed Mar. 3, 2006, now U.S. Patent No. 8, 152,970, titled Method and Apparatus for Producing Coke.
U.S. Appl. No. 17/459,380, filed Jun. 5, 2018, titled Systems and Methods for Removing Mercury From Emissions.
U.S. Appl. No. 13/830,971, filed Mar. 14, 2013, now U.S. Pat. No. 10,047,296, titled Non-Perpendicular Connections Between Coke Oven Uptakes and a Hot Common Tunnel, and Associated Systems and Methods, now U.S. Pat. No. 10,047,295.
U.S. Appl. No. 17/140,564, filed Jan. 4, 2021, titled Methods and Systems for Improved Coke Quenching.
U.S. Appl. No. 17/471,491, filed Sep. 10, 2021, now U.S. Pat. No. 11,142,699, titled Vent Stack Lids and Associated Systems and Methods.
U.S. Appl. No. 17/155,818, filed Jan. 22, 2021, titled Methods and Systems for Improved Quench Tower Design.
U.S. Appl. No. 18/363,508, filed Aug. 1, 2023, titled Methods and Systems for Improved Quench Tower Design.
U.S. Appl. No. 16/897,957, filed Jun. 10, 2020, now U.S. Pat. No. 11,359,145, titled Systems and Methods for Maintaining a Hot Car in a Coke Plant.
U.S. Appl. No. 17/190,720, filed Mar. 3, 2021, titled Coke Ovens Having Monolith Component Construction.
U.S. Appl. No. 17/191,119, filed March 3, 3021, titled Exhaust Flow Modifier, Duck Intersection Incorporating the Same, and Methods Therefor.
U.S. Appl. No. 17/172,476, filed Feb. 10, 2021, titled Integrated Coke Plant Automation and Optimization Using Advanced Control and Optimization Techniques.
U.S. Appl. No. 17/521,061, filed Nov. 8, 2021, titled System and Method for Repairing a Coke Oven.
U.S. Appl. No. 16/729,053, filed Dec. 27, 2019, titled Oven Uptakes.
U.S. Appl. No. 18/366,244, filed Aug. 7, 2023, titled Oven Uptakes.

(56) References Cited

OTHER PUBLICATIONS

U.S. Appl. No. 17/747,708, filed May 18, 2022, titled Systems and Methods for Treating a Surface of a Coke Plant.
U.S. Appl. No. 17/843,164, filed Jun. 17, 2022, titled Methods and Systems for Providing Corrosion Resistant Surfaces in Contaminant Treatment Systems.
U.S. Appl. No. 17/321,857, filed May 17, 2021, titled Decarbonization of Coke Ovens and Associated Systems and Methods.
U.S. Appl. No. 17/584,672, filed Jan. 26, 2022, titled Heat Recovery Oven Foundation.
U.S. Appl. No. 18/313,647, filed May 8, 2023, titled Spring-Loaded Heat Recovery Oven System and Method.
U.S. Appl. No. 17/306,895, filed May 3, 2021, titled High-Quality Coke Products.
U.S. Appl. No. 18/052,739, filed Nov. 4, 2022, titled Foundry Coke Products and Associated Processing Methods Via Cupolas.
U.S. Appl. No. 18/052,760, filed Nov. 2, 2022, titled Foundry Coke Products, and Associated Systems, Devices, and Methods.
U.S. Appl. No. 14/655,204, now U.S. Pat. No. 10,016,714, filed on Jun. 24, 2015, titled Systems and Methods for Removing Mercury From Emissions.
U.S. Appl. No. 16/000,516, now U.S. Pat. No. 11,117,087, filed on Jun. 5, 2018, titled Systems and Methods for Removing Mercury From Emissions.
U.S. Appl. No. 17/459,380, now, U.S. Pat. No. 11,845,037, filed on Jun. 5, 2018, titled Systems and Methods for Removing Mercury From Emissions.
U.S. Appl. No. 13/730,735, filed Dec. 28, 2012, now U.S. Pat. No. 9,273,249, titled Systems and Methods for Controlling Air Distribution in a Coke Oven.
U.S. Appl. No. 18/321,530, filed May 22, 2023, now U.S. Pat. No. 12,195,671, titled Automatic Draft Control System for Coke Plants.
U.S. Appl. No. 18/977,609, filed Dec. 11, 2024, titled Automatic Draft Control System for Coke Plants.
U.S. Appl. No. 18/047,916, filed Oct. 19, 2022, now U.S. Patent No. 12,190,701, titled Methods and Systems For
U.S. Appl. No. 18/958,671, filed Nov. 25, 2024, titled Methods and Systems for Automatically Generating a Remedial Action in an Industrial Facility.
U.S. Appl. No. 17/135,483, filed Dec. 28, 2020, now U.S. Pat. No. 12,227,699, titled Oven Health Optimization Systems and Methods.
U.S. Appl. No. 19/054,358, filed Feb. 14, 2025, titled Oven Health Optimization Systems and Methods.
U.S. Appl. No. 18/793,631, filed Aug. 2, 2024, now U.S. Pat. No. 12,215,289, titled High-Quality Coke Products.
U.S. Appl. No. 18/971,912, filed Dec. 6, 2024, titled Systems for Filtering Fines From Coke Products and
U.S. Appl. No. 18/501,488, filed Nov. 3, 2023, now U.S. Pat. No. 12,110,458, titled Coal Blends, Foundry Coke Products, and Associated Systems, Devices, and Methods.
U.S. Appl. No. 18/954,859, filed Nov. 21, 2024, titled Systems, Devices and Methods for Screening Industrial Products.
U.S. Appl. No. 18/954,882, filed Nov. 21, 2024, titled Flat Push Hot Car for Foundry Coke and Associated Systems and Methods.
U.S. Appl. No. 18/892,228, filed Sep. 20, 2024, titled Foundry Coke Products, and Associated Systems, Devices, and Methods.
U.S. Appl. No. 18/955,181, filed Nov. 21, 2024, titled Emissions Recovery Systems for Industrial Facilities, and Associated Assemblies and Methods.
U.S. Appl. No. 18/972,005, filed Dec. 6, 2024, titled Milling Systems and Methods for Producing Materials With a Particular Particle Size Distribution.
U.S. Appl. No. 18/971,647, filed Dec. 6, 2024, titled Systems and Methods for Capturing Greenhouse Gases From Coke Production Facilities.
U.S. Appl. No. 18/949,426, filed Nov. 15, 2024, titled Pelletized Products and Associated Systems, Devices and Methods.

* cited by examiner

SYSTEMS AND METHODS FOR UTILIZING FLUE GAS

CROSS-REFERENCE TO RELATED APPLICATION

This application is a continuation of U.S. patent application Ser. No. 16/729,068, titled "IMPROVED SYSTEMS AND METHODS FOR UTILIZING FLUE GAS" and filed on Dec. 27, 2019, which claims the benefit of and priority to U.S. Provisional Patent Application No. 62/787,116, titled "IMPROVED HEAT RECOVERY STEAM GENERATOR" and filed Dec. 31, 2018, the disclosures of which are incorporated herein by reference in their entireties.

TECHNICAL FIELD

The present technology relates to systems for processing and utilizing flue gas produced in industrial process, such as flue gas produced by coke ovens during the coking process.

BACKGROUND

Heat recovery steam generators (HRSG) are used in many industrial processes as a means for recovering heat from hot gas streams. Generally speaking, a HRSG is used to produce steam (including superheated steam), which can then be used for a variety of different purposes around an industrial facility. One specific industry that uses HRSGs is the coke manufacturing industry, though HRSGs are also used in, for example, trash-to-steam processes, biomass processing, black liquor processing, and in the processing of other mixed feeds (such as coal and biomass).

With respect to the use of HRSGs in coke manufacturing facilities, and specifically with respect to the use of HRSGs in cokemaking heat recovery facilities, volatile gases emitted during the coking process are directed out of the coke oven and eventually pass into a flue gas desulfurization system, which is used to reduce the acidity and neutralize acids present within the flue gas, and a baghouse, which collects particulate matter within the flue gas, before the flue gas is vented into the atmosphere. In comparison to flue gases exhausted from coal burning power plants, flue gases exhausted from heat recovery coke ovens typically have much higher concentrations of acids, and in particular, hydrochloric acid. For example, flue gas exhausted from heat recovery coke ovens can sometimes have a concentration of hydrochloric acid that is 10 times higher (or more) than flue gas exhausted from coal burning power plants. This is primarily because heat recovery coke plants extract 80-90% of all of the chlorides in the coal while only burning about 25% of the coal and all of this is expelled from the oven as volatile matter during the coking process.

However, the volatile gases expelled from the coke oven typically have a temperature between 1500 and 2200° F., which is too hot to be properly processed by the desulfurization system and the baghouse. Accordingly, before the flue gas can be directed into the desulfurization system and the baghouse, the flue gases pass through a heat recovery steam generator, which helps to cool the flue gases by absorbing heat from the gas and using the heat to convert liquid water into steam, which can then be used to generate power using a steam turbine.

Regardless of the specific context in which the HRSG is used, when exhaust gas begins to cool within the HRSG, vaporized contaminants within the gas condense and precipitate onto the tubes within the HRSG that carry the water and steam. These condensed contaminants are often extremely corrosive to the steel tubes and can cause the tubes to quickly corrode and become damaged. Accordingly, there is a need for an improved heat recovery steam generator that offers increased resistance to corrosion caused by contaminants within flue gases.

DETAILED DESCRIPTION

Specific details of several embodiments of the disclosed technology are described below with reference to particular, representative configurations. The disclosed technology is also described herein with reference to HRSGs used in coke manufacturing plants. However, it should be appreciated that the technology described herein is not limited to this specific application. For example, HRSG and related technology described herein can be implemented in any industrial process where exhaust gas is processed to cool the exhaust gas and/or utilize exhaust gas heat for steam production. Accordingly, the technology described herein should not be considered as limited to coke manufacturing processes.

In some non-limiting embodiments the disclosed technology can be practiced in accordance with ovens, coke manufacturing facilities, and insulation and heat shielding structures having other suitable configurations. Specific details describing structures or processes that are well-known and often associated with coke ovens but that can unnecessarily obscure some significant aspects of the presently disclosed technology, are not set forth in the following description for clarity. Moreover, although the following disclosure sets forth some embodiments of the different aspects of the disclosed technology, some embodiments of the technology can have configurations and/or components different than those described in this section. As such, the present technology can include some embodiments with additional elements and/or without several of the elements described below with reference to FIGS. 1-20.

Figure 1:
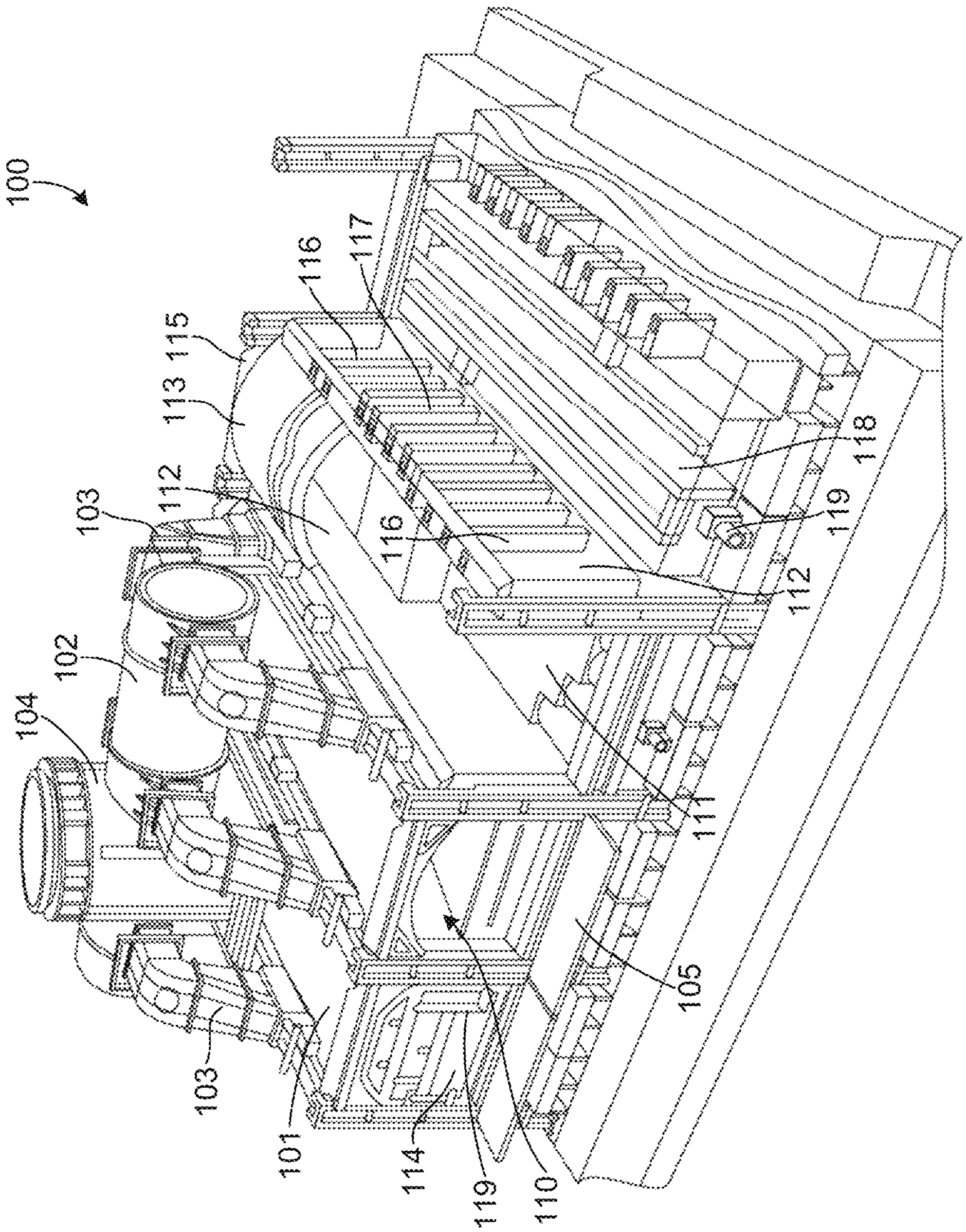
FIG. 1 is an isometric, partial cut-away view of a portion of a horizontal heat recovery/non-recovery coke plant configured in accordance with embodiments of the present technology.

Referring to FIG. 1, a coke plant 100 is illustrated which produces coke from coal in a reducing environment. FIG. 1 illustrates four ovens 101 with sections cut away for clarity. Each oven 101 comprises an oven chamber 110 preferably defined by a floor 111, a front door 114, a rear door 115 preferably opposite the front door 114, two sidewalls 112 extending upwardly from the floor 111 intermediate the front 114 and rear 115 doors, and a crown 113 which forms the top surface of the oven chamber 110. The oven 101 can also include a platform 105 adjacent to the front door 114 that a worker can stand and walk on to access the front door and the oven chamber 110. In operation, coke is produced in the ovens 101 by first loading coal into the oven chamber 110, heating the coal in an oxygen depleted environment, driving off the volatile fraction of coal and then oxidizing the volatiles within the oven 101 to capture and utilize the heat given off. The coal volatiles are oxidized within the ovens over a 48-hour coking cycle and release heat to regeneratively drive the carbonization of the coal to coke. The coking cycle begins when the front door 114 is opened and coal is charged onto the floor 111. The coal on the floor 111 is known as the coal bed. Heat from the oven (due to the previous coking cycle) starts the carbonization cycle. Preferably, no additional fuel other than that produced by the coking process is used. Roughly half of the total heat transfer to the coal bed is radiated down onto the top surface of the coal bed from the luminous flame and radiant oven crown 113. The remaining half of the heat is transferred to the coal bed by conduction from the floor 111 which is convectively heated from the volatilization of gases in sole flue 118. In this way, a carbonization process "wave" of plastic flow of the coal particles and formation of high strength cohesive coke proceeds from both the top and bottom boundaries of the coal bed at the same rate, preferably meeting at the center of the coal bed after about 45-48 hours.

In operation, volatile gases emitted from the coal positioned inside the oven chamber 110 (also referred to herein as flue gases) collect in the crown 113 and are drawn downstream in the overall system into downcomer channels 117 formed in one or both sidewalls 112. The downcomer channels 117 fluidly connect the oven chamber 110 with the sole flue 118 positioned under the floor 111. The sole flue 118 forms a circuitous path beneath the floor 111 and volatile gases emitted from the coal can pass through the downcomer channels 117 and enter the sole flue 118, where they combust and emit heat that supports the reduction of coal into coke. Uptake channels 116 are formed in one or both sidewalls 112 of the oven chambers 110 and are fluidly coupled between the sole flue 118 and uptake ducts 103 such that the combusted volatile gases can leave the sole flue 118 by passing through the uptake channels 116 toward the uptake ducts 103. The uptake ducts 103 direct the volatile gases into the common tunnel 102, which transports these gases downstream for further processing.

Figure 2:
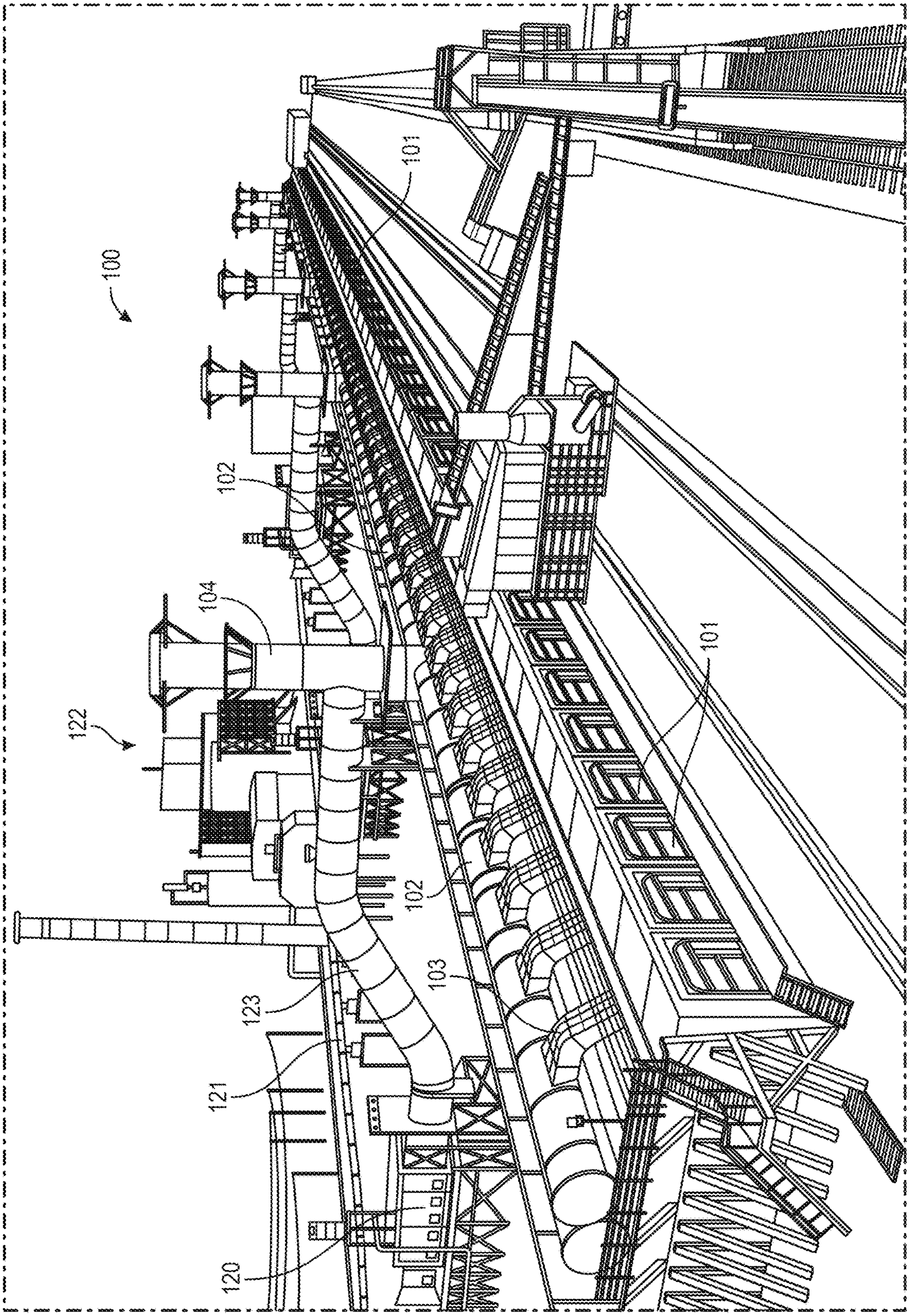
FIG. 2 is a perspective view a coke plant configured in accordance with embodiments of the present technology.

FIG. 2 shows a perspective view of the coke plant 100. After passing into the common tunnel 102 from the uptake ducts 103, the common tunnel 102 directs the flue gases to one or more heat recovery steam generators (HRSG) 120, which cools the flue gas by using the heat from the flue gas to convert liquid water into steam. A cooled gas duct 121 transports the cooled gas from the HRSG 120 to a flue gas desulfurization system 122, which is used to reduce the acidity and neutralize acids present within the flue gas. Fluidly connected and further downstream are a baghouse for collecting particulates, at least one draft fan for controlling air pressure within the system, and a main gas stack for exhausting cooled, treated exhaust to the environment. Steam lines interconnect the heat recovery steam generators and a cogeneration plant so that the recovered heat can be utilized. The coke plant 100 can also be fluidly connected to a bypass exhaust stack 104 that can be used to vent hot exhaust gases to the atmosphere in emergency situations.

Figure 3:
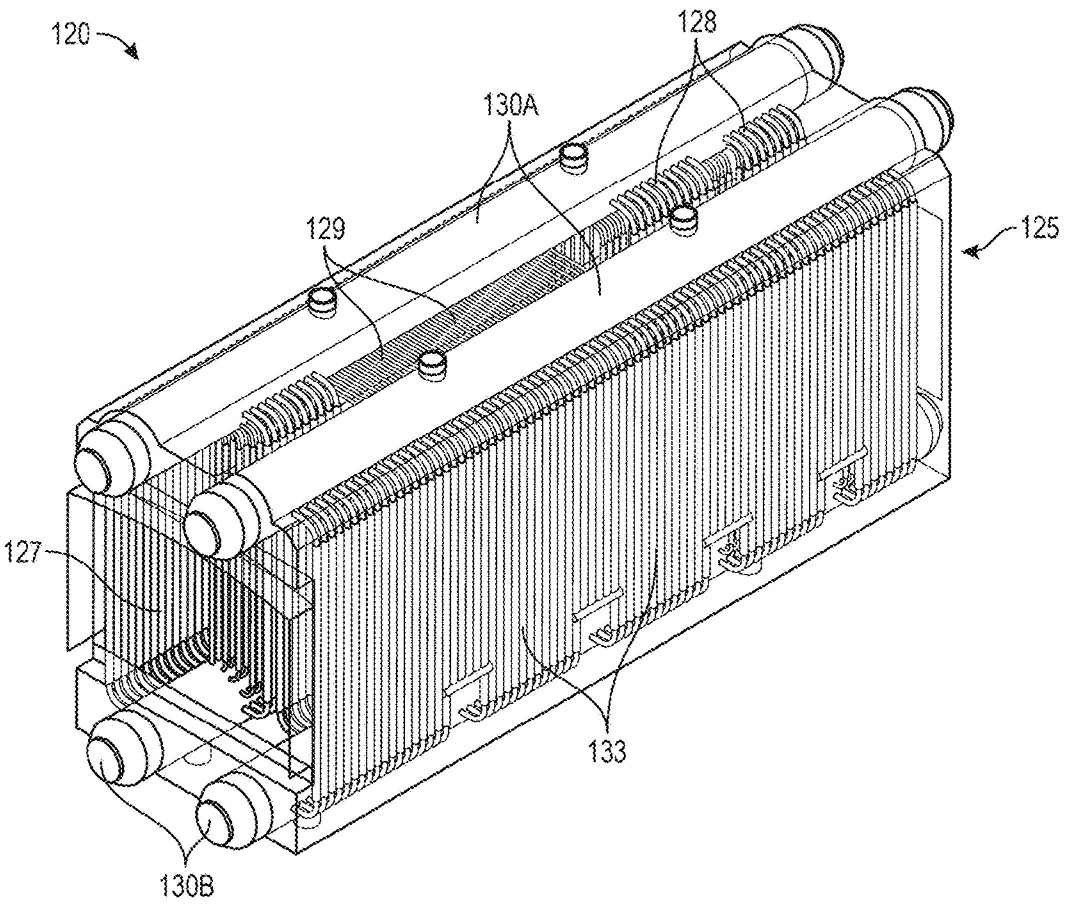
FIG. 3 shows an isometric view of an illustrative HRSG configured in accordance with embodiments of the present technology.
Figure 4:
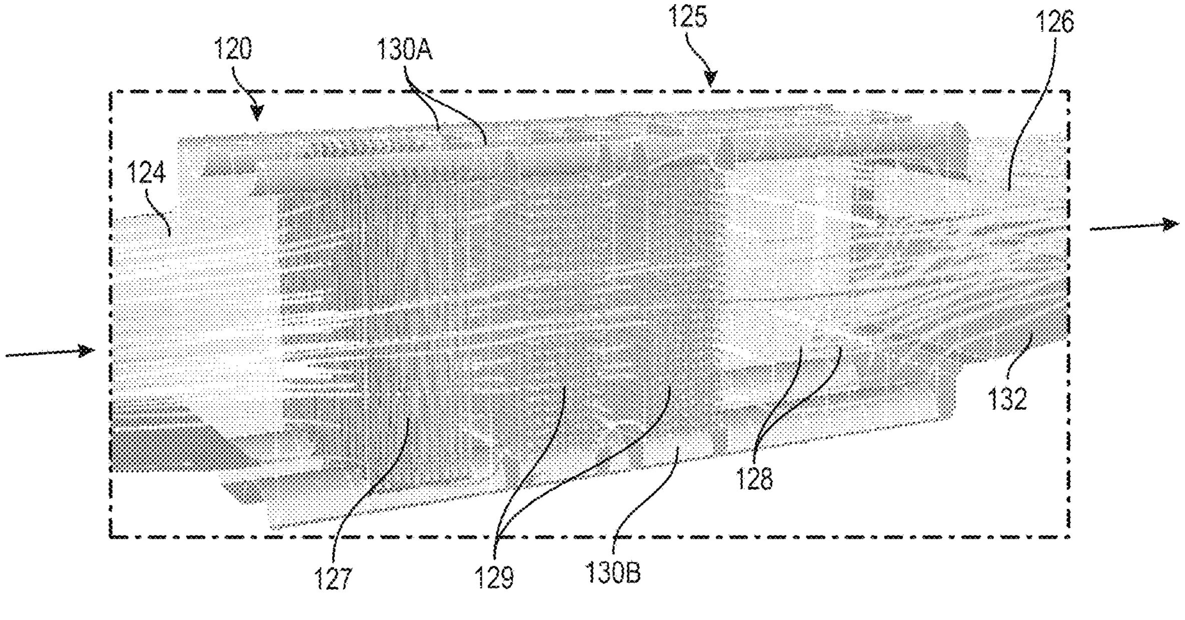
FIG. 4 shows a diagram of the flow path of flue gases passing through the HRSG, in accordance with embodiments of the present technology.

FIG. 3 shows an isometric view of an illustrative HRSG 120 and FIG. 4 shows a diagram of the flow path of the flue gases through the HRSG 120. The HRSG 120 includes an inlet duct 124 configured to receive hot flue gases from a cross-over tunnel 123 (FIG. 2) that is coupled to the common tunnel 102 (FIG. 2). The flue gases enter the HRSG 120 and pass through an inlet damper (not labeled) positioned adjacent to the inlet duct 124, which can be used to control the flow of the flue gases into the HRSG 120, and into a radiation chamber (not labeled), which can be used to address gas flow distribution and to allow the flue gases to cool sufficiently so that any molten species within the flue gas can solidify. The HRSG 120 includes a steam generation system 125 that uses the heat and thermal energy of the hot flue gas to vaporize liquid water within the steam generation system 125 into steam and then superheat the steam. In some embodiments, the superheated steam is provided to a steam turbine that uses the superheated steam to generate electricity. In other embodiments, the superheated steam is provided to other systems for other purposes.

In the illustrated embodiment, the steam generation system 125 includes an economizer 126, a primary evaporator 127, two secondary evaporators 128, two superheaters 129, steam drums 130A and mud drums 130B, and a waterwall 133. As the flue gas flows through the HRSG 120, heat from the flue gas can be transferred to each of the different components of the steam generation system 125. In this way, the temperature of the flue gas can decrease as it flows through the HRSG 120. For example, when the flue gas is first received at the inlet duct 124, the flue gas can have a temperature between 800 and 2500° F. As the flue gases pass through the HRSG 120, the flue gases can be cooled by the various components of the HRSG 120 such that, when the flue gas exits the HRSG 120 via the outlet duct 132 and is directed into the cooled gas duct 121, the flue gas can have a temperature between 300 and 600° F., and specifically to a temperature between 375 and 500° F. However, these temperatures are only examples. The specific flue gas temperatures measured at the inlet duct 123 and the outlet duct 132 are dependent on the specific operating conditions and design of the HRSG 120 and other components of the coke plant.

As the flue gas passes and transfers heat to the various components of the steam generation system 125, these components absorb the thermal energy from the flue gas, causing their temperature to increase. In this way, the flue gas can be used to heat water within the various components of the steam generation system 125 to create steam. For example, during operation of the steam generation system 125, feedwater is provided to economizer 126. The feedwater is typically provided to the economizer 126 at a temperature of approximately 270° F. However, the feedwater can be highly pressurized such that, even at this elevated temperature, the feedwater does not boil. As the hot flue gases flow past the economizer 126, at least some of the thermal energy of the flue gases can be absorbed by the economizer 126 and by the feedwater within the economizer 126. As a result, the feedwater within the economizer 126 can be heated to temperatures greater than 270° F. The heated feedwater is then directed into a drum for temporary storage before being directed into the primary and secondary evaporators 127 and 128. As the heated feedwater flows through the evaporators 127 and 128, heat from the hot flue gases flowing by the evaporators 127/128 can be transferred into the evaporators 127 and 128, which can in turn heat up the liquid water to a sufficiently high enough temperature that the water evaporates into steam. The steam is then directed into a drum for temporary storage before being directed into the superheaters 129. As the steam flows through the superheaters 129, heat from the flue gas can be absorbed by the superheaters 129, which can cause the steam within the superheaters 129 to become superheated. Once superheated, the steam can then be directed out of the HRSG for further use.

Figure 5A:
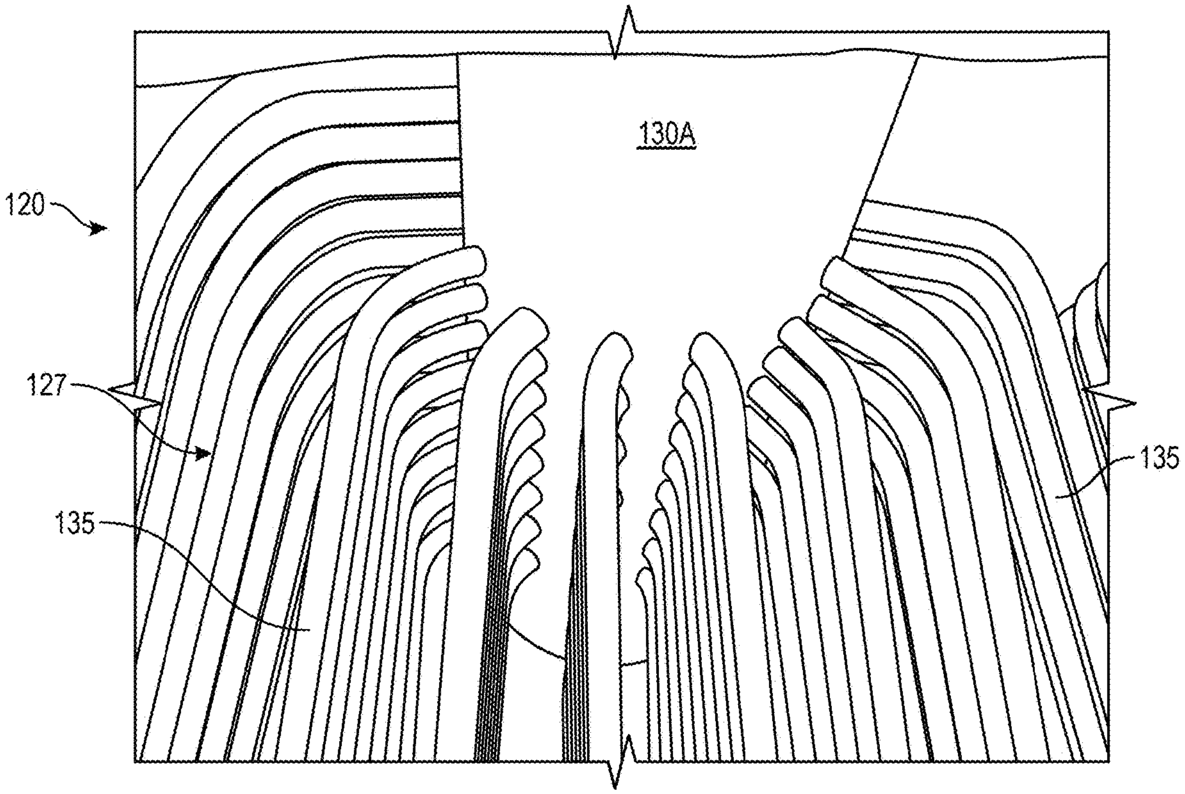
FIGS. 5A and 5B show isometric views of the top and bottom portions of a primary evaporator configured in accordance with embodiments of the present technology.
Figure 5B:
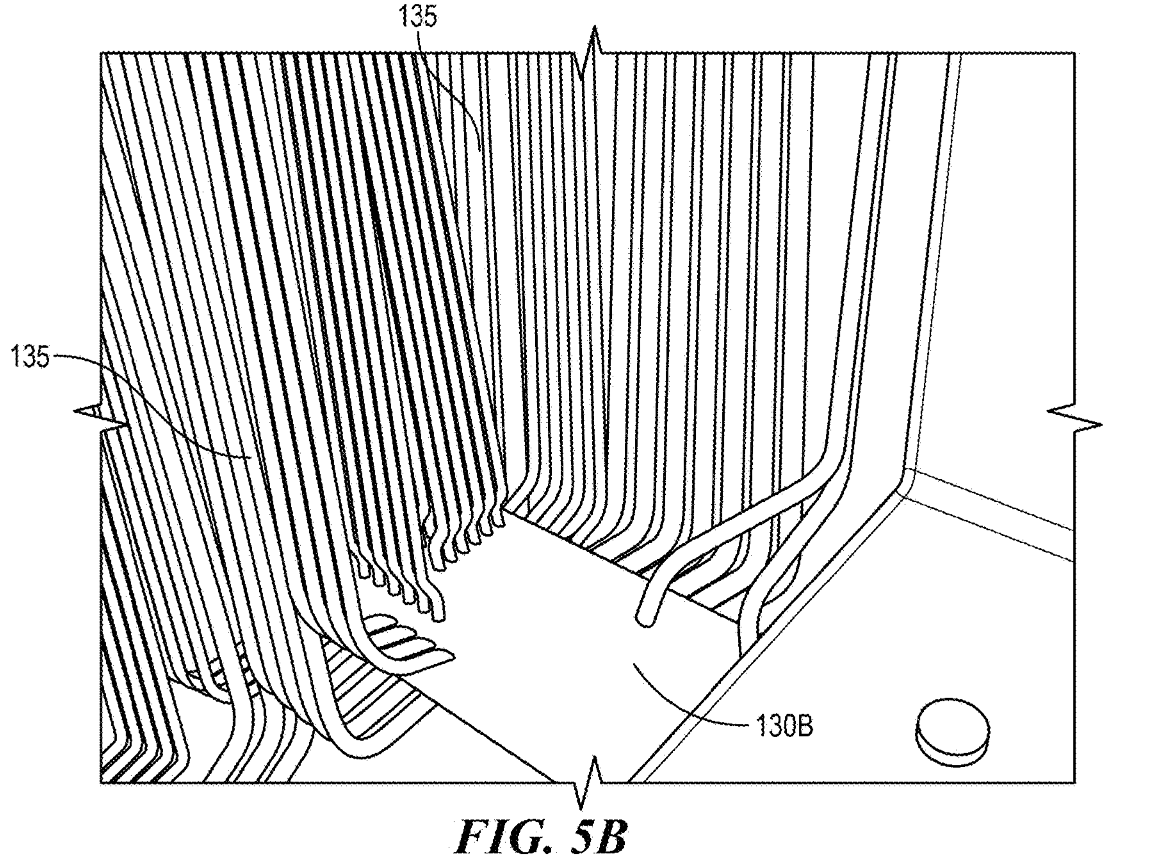

In the embodiments shown in FIGS. 3 and 4, after the flue gas passes through the inlet duct 124, the flue gases first flow through the primary evaporator 127. FIGS. 5A and 5B show isometric views of the top and bottom portions of the primary evaporator 127. The primary evaporator 127 includes a plurality of evaporator tubes 135 that are generally vertically oriented and are fluidly coupled in parallel between the mud drum 130B and the steam drum 130A. As the liquid water flows through the evaporator tubes 135, the hot flue gases pass through the primary evaporator 127 and flow around the individual evaporator tubes 135. This can cause the flue gases to transfer thermal energy into each of the evaporator tubes 135, causing the individual evaporator tubes 135 to heat up. In some embodiments, the evaporator tubes 135 can be heated to temperatures from 500° F. to over 1000° F. However, these temperatures are only examples and the specific temperatures experienced by the various components of the heat recovery steam generator are dependent on the specific design and operating conditions of the heat recovery steam generator and other components of the coke plant (or other industrial plant). The evaporator tubes 135, which can be formed from metal, can then transfer at least some of this absorbed thermal energy into the water flowing through the evaporator tubes 135, causing the liquid water to heat up and evaporate into steam.

The secondary evaporators 128, which are positioned further downstream from the primary evaporator 127, can also include evaporator tubes 135 that are generally vertically oriented and that are fluidly coupled in parallel between the mud drum 130B and the steam drum 130A such that heat from the flue gas can be absorbed by the evaporator tubes 135 of the secondary evaporators 128 and liquid water flowing through the secondary evaporators 128 can be evaporated into steam. However, because the secondary evaporators 128 are positioned further downstream from the primary evaporator 127, the flue gas that passes through the secondary evaporators 128 can be cooler than the flue gas passing through the primary evaporator 127. For example, the flue gas passing by the secondary evaporator may only be approximately 730° F. To ensure that sufficient thermal energy is transferred to the evaporator tubes 135 of the secondary evaporators 128, the secondary evaporators 128 can include more evaporator tubes 135 than the primary evaporator 127 and the evaporator tubes 135 of the secondary evaporators 128 can be more densely packed together. In this way, it is more difficult for the flue gases to flow through the secondary evaporators 128 and the amount of thermal energy transferred into the evaporator tubes 135, and therefore the amount of heat transferred into the liquid water within these tubes 135 can be sufficiently high enough to cause the liquid water to evaporate into steam.

Figure 6A:
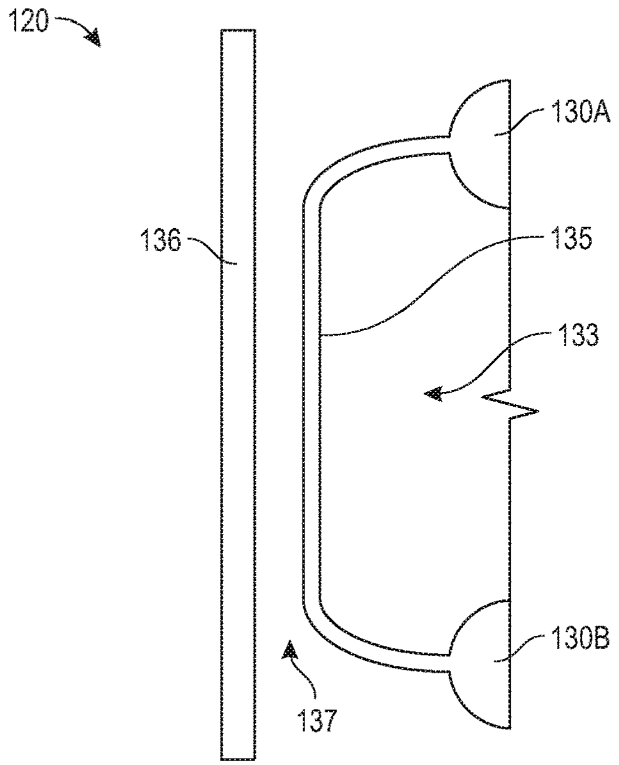
FIG. 6A shows a diagram of a portion of a waterwall and FIG. 6B shows an isometric view of an exterior wall of the HRSG, in accordance with embodiments of the present technology.
Figure 6B:
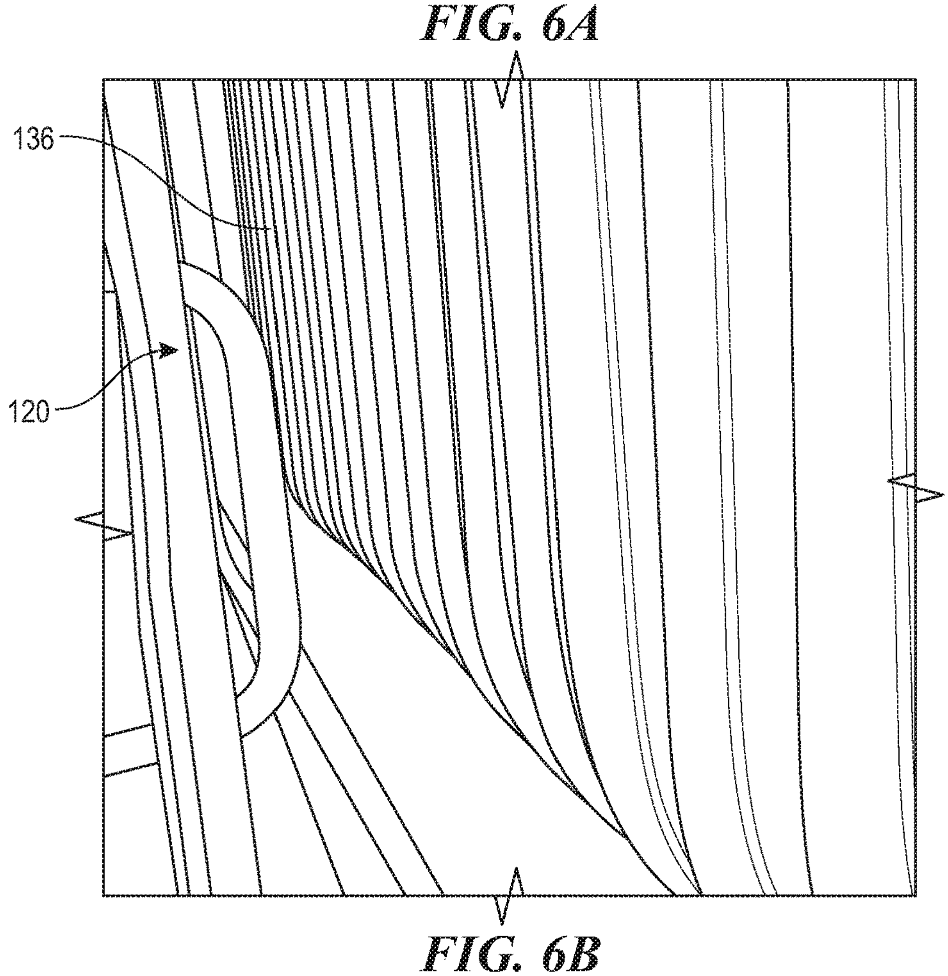

In some embodiments, the HRSG 120 can also include a waterwall 133 (FIGS. 6A and 6B) that is configured to thermally protect exterior portions of the HRSG 120 from the heat given off by the flue gases flowing through the HRSG 120. In these embodiments, at least some of the evaporator tubes 135 can be positioned adjacent to exterior walls of the HRSG 120 such that these evaporator tubes 135 can absorb heat from the flue gas near the exterior walls instead of the heat being absorbed by the walls. For example, FIG. 6A shows a diagram of a portion of a waterwall 133 and FIG. 6B shows an exterior view of an exterior wall 136 of the HRSG 120. The evaporator tube 135 extends between the mud drum 130B and the steam drum 130A and is positioned adjacent to the exterior wall 136, though separated from the exterior wall 136 by a gap 137. In this way, the evaporator tube 135 can be positioned between the exterior wall 136 and the flue gas and can therefore reduce the heat of the flue gas that reaches the exterior wall 136. As a result, the waterwall can prevent the exterior wall 136 from being heated to an undesirably high temperature and the temperature within the gap 137 can be lower than the temperature on the other side of the waterwall 133.

After the liquid water evaporates into steam, the evaporator tubes 135 direct the steam out of the primary and secondary evaporators 127 and 128 and into the steam drum 130A. The steam drums 130A extend along a top of the HRSG 120 and fluidly couple the evaporators 127 and 128 to the superheaters 129. Further, the steam drums 130A can be sufficiently pressurized such that the steam within the steam drums 130A can be saturated.

Figure 7B:
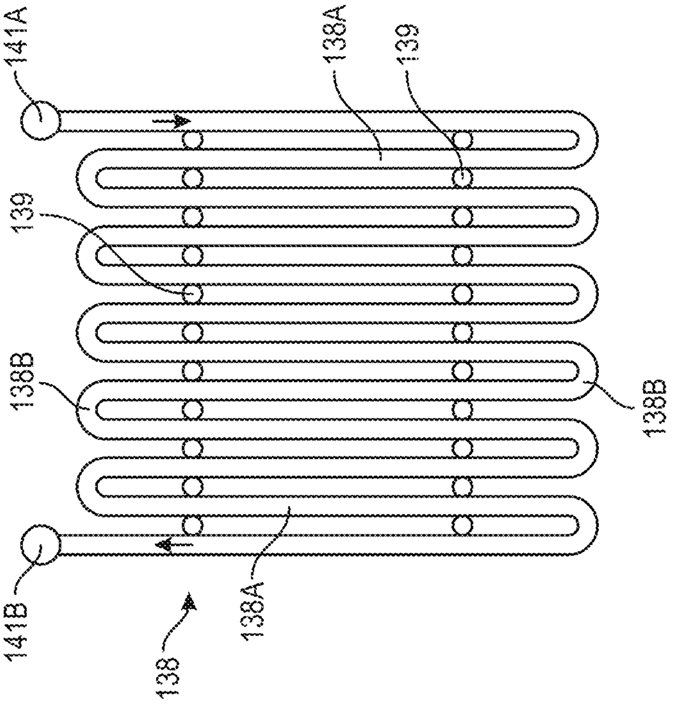
FIGS. 7A and 7B show diagrams of a superheater configured in accordance with embodiments of the present technology.
Figure 7A:
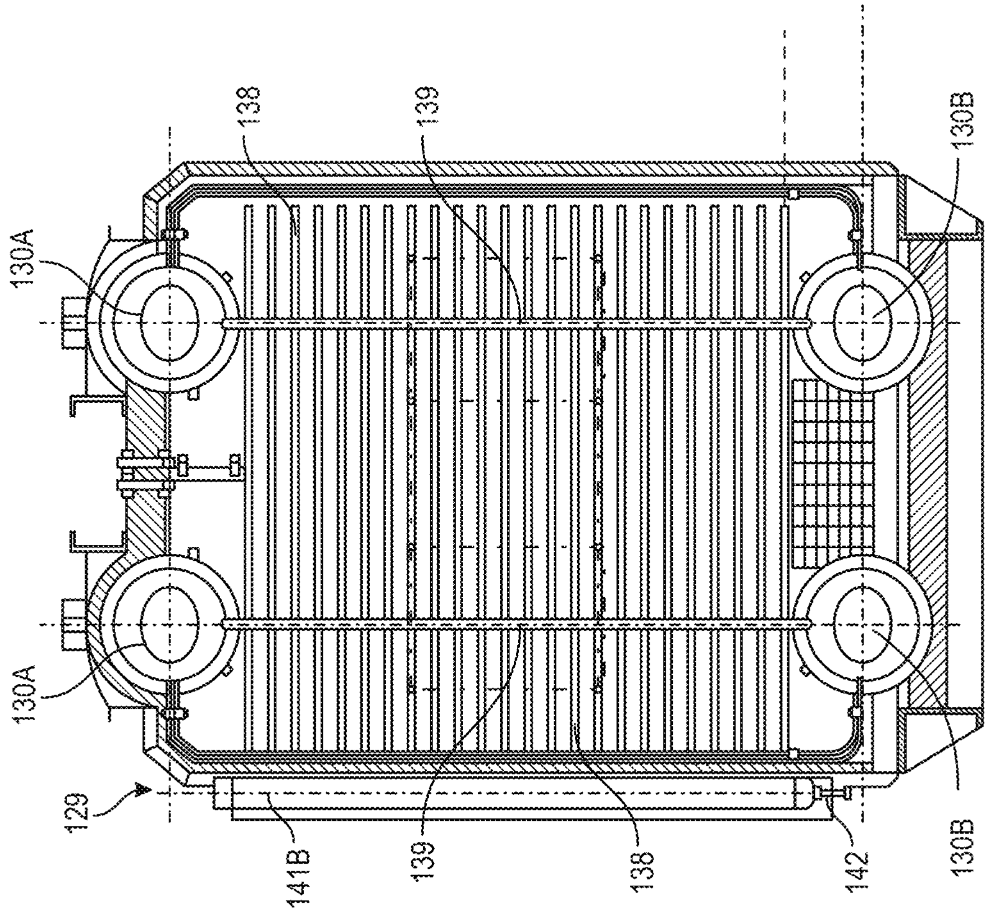

After passing by the primary evaporator 127, the flue gases flow toward superheaters 129. The HRSG 120 can be configured to provide steam to a steam turbine that uses the steam to generate electricity. However, if the steam provided to the steam turbine is at too low of a pressure and/or temperature, the steam turbine can become damaged. Accordingly, before the saturated steam within the steam drum 130A can be provided to the steam turbine, superheaters 129 can take the saturated steam from the steam drums 130A to superheat and pressurize the steam. FIG. 7A shows a front elevation view one of the superheaters 129 and FIG. 7B shows a top plan view of a single superheater tube 138. Each of the superheaters 129 includes a plurality of generally horizontal superheater tubes 138 stacked on top of each other and fluidly coupled together. Each of the superheater tubes 138 has a plurality of straight segments 138A and a plurality of curved segments 138B that form end portions of the tubes and that couple adjacent straight segments 138A together. With this arrangement, each of the superheater tubes 138 can have a generally serpentine configuration.

During operation of the superheaters 129, steam within the steam drums 130A is directed into each of the superheater tubes 138 by a tube 141A. As the steam flows through the superheater tubes 138 by following the serpentine path, hot flue gases within the HRSG 120 can flow over the individual superheater tubes 138, thereby causing the individual superheater tubes 138 to heat up until the temperature of the outer surface of the superheater tubes 138 reaches temperatures between about 500° F. and 1000° F. The superheater tubes 138, which are typically formed from metal, can then transfer at least some of this absorbed thermal energy to the steam flowing through the superheater tubes 138, thereby causing the steam to become superheated. Once the superheated steam reaches the end of the superheater tube 138, the superheated steam is directed out of the superheater 129 and into tube 141B, which directs the steam out of the HRSG 120 via nozzle 142. The superheated steam can then be provided to the steam turbine.

Figure 7C:
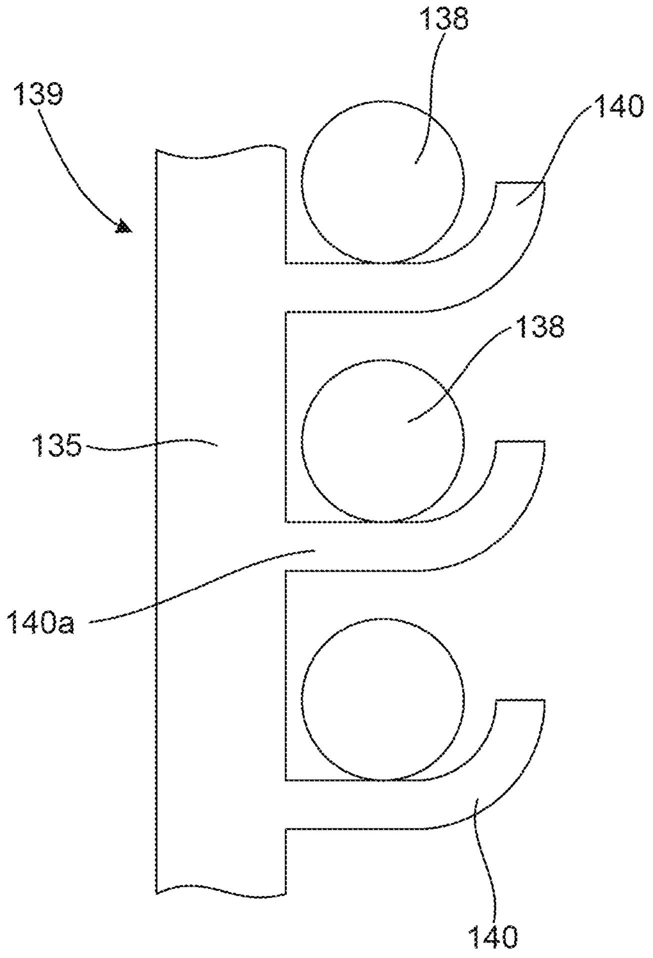
FIG. 7C shows a diagram of a vertical support tube for the superheater of FIGS. 7A and 7B and configured in accordance with embodiments of the present technology.
Figure 7C:
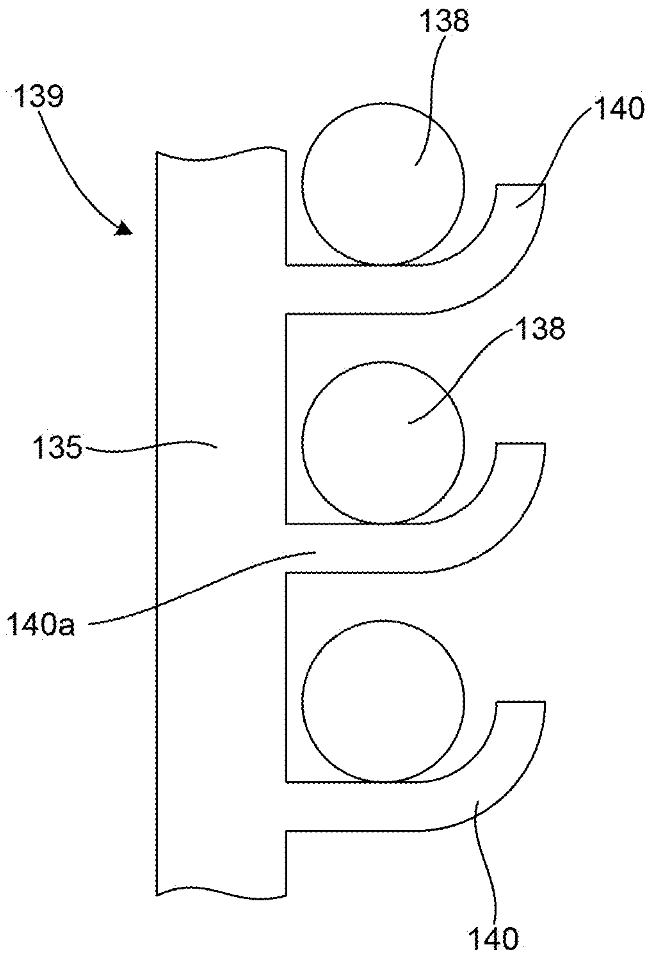

To support the generally horizontal superheater tubes 138, the HRSG 120 can include a plurality of vertical support tubes 139. The vertical support tubes 139 are generally vertically oriented and each includes a plurality of fins projecting horizontally such that the horizontal superheater tubes 138 can rest on the fins. As shown in FIG. 7C, each of the vertical support tubes 139 include an evaporator tube 135 and a plurality of fins 140 welded to the evaporator tube 135 such that fins 140 extend away from the evaporator tube 135 and can support one of the superheater tubes 138. While FIG. 7C shows the fins 140 having a upwardly curved terminal end, the fins 140 may have other shapes, such as straight fins that project horizontally with no upward curve at the terminal end.

During operation of the HRSG 120, the flue gases flowing through the HRSG 120 can be hot enough to soften and weaken the metal that forms the vertical support tubes 139, which can potentially cause damage to the superheater 129. However, because the evaporator tube 135 includes water and steam flowing therethrough, the water and steam can absorb enough of the heat absorbed by the vertical support tubes 139 to cool the vertical support tubes 139 down so that the metal remains sufficiently strong.

In the embodiment shown in FIGS. 3 and 4, the steam generation system 125 includes two superheaters 129. In some embodiments, the two superheaters 129 can be fluidly coupled together in series. In these embodiments, one of the superheaters 129 receives steam from the steam drums 130A, at least partially superheats the steam, and provides the at least partially superheated steam to the second superheater 129, which continues to heat the at least partially superheated steam until the steam is fully superheated. The superheated steam is then directed out of the HRSG 120. In other embodiments, however, the two superheaters 129 are not fluidly coupled together and superheat the steam independent from each other. In still other embodiments, the steam generation system may only include one superheater 129, or may include more than two superheaters 129.

Figure 8A:
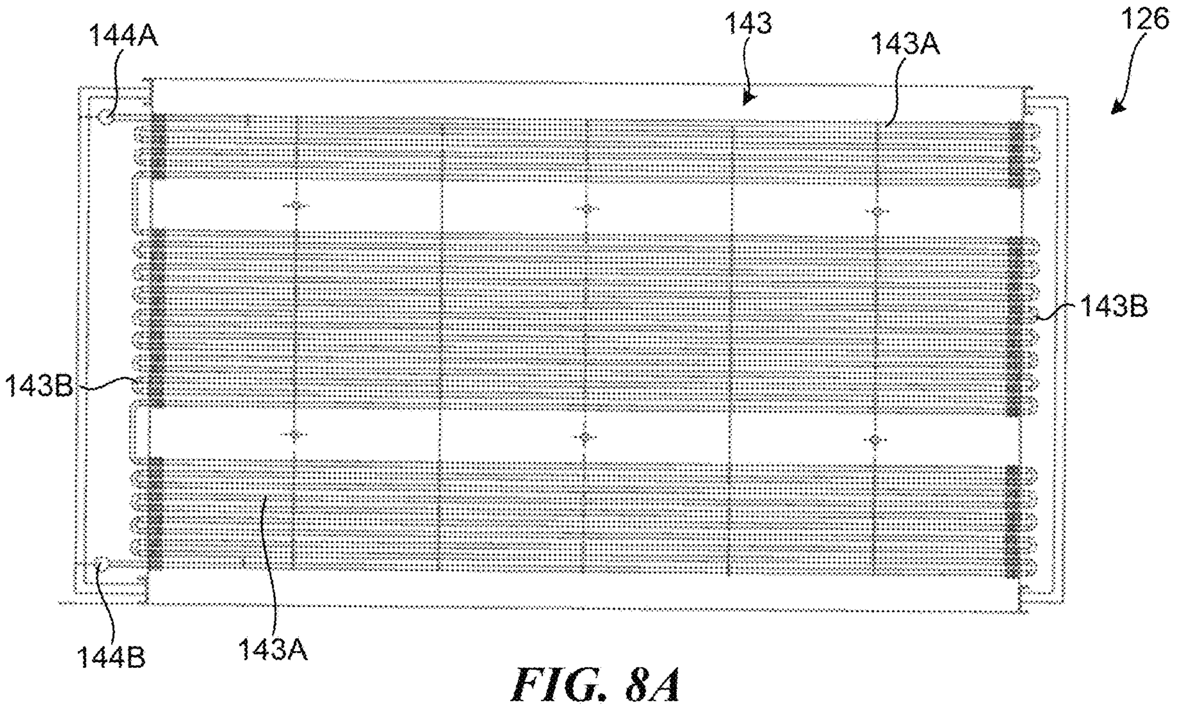
FIGS. 8A and 8B show diagrams of an economizer configured in accordance with embodiments of the present technology.
Figure 8B:
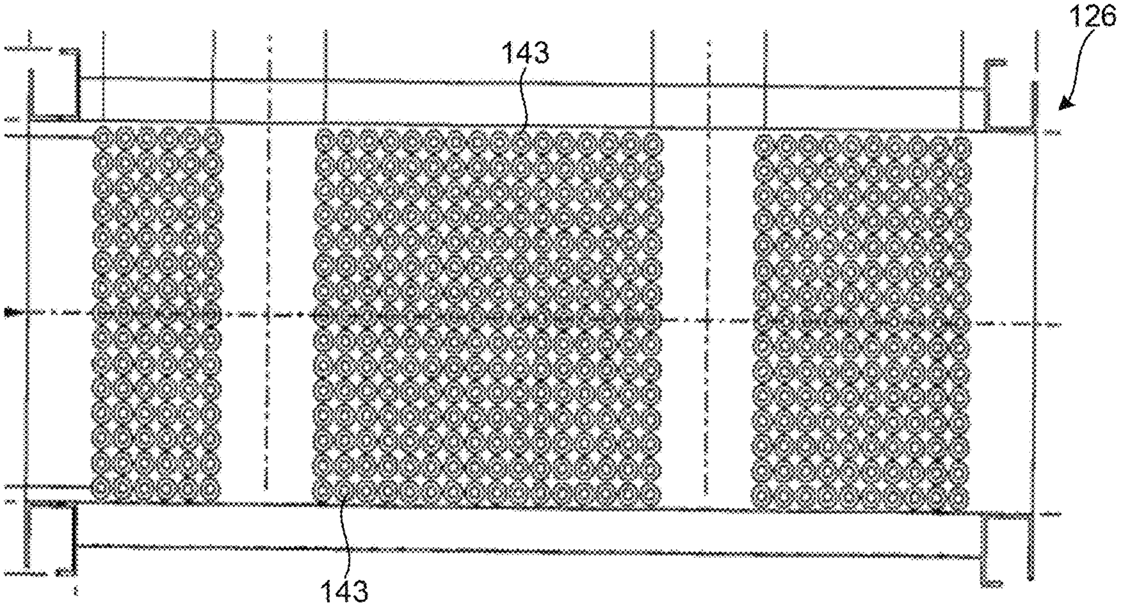

After passing by the superheaters 129, the flue gases pass through the secondary evaporators 128 and flow towards the economizer 126. FIG. 8A is a front view of the economizer 126 showing a single economizer tube 143 and FIG. 8B is a diagram showing the side of the economizer 126. The economizer 126 includes a plurality of economizer tubes 143 positioned adjacent to each other. Each of the economizer tubes 143 has a plurality of straight segments 143A and a plurality of curved segments 143B that couple adjacent straight segments 143A together. With this arrangement, each of the economizer tubes 143 can have a generally serpentine configuration.

During operation of the economizer 126, feedwater from outside of the HRSG 120 is directed into each of the economizer tubes 143 by a feedwater inlet 144A. As the feedwater flows through the economizer tubes 143 by following the serpentine path, flue gases within the HRSG 120 can flow between adjacent economizer tubes 143, causing the economizer tubes 143 to heat up. The economizer tubes 143, which are typically formed from metal, can then transfer at least some of the absorbed thermal energy to the feedwater flowing through the economizer tubes 143. However, the high pressures within the economizer tubes can ensure that the feedwater remains a liquid at these elevated temperatures. Once the heated feedwater reaches the end of the economizer tubes 143, the heated feedwater is directed out of the economizer 126 and into tube 144B, which directs the heated feedwater into the mud drums 130B. Further, once the flue gases pass by the economizer 126, the flue gases can be sufficiently cool and can be directed out of the HRSG 120.

In the embodiments shown in FIGS. 5A-8B, the tubes 135, 138, and 143 are each depicted as being generally cylindrical and not having protrusions extending away from the tubes. In other embodiments, however, some or all of these tubes can include fins that extend away from the tubes and act as heatsinks that can help the tubes absorb additional heat from the flue gas.

Figure 9:
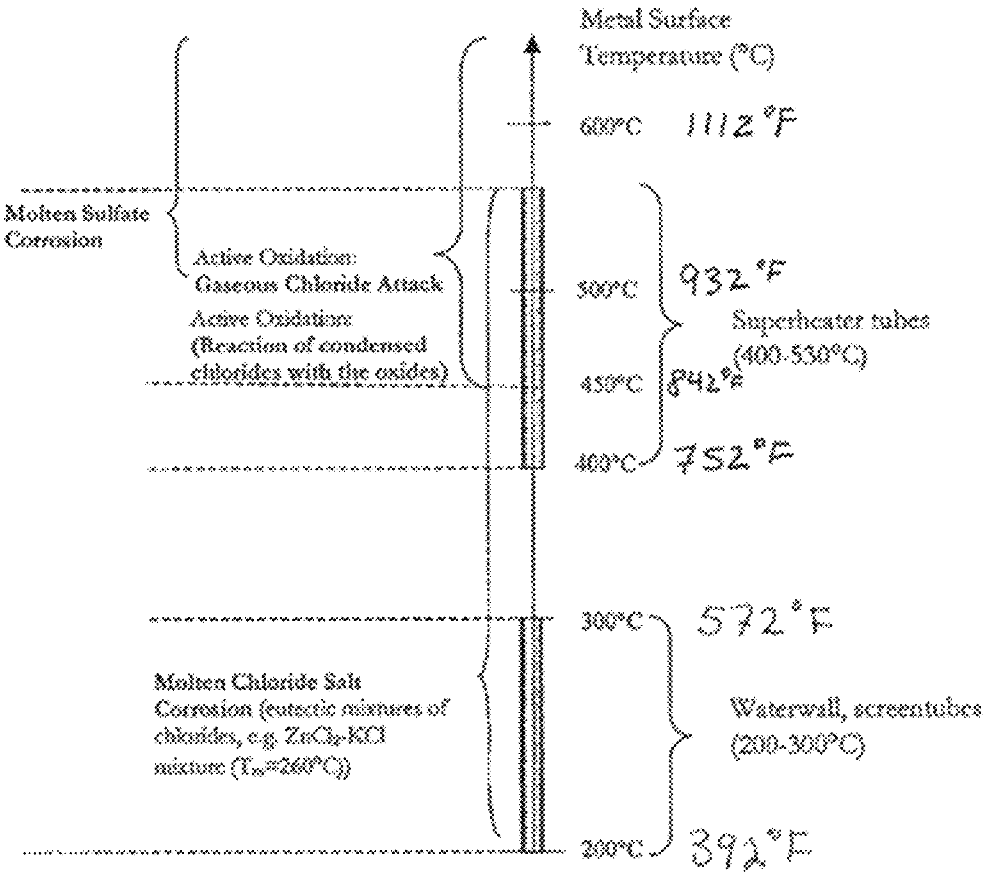
FIG. 9 is a chart that compares temperature ranges for which contaminants within the flue gas are corrosive for steel tubes.

During the coking process, contaminants found in the coal are emitted from the coal and are expelled from the coke oven as part of the flue gas. In some embodiments, these contaminants can include sulfur, chlorine, ash, and other materials/chemicals. When the flue gas leaves the coke oven, the flue gas can sometimes be hot enough to cause the contaminants to vaporize and be in a gaseous state. When the flue gas reaches the HRSG 120 and begins to cool, however, these contaminants condense into liquids and solids that are extremely corrosive. As these condensed contaminants flow around the various components of the steam generation system 125, the contaminants can be deposited onto, e.g., the exterior surfaces of the evaporator, superheater, and economizer tubes as well as the vertical support tubes and the waterwall. In conventional heat recovery steam generators, these tubes are formed entirely from steel, which is extremely prone to corrosion. FIG. 9 is a chart that compares the temperature ranges for which the contaminants are corrosive for steel tubes. For example, the superheater tubes 138 can be heated by the hot flue gases such that the portions of the steel are between 700° F. and 1100° F. At these temperatures, the steel that forms the superheater tubes 138 is subject to corrosion from molten sulfates and oxidation caused by gaseous chlorides. In addition, evaporator tubes 135, including the evaporator tubes 135 that form both the waterwall 133 and the evaporators 127 and 128, can be heated such that portions of the steel can reach temperatures between 390 and 800° F., which puts the evaporator tubes 135 at risk of corrosion caused by molten chloride salts.

Figure 10:
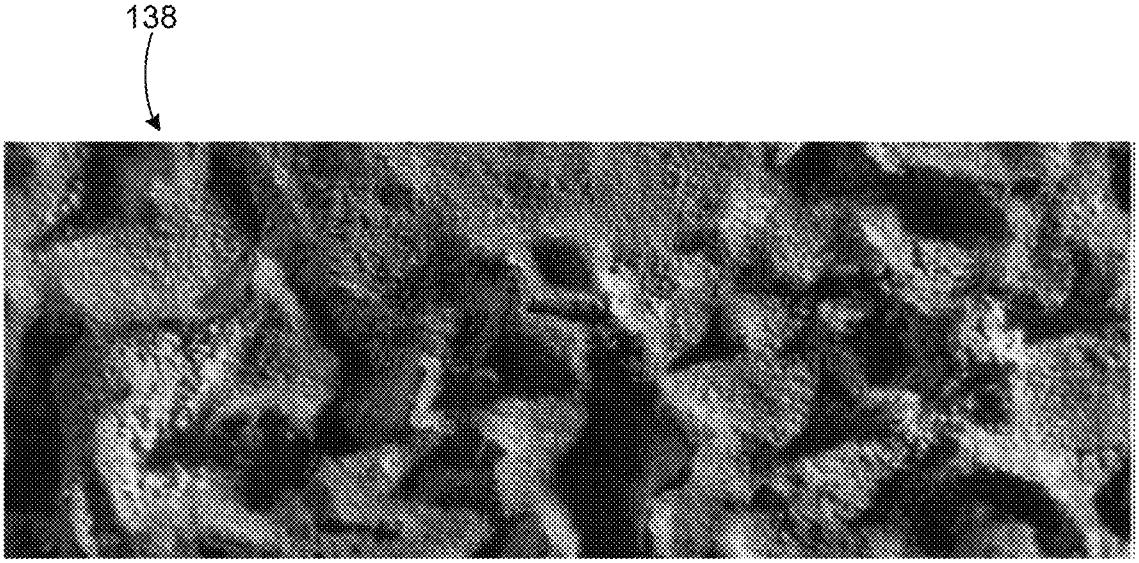
FIGS. 10-16 show the effects of corrosion caused by contaminants within the flue gas interacting with the steel tubes within the HRSG.
Figure 11:
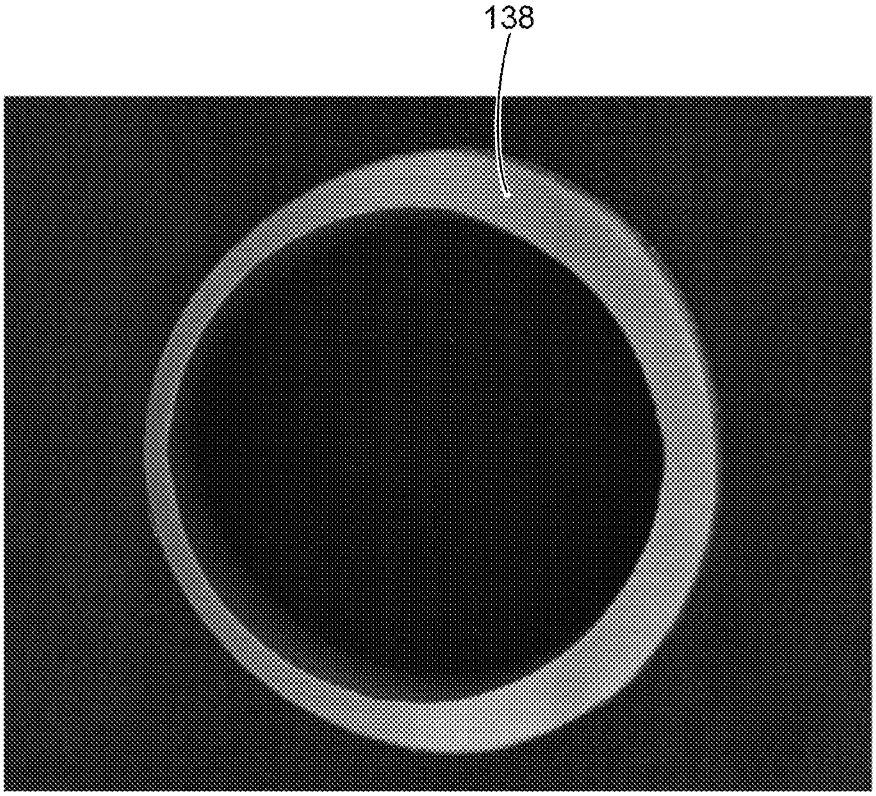
Figure 12:
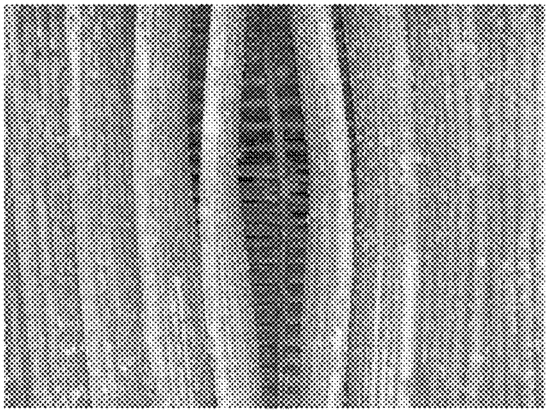
Figure 13:
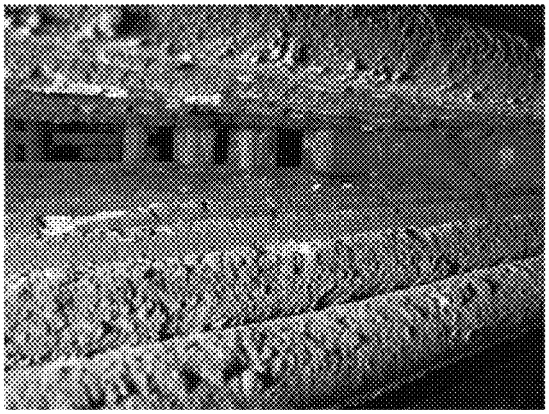
Figure 14:
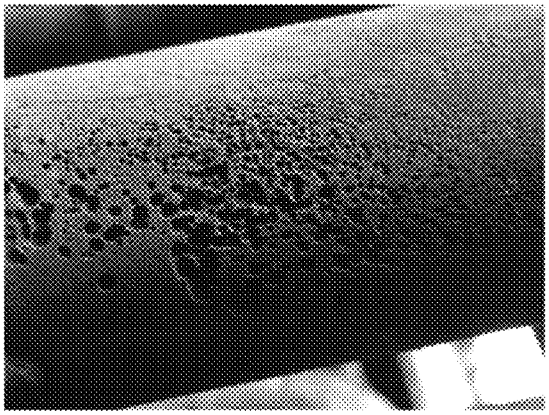

FIGS. 10-16 show the effects of corrosion and degradation caused by contaminants interacting with the heated steel. FIG. 10 shows the exterior surface of one of the superheater tubes 138 after the steel has corroded. During operation of the HRSG 120, a protective layer of oxidation is stripped off of the steel by alkali compounds in the flue gas. The steel is thus left exposed to the corrosive compounds in the flue gas that attack the metal surface and can cause it to thin. FIG. 11 shows a cross-sectional view of one of the superheater tubes 138. During operation of the HRSG 120, the protective oxidation layer is stripped off by chlorine compounds in the flue gas, exposing the unprotected steel to deposited compounds such as carbon. The carbon can then migrate into the crystal structure of the steel and weaken the material. Other deposits, such as chloride salts and sulfates can then adhere to the carburized layer that forms as the carbon migrates into the steel. The various corrosive compounds in the flue gas have worn away a portion of the steel, resulting in localized thinning of the tube wall. If left unchecked, this thinning can continue until pin holes form through the tube wall, allowing the superheated steam within the superheater tube 138 to leak out of the superheater tube 138. If the tubes are heated to too high of a temperature, the steel can soften and the tubes can deform and bend. For example, FIG. 12 shows evaporator tubes that have bent due to overheating of the steel. FIG. 13 shows an oblique view of a portion of ash deposits that can form on the steel tubes and FIG. 14 shows how the contaminants can cause pitting in the steel tubes.

Figure 15:
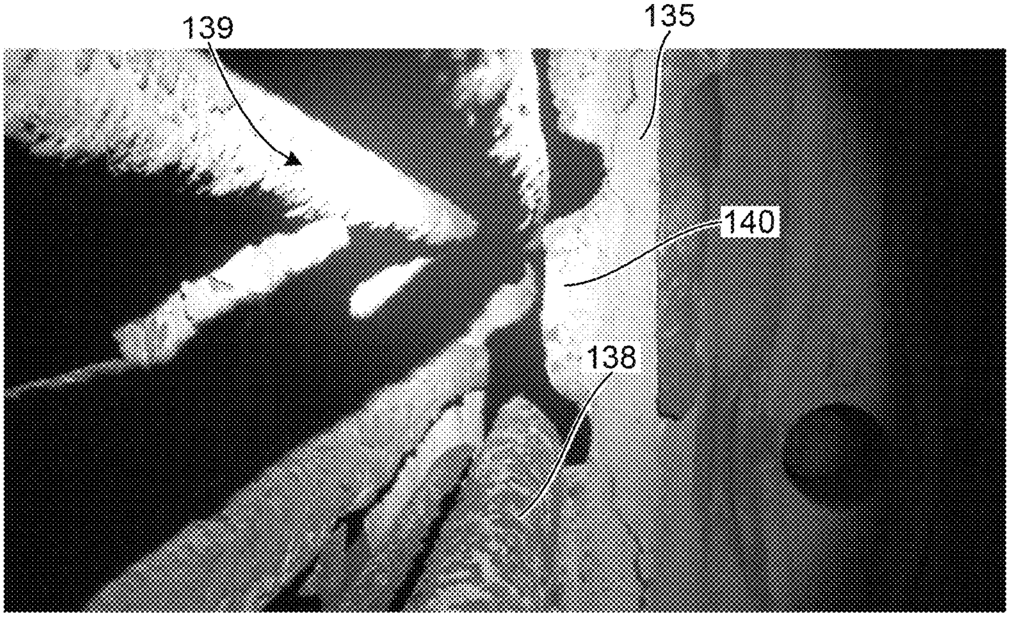
Figure 16:
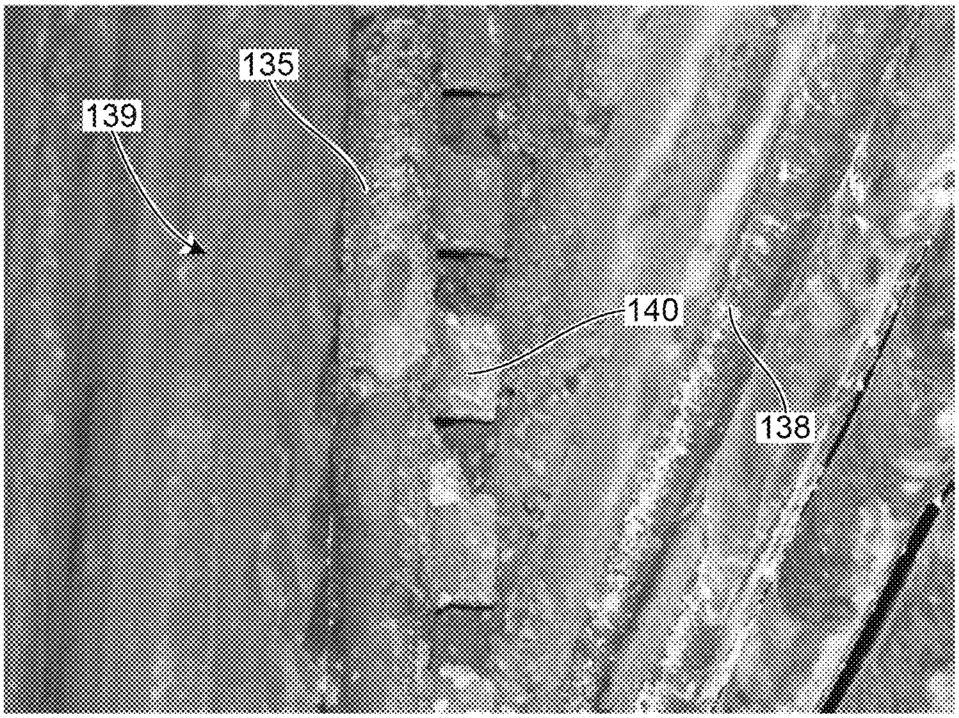

FIGS. 15 and 16 show how the corrosive compounds can corrode the fins 140 of the vertical support tubes that are used to hold the superheater tubes 138 in place. While the evaporator tubes 135 and the superheater tubes 138 have water flowing through them, which can help to cool down the steel that forms these tubes, the fins 140 are formed entirely from metal and project away from the water within the evaporator tubes 135. Accordingly, the fins 140 do not experience significant cooling from the water within the evaporator tubes 135. In fact, the fins 140 can act as heat sinks that draw more heat from the flue gas, which can lead to localized heating of the evaporator tubes 135 near where the fins 140 are attached to the evaporator tubes 135. As a result, the corrosive contaminants in the flue gas corrode away the steel that forms the fins 140 significantly faster than the evaporator tubes 135 or the superheater tubes 138. Accordingly, corrosive flue gas can corrode the vertical support tubes 139, leading to the superheater tubes 138 being unsupported, which can damage the superheater 129. Further, the localized heating of the evaporator tubes 135 can accelerate corrosion around the evaporator tubes near the fins that can cause the tubes 135 to fail more quickly, potentially causing damage to other tubes in the HRSG 120.

Figure 17A:
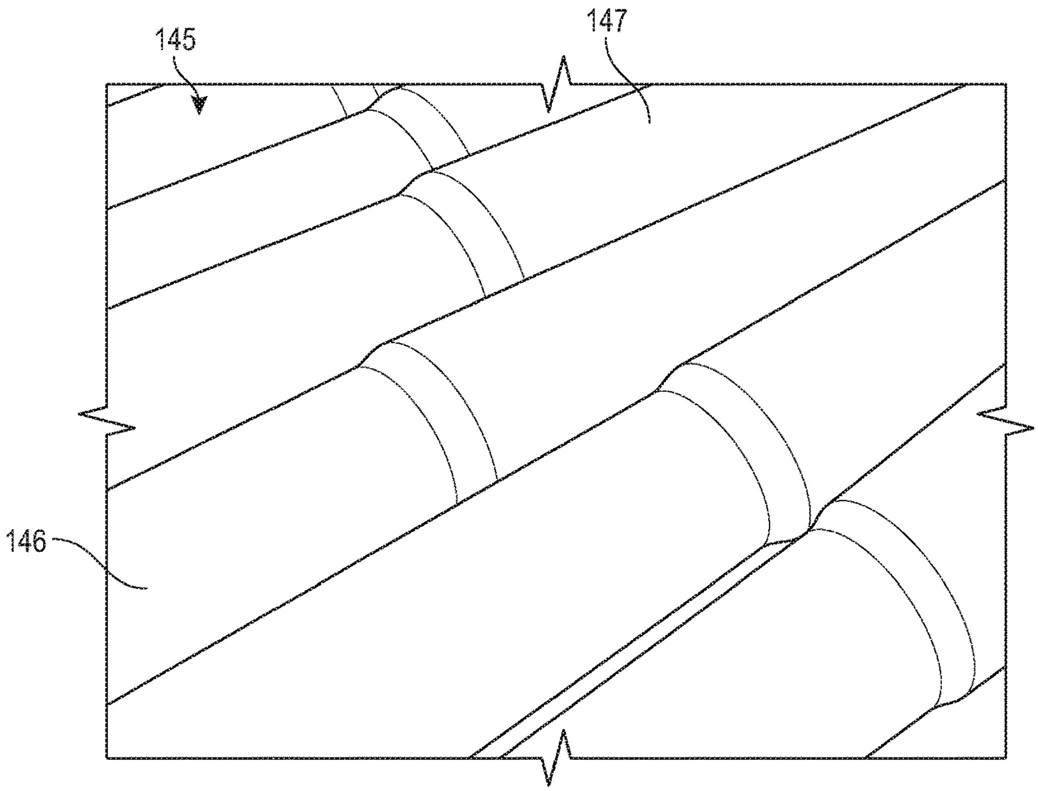
FIG. 17A shows a plurality of tubes having a corrosion-resistant alloy cladded to a steel portion of the tube and configured in accordance with embodiments of the present technology.
Figure 17B:
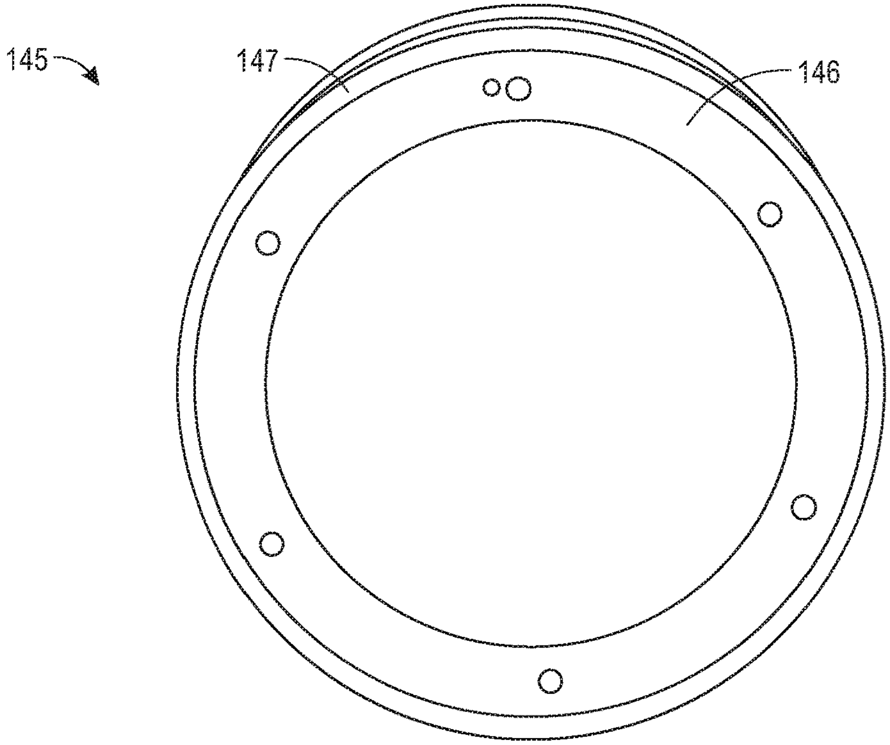
FIG. 17B show a cross-sectional view of one of the tubes shown in FIG. 17A.

To extend the lifetime of the tubes within the HRSG 120, in some embodiments, the thickness of the walls of the tubes can be increased. The thickness of fins 140 can also be increased. In this way, the amount of time that these tubes/fins can operate without corrosion affecting the performance of the HRSG 120 can be prolonged. However, increasing the thickness of the tubes/fins may not be enough to sufficiently prolong the lifetime of these tubes. To further reduce and/or eliminate the corrosive effects of the flue gas on the tubes/fins, at least some of the steel components within the HRSG 120 (e.g., tubes or fins) can be clad with a corrosion resistant alloy or other corrosion resistant material. FIG. 17A shows an isometric view of a plurality of tubes 145 having a steel portion 146 and a corrosion resistant portion 147 cladded to the steel portion and FIG. 17B shows a cross-sectional view of one of the tubes 145. The corrosion resistant portion 147 is formed from a corrosion-resistant alloy or material that resists corrosion at elevated temperatures. In representative embodiments, the corrosion-resistant alloy is a Nickel-based alloy. For example, in some embodiments, the corrosion resistant portion 147 comprises a Nickel-Chromium alloy such as Inconel. In other embodiments, the corrosion resistant portion 147 comprises a Nickel-Molybdenum such as Hastelloy, a Nickel-Molybdenum-Chromium-Copper alloy such as Illium or a Nickel-Copper alloy such as Monel. Other alloys, such as Ferritic alloy steels (e.g., T22 and T91 alloy steel) can also be used. In some embodiments the corrosion resistant portion 147 comprises two or more corrosion resistant materials, such as a cladding including a first layer of a first corrosion resistant material and a second layer disposed on the first layer, the second layer being made from a second corrosion resistant material different from the first corrosion resistant material. In one non-limiting example, T91 alloy steel can be overlaid with Inconel to form the corrosion resistant portion 147. In embodiments where the corrosion resistant portion 147 is an alloy, the corrosion resistant portion 147 can include any Nickel-based alloy or superalloy that has high resistance to corrosion at high temperatures. In this way, the corrosion resistant portions 147 can prevent (or at least reduce) corrosion caused by the contaminants in the hot flue gas interacting with the tubes. Further, when it is discovered that tubes in existing heat recovery steam generators that are formed only from steel and do not have corrosion resistant portions have corroded, these corroded tubes can be easily switched out for tubes 145 having the corrosion resistant portions 147. In this way, older heat recovery steam generators can be retrofitted to increase their performance and lifespan without a completely new heat recovery steam generator having to be constructed.

In other embodiments, the corrosion resistant material used for at least a portion of corrosion resistant portion 147 is silicon carbide. Silicon carbide is both chemically resistant and provides good heat transfer, thereby making it a suitable material for the corrosion resistant portion 147. In some embodiments, the corrosion resistant portion 147 is a layer of silicon carbide with no other layers or materials. In other embodiments, the silicon carbide is used in conjunction with other materials to form the corrosion resistant portion 147, such as with previously discussed alloys. In one non-limiting example, T91 alloy steel can be overlaid with silicon carbide to form the corrosion resistant portion 147.

To clad the steel portions 146 of the tubes 145 with the corrosion resistant portion 147, the corrosion resistant portion 147 can be welded to the steel portions 146. For example, in some embodiments, an automatic welding system, such as an orbital welder, can weld the corrosion-resistant material to the steel before the tubes 145 are installed within the HRSG 120. In this way, the corrosion resistant portion 147 can have a generally uniform thickness and properties. However, it may not be desirable for each of the tubes 145 to be completely cladded with the corrosion resistant material along the entire length of the tubes 145 as it is typically not possible (or it is at least very difficult) to weld the corrosion resistant material-clad steel to other metals. Accordingly, end portions of each of the tubes 145 are typically uncladded so that they can be more easily welded to each other or to other components of the HRSG 120. For example, as previously discussed in connection with FIG. 7B, the superheater tubes 138 include straight segments 138A and curved segments 138B. When the superheaters 129 are assembled (or repaired) a straight segment 138A and a curved segment 138B can be coupled together by welding the uncladded end portion of the straight segments 138A to the uncladded curved segment 138B. Similarly, two straight segments 138A can be coupled together by welding uncladded end portions of the two segments together. Further, when the superheater tubes 138 are attached to the tubes 141A and 141B, which act as headers for the individual superheater tubes 138, uncladded steel portions of the superheater tubes 138 are welded to the tubes 141A and 141B. In some embodiments, the tubes 141A and 141B can include stubs that extend toward the superheater tubes 138 and the uncladded steel portions of the superheater tubes 138 can be welded to these stubs. In other embodiments, the uncladded steel portions can extend into the tubes 141A and 141B and can then be welded to the tubes 141A and 141B. The evaporator tubes 135 can also have uncladded end portions. In this way, the evaporator tubes 135 can be coupled to the drums 130A and 130B by welding uncladded end portions of the evaporator tubes 135 to the drums 130A and 130B.

In the case of, for example, evaporator tubes, the evaporator tubes can be inserted into the steam and mud drums and then rolled and welded in place, and therefore, the ends are not typically overlaid originally. Consequently, for the non-overlay ends that have been inserted into the drum, a field overlay can be used (as discussed above) or the overlay sections can be coated in refractory. For example, if an evaporator tube is extending into the drum, a refractory coat can be applied to the end into the drum as a protective layer. When the HRSG is opened, the refractory can be checked and replaced if needed. A similar process can be performed for uncoated portions.

In some embodiments, after each of the uncladded end portions has been welded in place, the uncladded end portions can then be cladded with the corrosion resistant material by manually welding the corrosion resistant material to the exposed steel portions. In other embodiments, after the uncladded end portion for the individual tubes has been welded in place, the uncladded end portions can then be encased in refractory instead of being clad with the alloy portion 147.

In some embodiments, all of the tubes within the HRSG 120 can include an corrosion resistant portion 147 cladded to the steel portion. For example, all of the evaporator tubes 135 that form the primary and secondary evaporators 127 and 128, all of the evaporator tubes 135 that form the waterwall 133, all of the superheater tubes 138 for the superheaters 129, all of vertical support tubes 139 (including fins 140 and the evaporator tubes 135 that the fins 140 are coupled to), and all of the economizer tubes 143 for the economizer 126 can include corrosion resistant portions 147 cladded to steel portions 146. Other portions of the HRSG 120, such as the exterior walls 136, can also include corrosion resistant portions 147. In other embodiments, however, only some of the tubes can include the corrosion resistant portions 147. For example, in some embodiments, the economizer tubes 143 may not include a corrosion resistant portion 147. As the hot flue gases flow through the HRSG 120, the various components of the steam generation system 125 cause the flue gas to cool down such that, by the time the flue gases reach the economizer 126, the flue gases are cool enough that the contaminants in the flue gases are not as corrosive to the steel. In these embodiments, it may not be necessary to clad the economizer tubes 143 with the corrosion resistant portion 147 as the risk of the steel economizer tubes 143 corroding is sufficiently reduced. In still other embodiments, only a portion of individual tubes can include a corrosion resistant portion 147. For example, to ensure that the superheater tubes 138 are properly welded to the tubes 141A and 141B, end portions of individual of the superheater tubes 138 are typically not cladded with the corrosion resistant portion 147. Instead, the superheater tubes 138 can extend through the waterwall 133 so that the uncladded end portions are behind the waterwall 133 and are therefore not in the flow path of the hot and corrosive flue gases. With this arrangement, only portions of the superheater tubes 138 having the corrosion resistant portion 147 can be in the flow path of the flue gases while the uncladded portions are protected by the waterwall 133.

In some embodiments, welds used to join together various pipes used in the HRSG can be cladded with corrosion resistant material to ensure the welds are not corroded and weakened. For example and with reference back to FIG. 7C, welds 140*a* can be used to weld fins 140 to the vertical support tubes 139. In order to protect this type of weld, corrosion resistant material, such as any of the corrosion resistant material discussed previously, can be cladded over the weld 140*a*. With further reference to FIG. 7C, wear plates can be provided between the fins 140 and the superheater tubes 138 to further support the superheater tubes 138 and protect the fins against corrosion. In some embodiments, such wear plates are made from corrosion resistant material as discussed previously, including T22alloy steel.

Figure 18:
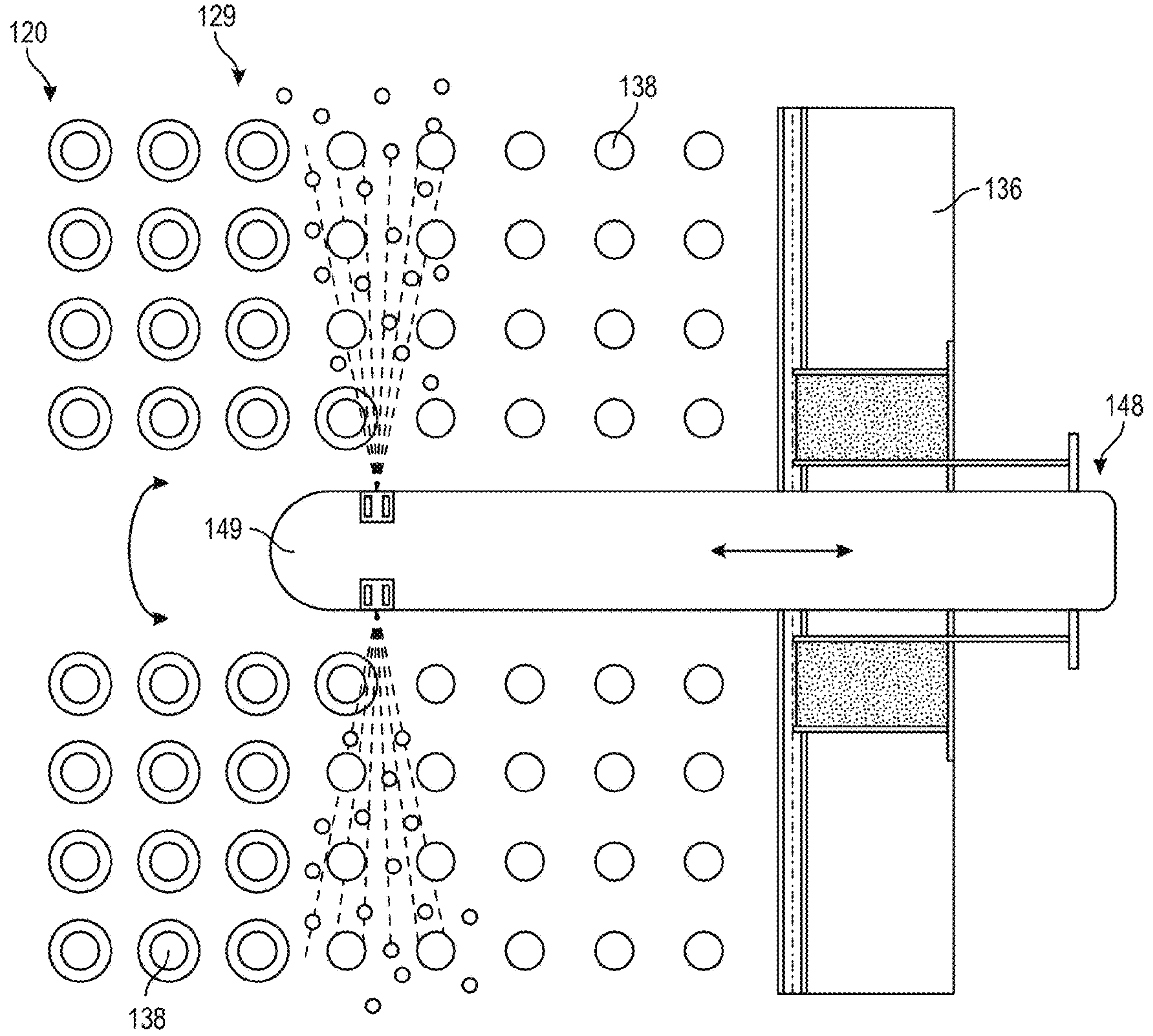
FIG. 18 shows a diagram of a sootblower used to remove precipitated particles from the tubes, in accordance with embodiments of the present technology.

During operation of the HRSG 120, ash and other particulate matter can be deposited on the various tubes within the HRSG 120. Embodiments of the HRSG 120 in which some or all of the tubes have fins that extend away from the tubes are particularly prone to deposits forming on the various tubes as the fins can help to trap the deposits. In addition to potentially corroding and damaging these tubes, the particulate matter can sometimes reduce heat transfer between the hot flue gas and the tubes. Accordingly, to ensure that these deposits do not severely impact the performance of the HRSG 120, the HRSG 120 can include one or more sootblowers that are configured to blow deposits off the tubes. For example, FIG. 18 shows a diagram of a sootblower 148 having an extending portion 149 that extends through the exterior wall 136 of the HRSG 120. The sootblower 148 is positioned such that the extending portion 149 moves into and out of one of the superheaters 129 and blows deposits off of the superheater tubes 138. However, in some embodiments, the sootblower 148 blows steam and/or liquid water onto the superheater tubes 138, which can cause the superheater tubes to erode. To prevent the sootblower from damaging the superheater tubes 138, superheater tubes 138 near the sootblower 148 can include the corrosion resistant portion 147 cladded to the superheater tubes 138. In this way, the corrosion resistant portion 147 can limit and/or prevent the water emitted by the extending portion 149 from damaging the superheater pipes. In some embodiments, only the superheater tubes 138 near the extending portion 149 of the sootblower 148 have the corrosion resistant portion 147 while the superheater tubes 138 positioned further away do not. For example, in some embodiments, only the first row of superheater tubes closest to the sootblower 148 include corrosion resistant portions. In other embodiments, superheater tubes 148 located within 2 rows of the sootblower 148 include the corrosion resistant portion, while in other embodiments, only the superheater tubes 138 located within 4 rows of the sootblower 148 include the alloy portion 147. Regardless of the number of rows of superheater tubes 138 cladded with corrosion resistant portion 147, the corrosion resistant material can be cladded along some or all of the length of the superheater tube within the given row. For example, in some embodiments, the superheater tubes that are cladded with corrosion resistant material are cladded only on the length of the superheater tube 138 closest to the sootblower 148. In other embodiments, the entire length of the superheater tubes in the rows being cladded are cladded with corrosion resistant material.

While sootblowers 148 can be used to clean tubes within the HRSG as described previously, other cleaning techniques can also be used, including cleaning techniques that do not run the risk of corroding the tubes and therefore do not require additional cladding to protect tubes near the sootblower. For example, explosive cleaning can be used to keep tubes within the HRSG, including superheater tubes, clean.

In the previously discussed embodiments, the tubes are described as being formed from a steel portion that is clad with a corrosion-resistant material. In other embodiments, however, the tubes can have a different formulation. For example, in some embodiments, the tubes may not include a steel portion and instead may be formed entirely from the corrosion-resistant material. Further, in tubes that do include the steel portion, the metallurgy and composition of the steel may be chosen based on the specific configuration and operating conditions of the HRSG and the coke plant as well as the location of the tube within the HRSG. Different types of steel, such as carbon steel, T22 steel, and T91 steel all have different compositions that affect their resistance to corrosion as well as the temperature ranges for which they are the most effective. For example, T22 steel offers better corrosion resistance than carbon steel but not as much corrosion resistance as T91 steel. However, a tube formed form T22 steel that has been cladded with a corrosion resistant alloy (e.g., Inconel) can have better corrosion resistance than a tube formed only form T91 steel. In some embodiments, individual tubes can also include more than one type of steel. For example, the evaporator tubes that form part of the vertical support tubes can be formed from a T22 steel tube clad with Inconel while the fins that are welded to the evaporator tube are formed from a 9Cr steel that tends to resist high temperature corrosion than T22 steel tube does.

Figure 19A:
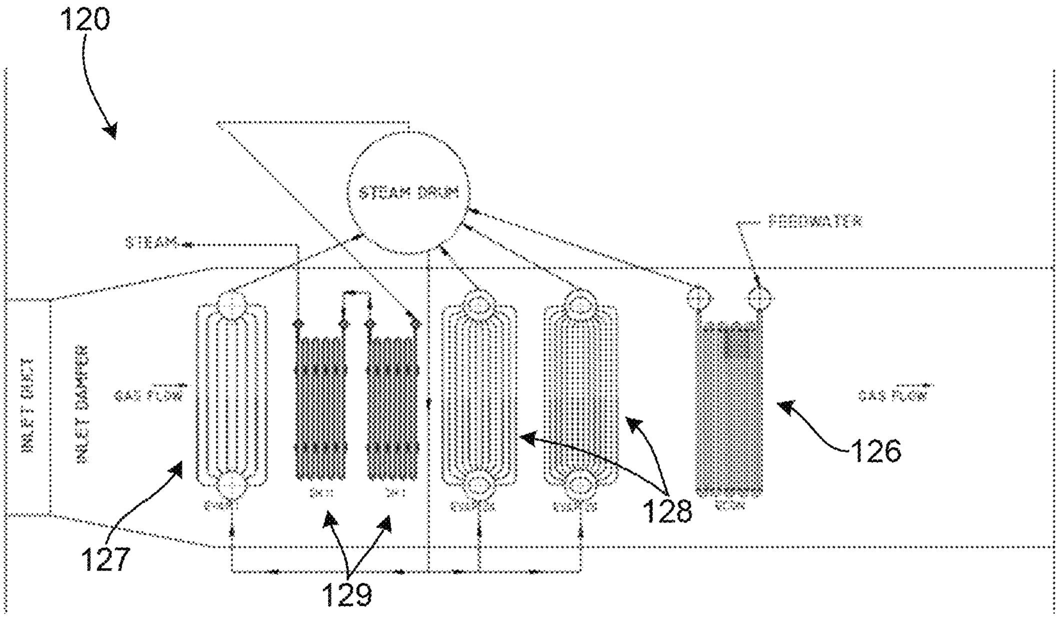
FIGS. 19A-E show diagrams of HRSGs having different layouts and arrangements, in accordance with embodiments of the present technology.
Figure 19B:
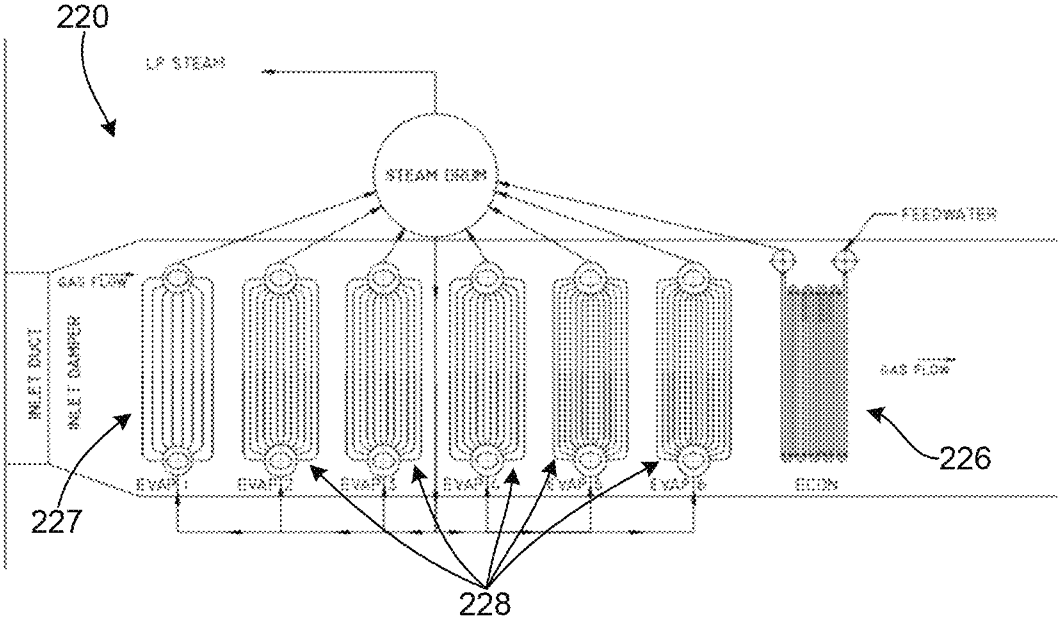
Figure 19C:
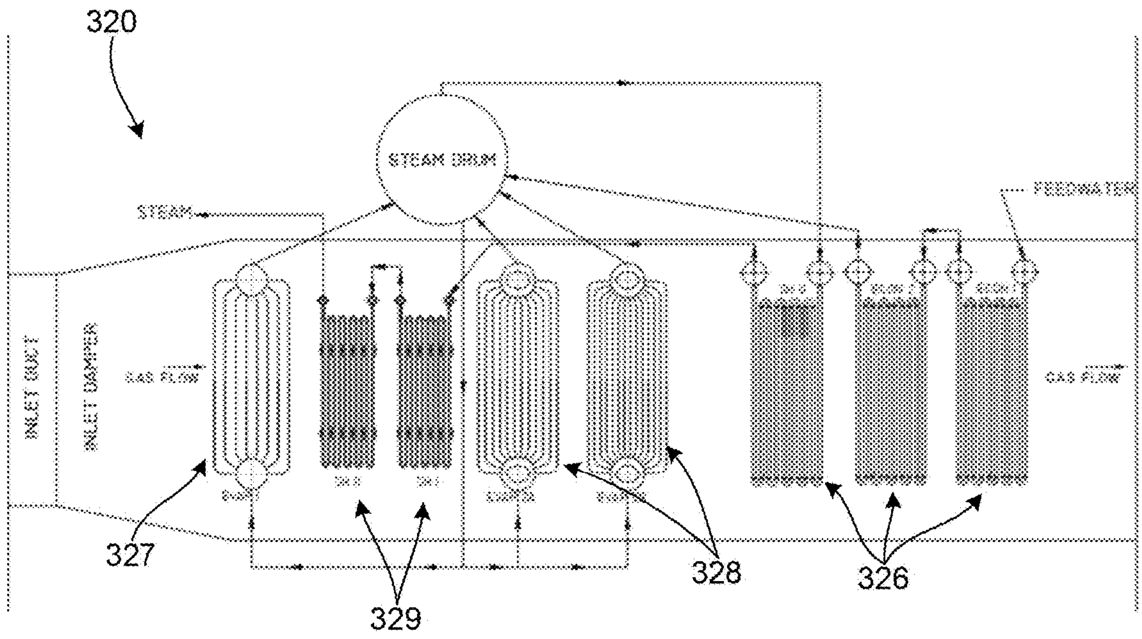
Figure 19D:
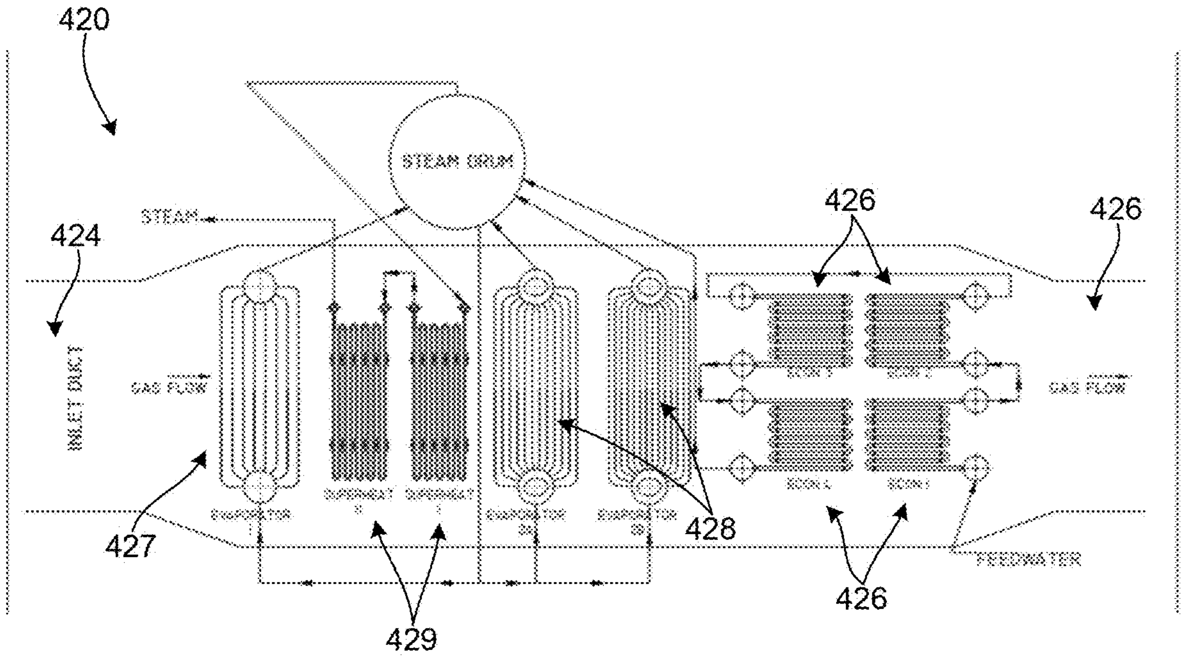

FIG. 19A shows a diagram of the HRSG 120 depicted in FIGS. 3 and 4. In the illustrated embodiment, HRSG 120 includes a single economizer 126, a primary evaporator 127, two secondary evaporators 128, and two superheaters 129. In other embodiments, however, the steam generation system can have a different configuration. For example, FIG. 19B shows a diagram of a HRSG 220 that includes a single economizer 226, a primary evaporator 227, and five secondary evaporators 228 and does not include a superheater. With this arrangement, the HRSG 220 can be configured to produce low pressure steam and can provide the low-pressure steam to a chemical plant that requires low pressure steam, instead of a steam turbine. FIG. 19C shows a diagram of a HRSG 320 that includes three economizers 326 fluidly coupled together in series, a primary evaporator 327, two secondary evaporators 328, and two superheaters 329. FIG. 19D shows a diagram of a HRSG 420 that includes four economizers 426 coupled together in series, a primary evaporator 427, secondary evaporators 428, and two superheaters 429.

In the embodiment shown in FIG. 19D, the two superheaters 429 are fluidly coupled together in series such that the steam traveling through the two superheaters generally flows in the opposite direction from the flowing gas moving through the HRSG 420. In other words, the inlets for both superheaters 429 are positioned downstream from the outlets. With this arrangement, the steam flowing through the superheater tubes positioned closer to the inlet duct 424 tends to be hotter than the steam flowing through the superheater tubes closer to the outlet duct 426. By arranging the HRSG in this way, the steam can be superheated to an extremely high temperature. However, this arrangement also causes the superheater tubes nearer to the inlet duct 424 to be heated to a very high temperature as the steam within these pipes is too hot to provide significant cooling to the pipes, which can increase the corrosion on these pipes. Accordingly, in some embodiments, the superheaters can be arranged to reduce the temperature of the superheater tubes.

Figure 19E:
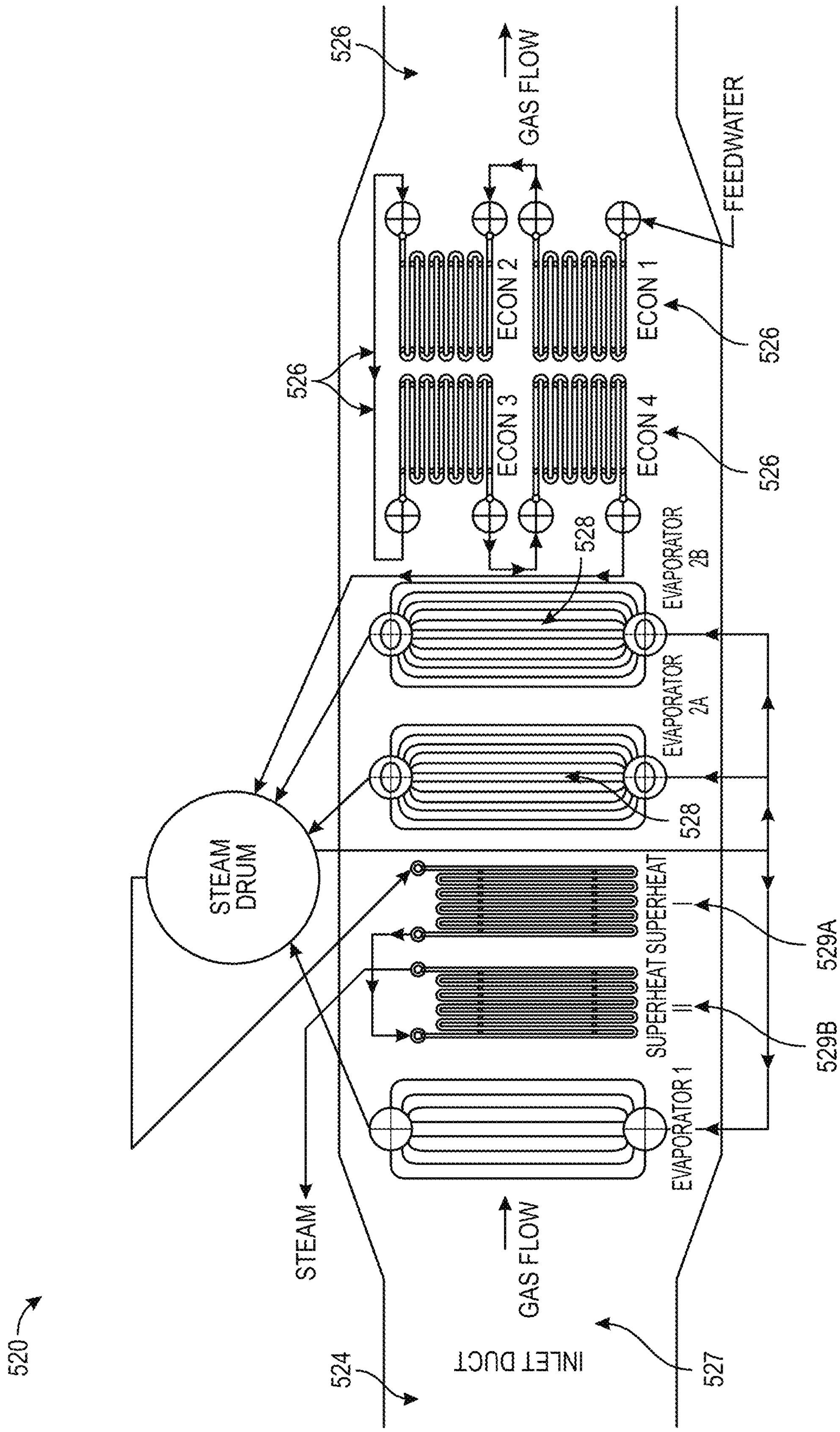

FIG. 19E shows a diagram of an HRSG 520. As in the HRSG 420 shown in FIG. 19D, the HRSG 520 includes four economizers 526 coupled together in series, a primary evaporator 527, secondary evaporators 528, and two superheaters 529A and 529B. In contrast to the superheaters 429, the superheaters 529A and 529B are fluidly coupled together in series such that the steam flowing through the first superheater 529A flows in the opposite direction from the flowing gas moving through the HRSG 520 while the steam flowing through the second superheater 529B flows in the same direction as the flowing gas. With this arrangement, the tubes of the second superheater 529B that are positioned closer to the inlet duct 524 can be heated to a lower temperature as the steam flowing through these tubes is typically cooler and can provide some cooling. While arranging the superheaters 529A and 529B in this way can reduce the heating efficiency of the HRSG 520, and therefore the maximum temperature that the steam can be superheated, this arrangement can also result in the superheater tubes being heated to a lower temperature, which can reduce the rate at which these tubes corrode and can increase the lifespan of the HRSG 520. In some embodiments, the superheaters 529A and 529B can be arranged such that the steam flowing through both of the superheaters 529A and 529B flows in the same direction as the gas flowing through the HRSG 520.

Other HRSG configurations not shown in FIGS. 19A-E can also be used. In one example, the HRSG configuration is similar to the configuration shown in FIG. 19E, but includes a superheater at the front end of the HRSG. Furthermore, while FIGS. 19A-19E and other descriptions of HRSGs provided herein reference and/or illustrate a horizontally oriented HRSG, it should be appreciated that the technology described herein is equally applicable to vertically oriented HRSGs. Vertically oriented HRSGs can have some benefits over horizontally oriented HRSGs. For example, vertically oriented HRSGs can obviate the need for support fins 140 as shown in FIG. 7C.

Figure 20:
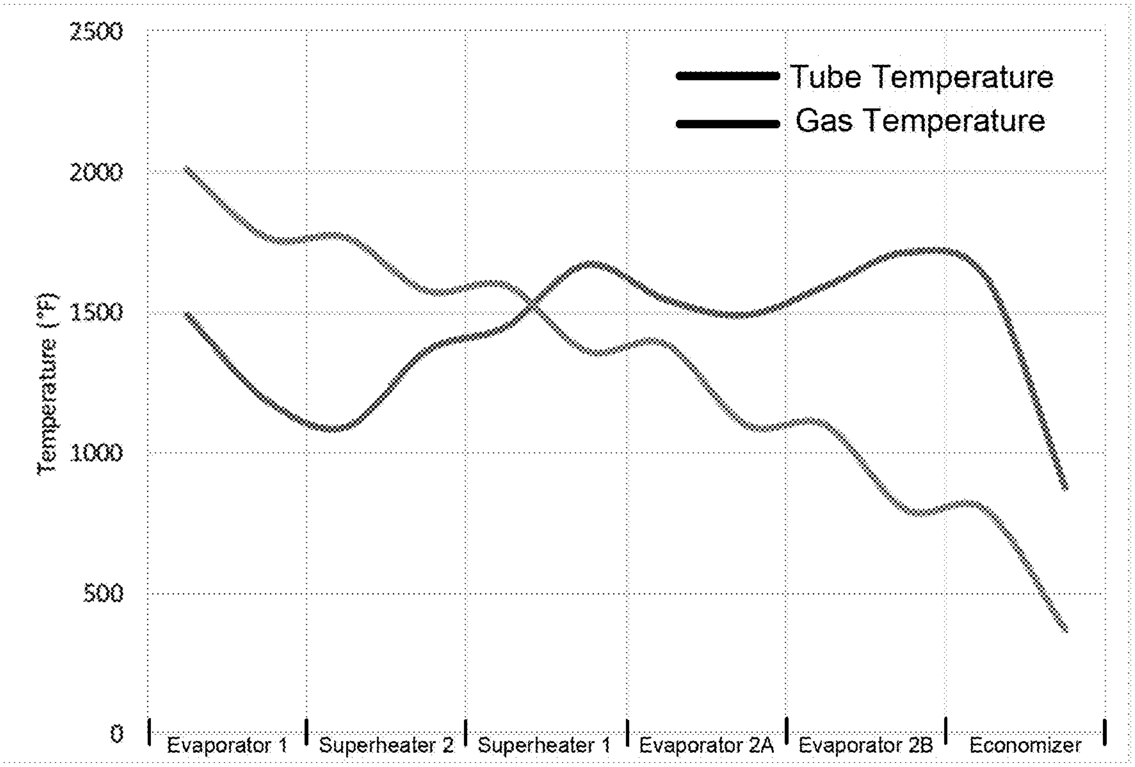
FIG. 20 shows a graph charting tube temperature and flue gas temperature at various stages of an HRSG configured in accordance with embodiments described herein.

FIG. 20 is a graph charting tube temperature and flue gas temperature throughout an HRSG as described herein, and more specifically, and HRSG as shown in, for example, FIG. 19A (having a primary evaporator 127, two superheaters 129, two secondary evaporators 128 and an economizer). As shown in FIG. 20, the temperature of the flue gas decreases steadily as it moves from the inlet of the HRSG 120 to the outlet of the HRSG, based on heat from the flue gas being transferred to the various tubes of the components of the HRSG. Tube temperature fluctuates non-uniformly across the length of the HRSG based on the specific path of the fluid flowing through the tubes that is not a direct line path from the inlet to the outlet of the HRSG (e.g., fluid first goes through the economizer positioned near the outlet of the HRSG, and is then directed to the primary evaporator positioned near the inlet of the HRSG).

From the foregoing, it will be appreciated that specific embodiments of the invention have been described herein for purposes of illustration, but that various modifications may be made without deviating from the scope of the invention. Accordingly, the invention is not limited except as by the appended claims.

We claim:

1. A method of modifying a heat recovery steam generator (HRSG) configured to receive high temperature and high pressure flue gases, wherein the flue gases are corrosive at temperatures above a critical temperature, wherein the HRSG includes an evaporator having a plurality of evaporator tubes, wherein individual ones of the plurality of evaporator tubes have evaporator tube surface temperatures greater than the critical temperature during operation of the HRSG, the method comprising;

detaching the individual evaporator tubes from the evaporator and removing the individual evaporator tubes from the HRSG, wherein, during operation of the HRSG, the individual evaporator tubes are exposed to the flue gases flowing through the HRSG; and fluidly coupling a replacement evaporator tube to the evaporator at each location where an individual evaporator tube is detached from the evaporator, wherein each of the replacement evaporator tubes includes a base material, and a cladding material that is disposed over at least a portion of an outer surface of the base material and resistant to corrosion, and wherein, during operation of the HRSG, the cladding material is exposed to the flue gases.

2. The method of claim 1 wherein the HRSG includes at least one superheater having a plurality of superheater tubes and wherein individual of the plurality of superheater tubes have superheater tube surface temperatures greater than the critical temperature during operation of the HRSG, the method further comprising:

detaching the individual superheater tubes from the superheater and removing the individual superheater tubes from the HRSG; and fluidly coupling a replacement superheater tube to the superheater at each location where an individual superheater tube is detached from the superheater, wherein each of the replacement superheater tubes is clad with the cladding material.

3. The method of claim 2 wherein:

the plurality of superheater tubes comprises straight segments and curved segments, one of the replacement superheater tubes comprises a straight replacement superheater tube having an end portion that is free from the cladding material, detaching the individual superheater tubes from the superheater and removing the individual superheater tubes from the HRSG comprises detaching a given straight segment from a given curved segment and removing the given straight segment from the HRSG, and fluidly coupling the replacement superheater tubes to the superheater comprises welding the end portion of the straight superheater replacement tube to the given curved segment.

4. The method of claim 3, further comprising:

after welding the end portion of the straight superheater replacement tube to the given curved segment, manually welding the cladding material to at least the end portion.

5. The method of claim 3, further comprising:

after welding the end portion of the straight superheater replacement tube to the given curved segment, coating at least the end portion with refractory.

6. The method of claim 1, wherein the cladding material comprises an alloy.

7. The method of claim 6, wherein the alloy comprises a Nickel-rich alloy.

8. The method of claim 1, wherein the cladding material comprises silicon carbide.

9. The method of claim 1, wherein the base material includes steel.

10. The method of claim 1, wherein the cladding material includes a metal alloy welded to the base material.

11. A method of modifying a heat recovery steam generator (HRSG), wherein the HRSG includes an evaporator having a plurality of evaporator tubes, the method comprising:

detaching individual ones of the plurality of evaporator tubes from the evaporator, wherein, during operation of the HRSG, flue gases flow through the HRSG and the individual ones of the plurality of evaporator tubes are exposed to the flue gases;

removing the individual evaporator tubes from the HRSG; and fluidly coupling a replacement evaporator tube to the evaporator at each location where an individual evaporator tube is detached from the evaporator, wherein each of the replacement evaporator tubes includes (i) a body portion having a cladding material resistant to corrosion disposed thereon and (ii) an end portion not having the cladding material disposed thereon, wherein, during operation of the HRSG, the cladding material is exposed to the flue gases.

12. The method of claim 11, wherein fluidly coupling comprises welding the end portion of the replacement evaporator tube to the evaporator.

13. The method of claim 11, further comprising manually welding, after fluidly coupling the replacement evaporator tube to the evaporator, the cladding material to the end portion of the replacement evaporator tube.

14. The method of claim 11, further comprising coating, after fluidly coupling the replacement evaporator tube to the evaporator, the end portion of the replacement evaporator tube with refractory.

15. The method of claim 11, wherein the cladding material includes a metal alloy welded to the body portion of the replacement evaporator tube.

* * * * *